(12) United States Patent
Vinson et al.

(10) Patent No.: US 7,739,140 B2
(45) Date of Patent: Jun. 15, 2010

(54) CONTENT REACTION DISPLAY

(75) Inventors: Michael J. Vinson, Sarasota, FL (US);
Frank S. Foster, IV, Valrico, FL (US);
Noreen Parker, Tierra Verde, FL (US)

(73) Assignee: Maggio Media Research, LLC, St. Petersburg, FL (US)

( * ) Notice: Subject to any disclaimer, the term of this patent is extended or adjusted under 35 U.S.C. 154(b) by 1896 days.

(21) Appl. No.: 10/282,069

(22) Filed: Oct. 29, 2002

(65) Prior Publication Data

US 2003/0172374 A1 Sep. 11, 2003

Related U.S. Application Data

(63) Continuation-in-part of application No. 10/020,512, filed on Dec. 18, 2001, now Pat. No. 7,146,329, which is a continuation-in-part of application No. 09/759,640, filed on Jan. 16, 2001, now Pat. No. 7,139,723.

(60) Provisional application No. 60/176,177, filed on Jan. 13, 2000.

(51) Int. Cl.
*G06F 17/30* (2006.01)
*H04H 60/33* (2008.01)
(52) U.S. Cl. .......................................... 705/10; 725/14
(58) Field of Classification Search .................. 705/14, 705/10; 725/14
See application file for complete search history.

(56) References Cited

U.S. PATENT DOCUMENTS

| | | | |
|---|---|---|---|
| 2,712,976 A | 7/1955 | Blaustein et al. | 346/33 |
| 3,126,513 A | 3/1964 | Kamen | 325/31 |
| 3,524,015 A | 8/1970 | Campbell | 178/6 |
| 3,693,090 A | 9/1972 | Gabriel | 325/308 |
| 4,107,735 A | 8/1978 | Frohbach | 358/84 |
| 4,546,382 A | 10/1985 | McKenna et al. | 358/84 |
| 4,769,697 A | 9/1988 | Gilley et al. | 358/84 |
| 4,905,080 A | 2/1990 | Watanabe et al. | 358/84 |

(Continued)

FOREIGN PATENT DOCUMENTS

WO WO 9960789 5/1999

OTHER PUBLICATIONS

Ephron, Erwin, "Looking Beyond People Meters to Measure Audience: Set Meters for Smaller Markets Can Deliver More Affordable Fix", Advertising Age, May 31, 1999, p. 46.*

(Continued)

*Primary Examiner*—Donald L Champagne
(74) *Attorney, Agent, or Firm*—Ronald E. Prass, Jr.; Prass LLP

(57) ABSTRACT

Content reaction evaluation and display systems and methods. Through the present invention, a user can easily identify how content changes impact content reactions. The present invention preferably includes a content presentation region, which allows a user to experience the content, and a content reaction display region, which allows a user to view content reactions as the content is experienced. A preferred embodiment of the present invention uses content reactions collected from set-top box event data, viewership logs, and other such data to generate the content reaction display. A preferred embodiment of the present invention also analyzes content reaction data to determine content ratings, content market share, and other such data and can present such data to the user along with the content reaction information.

38 Claims, 44 Drawing Sheets

U.S. PATENT DOCUMENTS

| | | | | |
|---|---|---|---|---|
| 4,931,865 | A | 6/1990 | Scarampi | 358/84 |
| 4,967,401 | A | 10/1990 | Barney | 367/46 |
| 5,036,389 | A | 7/1991 | Morales | 358/84 |
| 5,101,267 | A | 3/1992 | Morales-Garza | 358/84 |
| 5,155,591 | A | 10/1992 | Wachob | 358/86 |
| 5,226,177 | A * | 7/1993 | Nickerson | 725/24 |
| 5,227,874 | A | 7/1993 | Von Kohorn | 358/84 |
| 5,319,455 | A | 6/1994 | Hoarty et al. | 348/7 |
| 5,446,919 | A | 8/1995 | Wilkins | 455/6.2 |
| 5,508,731 | A | 4/1996 | Kohorn | 348/1 |
| 5,515,270 | A | 5/1996 | Weinblatt | 364/405 |
| 5,550,928 | A | 8/1996 | Lu et al. | 382/116 |
| 5,594,934 | A | 1/1997 | Lu et al. | 455/2 |
| 5,710,884 | A | 1/1998 | Dedrick | 395/200.47 |
| 5,721,583 | A | 2/1998 | Harada et al. | 348/12 |
| 5,734,720 | A | 3/1998 | Salganicoff | 380/20 |
| 5,757,417 | A | 5/1998 | Aras et al. | 348/10 |
| 5,758,257 | A | 5/1998 | Herz et al. | 455/2 |
| 5,759,101 | A | 6/1998 | Von Kohorn | 463/40 |
| 5,771,307 | A | 6/1998 | Lu et al. | 382/116 |
| 5,796,952 | A | 8/1998 | Davis et al. | 395/200.54 |
| 5,812,642 | A * | 9/1998 | Leroy | 379/92.01 |
| 5,842,199 | A | 11/1998 | Miller et al. | 707/2 |
| 5,848,396 | A | 12/1998 | Gerace | 705/10 |
| 5,915,243 | A | 6/1999 | Smolen | 705/14 |
| 5,973,683 | A | 10/1999 | Cragun et al. | 345/327 |
| 5,983,214 | A | 11/1999 | Lang et al. | 707/1 |
| 6,055,491 | A | 4/2000 | Biliris et al. | 702/176 |
| 6,070,147 | A | 5/2000 | Harms et al. | 705/14 |
| 6,169,542 | B1 | 1/2001 | Hooks et al. | 345/327 |
| 6,202,210 | B1 | 3/2001 | Ludtke | 725/20 |
| 6,285,983 | B1 | 9/2001 | Jenkins | 705/10 |
| 6,298,482 | B1 * | 10/2001 | Seidman et al. | 725/101 |
| 6,317,881 | B1 | 11/2001 | Shah-Nazaroff et al. | 725/24 |
| 6,327,574 | B1 | 12/2001 | Kramer et al. | 705/14 |
| 6,339,842 | B1 | 1/2002 | Fernandez et al. | 725/133 |
| 6,393,407 | B1 | 5/2002 | Middleton, III et al. | 705/14 |
| 6,400,996 | B1 * | 6/2002 | Hoffberg et al. | 700/83 |
| 6,405,370 | B1 | 6/2002 | Jarrell | 725/14 |
| 6,463,585 | B1 | 10/2002 | Hendricks | 725/35 |
| 6,539,391 | B1 | 3/2003 | DuMouchel et al. | 707/101 |
| 7,231,357 | B1 * | 6/2007 | Shanman et al. | 705/14 |
| 2001/0003099 | A1 | 6/2001 | Von Kohorn | 463/40 |
| 2001/0020236 | A1 | 9/2001 | Cannon | 707/1 |
| 2001/0021994 | A1 | 9/2001 | Nash | 725/42 |
| 2001/0048439 | A1 | 12/2001 | Young | 345/473 |
| 2002/0010620 | A1 | 1/2002 | Kowalchuk et al. | 705/10 |
| 2002/0010919 | A1 | 1/2002 | Lu et al. | 725/18 |
| 2002/0053077 | A1 | 5/2002 | Shah-Nazaroff et al. | 725/13 |
| 2002/0094513 | A1 | 7/2002 | Weir et al. | 434/350 |
| 2002/0138830 | A1 | 9/2002 | Nagaoka et al. | 725/14 |
| 2002/0144259 | A1 | 10/2002 | Gutta et al. | 725/10 |
| 2003/0172374 | A1 * | 9/2003 | Vinson et al. | 725/9 |

OTHER PUBLICATIONS

Jakob Nielsen, Bellcore (Moderator); Lynda Hardman, OWL; Anne Nicol, Consultant; Nicole Yankelovich, IRIS; "Panel: The Nielsen Ratings: Hypertext Reviews" ACM Press, New York, NY, USA; pp. 359-360, Dec. 1991.

William L. Thomas; Nielsen Media Research, Dunedin, FL "Television Audience Research Technology, Today's Systems and Tomorrow's Challenges", IEEE Xplore, vol. 38, Issue: 3, pp. xxxix-xlii, Aug. 1992.

Yulia Gel; Andrey Barbabanov, "Convergence Analysis of the Least-Squares Estimates For Infinte AR Models", Mälardalen University; Saint-Petersburg State University, pp. 1-9.

Maintained by J.C. Evans, "Phys 251—Introduction to Computer Techniques in Physics Data Analysis Basics," pp. 1-2, Latest Modification: Oct. 12, 2000.

R.E. White, Undergraduate Computational Engineering and Science, "Overdetermined Systems and Curve Fitting to Data", Copyright 1994, pp. 1-38.

A.J. Gao, Decision and Control, 1994, Proceedings of the 3 IEEE Conference, vol. 4, "Weighted Least Squares Algorithm for Continuous-time Model," Lake Buena Vista, FL, Dec. 1994, 0-7803-1968-0/94, 1994 IEEE, pp. 1-4.

Dan Schiller, University of California, San Diego, Publisher ACM Press, New York, NY, USA, ISSN: 1091-3556, 1997, "Internet Television: Net Makeover?" pp. 1-8.

Catherine Lawson, J. Bert Keats, Douglas C. Montgomery, "Comparison of Robust and Least-Squares Regression in Computer-Generated Probability Plots", IEEE Transactions on Reliability, vol. 46, No. 1, Mar. 1997, 0018-9529/97 1997 IEEE, pp. 1-10.

Rudolf J. Freund, William Wilson, "Regression Analysis—Statistical Modeling of a Response Variable," Copyright 1998 by Academic Press, San Diego, CA.

* cited by examiner

Figure 22(a)

|  |  | Race Caucasian American | African American | Asian / Pacific Islander | Hispanic | Native American | Indo-Pakistani | African | Middle-Eastern |
|---|---|---|---|---|---|---|---|---|---|
| Monday | 0:00 |  |  |  |  |  |  |  |  |
|  | 1:00 |  |  |  |  |  |  |  |  |
|  | 2:00 |  |  |  |  |  |  |  |  |
|  | 3:00 |  |  |  |  |  |  |  |  |
|  | 4:00 |  |  |  |  |  |  |  |  |
|  | 5:00 |  |  |  |  |  |  |  |  |
|  | 6:00 |  |  |  |  |  |  |  |  |
|  | 7:00 |  |  |  |  |  |  |  |  |
|  | 8:00 |  |  |  |  |  |  |  |  |
|  | 9:00 |  |  |  |  |  |  |  |  |
|  | 10:00 |  |  |  |  |  |  |  |  |
|  | 11:00 |  |  |  |  |  |  |  |  |
|  | 12:00 |  |  |  |  |  |  |  |  |
|  | 13:00 |  |  |  |  |  |  |  |  |
|  | 14:00 |  |  |  |  |  |  |  |  |
|  | 15:00 |  |  |  |  |  |  |  |  |
|  | 16:00 |  |  |  |  |  |  |  |  |
|  | 17:00 |  |  |  |  |  |  |  |  |
|  | 18:00 |  |  |  |  |  |  |  |  |
|  | 19:00 |  |  |  |  |  |  |  |  |
|  | 20:00 |  |  |  |  |  |  |  |  |
|  | 21:00 |  |  |  |  |  |  |  |  |
|  | 22:00 |  |  |  |  |  |  |  |  |
|  | 23:00 |  |  |  |  |  |  |  |  |
| Tuesday | 0:00 |  |  |  |  |  |  |  |  |
|  | 1:00 |  |  |  |  |  |  |  |  |
|  | 2:00 |  |  |  |  |  |  |  |  |
|  | 3:00 |  |  |  |  |  |  |  |  |
|  | 4:00 |  |  |  |  |  |  |  |  |
|  | 5:00 |  |  |  |  |  |  |  |  |
|  | 6:00 |  |  |  |  |  |  |  |  |
|  | 7:00 |  |  |  |  |  |  |  |  |
|  | 8:00 |  |  |  |  |  |  |  |  |
|  | 9:00 |  |  |  |  |  |  |  |  |
|  | 10:00 |  |  |  |  |  |  |  |  |
|  | 11:00 |  |  |  |  |  |  |  |  |
|  | 12:00 |  |  |  |  |  |  |  |  |
|  | 13:00 |  |  |  |  |  |  |  |  |
|  | 14:00 |  |  |  |  |  |  |  |  |
|  | 15:00 |  |  |  |  |  |  |  |  |
|  | 16:00 |  |  |  |  |  |  |  |  |
|  | 17:00 |  |  |  |  |  |  |  |  |
|  | 18:00 |  |  |  |  |  |  |  |  |
|  | 19:00 |  |  |  |  |  |  |  |  |
|  | 20:00 |  |  |  |  |  |  |  |  |
|  | 21:00 |  |  |  |  |  |  |  |  |
|  | 22:00 |  |  |  |  |  |  |  |  |
|  | 23:00 |  |  |  |  |  |  |  |  |

|  |  | Education Elementary School | Junior High Shool | High School | Some College | Associate's Degree | Bachelor's Degree | Master's Degree or Above |
|---|---|---|---|---|---|---|---|---|
| Monday | 0.00 | | | | | | | |
| | 1:00 | | | | | | | |
| | 2:00 | | | | | | | |
| | 3.00 | | | | | | | |
| | 4.00 | | | | | | | |
| | 5 00 | | | | | | | |
| | 6 00 | | | | | | | |
| | 7 00 | | | | | | | |
| | 8 00 | | | | | | | |
| | 9 00 | | | | | | | |
| | 10.00 | | | | | | | |
| | 11 00 | | | | | | | |
| | 12.00 | | | | | | | |
| | 13 00 | | | | | | | |
| | 14 00 | | | | | | | |
| | 15.00 | | | | | | | |
| | 16 00 | | | | | | | |
| | 17 00 | | | | | | | |
| | 18 00 | | | | | | | |
| | 19 00 | | | | | | | |
| | 20·00 | | | | | | | |
| | 21·00 | | | | | | | |
| | 22.00 | | | | | | | |
| | 23 00 | | | | | | | |
| Tuesday | 0 00 | | | | | | | |
| | 1·00 | | | | | | | |
| | 2.00 | | | | | | | |
| | 3 00 | | | | | | | |
| | 4.00 | | | | | | | |
| | 5:00 | | | | | | | |
| | 6:00 | | | | | | | |
| | 7:00 | | | | | | | |
| | 8:00 | | | | | | | |
| | 9:00 | | | | | | | |
| | 10 00 | | | | | | | |
| | 11·00 | | | | | | | |
| | 12.00 | | | | | | | |
| | 13.00 | | | | | | | |
| | 14 00 | | | | | | | |
| | 15 00 | | | | | | | |
| | 16 00 | | | | | | | |
| | 17 00 | | | | | | | |
| | 18 00 | | | | | | | |
| | 19 00 | | | | | | | |
| | 20 00 | | | | | | | |
| | 21 00 | | | | | | | |
| | 22 00 | | | | | | | |
| | 23 00 | | | | | | | |

| | | Race Caucasian American | African American | Asian / Pacific | Hispanic | Native American | Indo-Pakistani | African | Middle-Eastern |
|---|---|---|---|---|---|---|---|---|---|
| Wednesday | 0:00 | | | | | | | | |
| | 1:00 | | | | | | | | |
| | 2:00 | | | | | | | | |
| | 3:00 | | | | | | | | |
| | 4:00 | | | | | | | | |
| | 5:00 | | | | | | | | |
| | 6:00 | | | | | | | | |
| | 7:00 | | | | | | | | |
| | 8:00 | | | | | | | | |
| | 9:00 | | | | | | | | |
| | 10:00 | | | | | | | | |
| | 11:00 | | | | | | | | |
| | 12:00 | | | | | | | | |
| | 13:00 | | | | | | | | |
| | 14:00 | | | | | | | | |
| | 15:00 | | | | | | | | |
| | 16:00 | | | | | | | | |
| | 17:00 | | | | | | | | |
| | 18:00 | | | | | | | | |
| | 19:00 | | | | | | | | |
| | 20:00 | | | | | | | | |
| | 21:00 | | | | | | | | |
| | 22:00 | | | | | | | | |
| | 23:00 | | | | | | | | |
| Thursday | 0:00 | | | | | | | | |
| | 1:00 | | | | | | | | |
| | 2:00 | | | | | | | | |
| | 3:00 | | | | | | | | |
| | 4:00 | | | | | | | | |
| | 5:00 | | | | | | | | |
| | 6:00 | | | | | | | | |
| | 7:00 | | | | | | | | |
| | 8:00 | | | | | | | | |
| | 9:00 | | | | | | | | |
| | 10:00 | | | | | | | | |
| | 11:00 | | | | | | | | |
| | 12:00 | | | | | | | | |
| | 13:00 | | | | | | | | |
| | 14:00 | | | | | | | | |
| | 15:00 | | | | | | | | |
| | 16:00 | | | | | | | | |
| | 17:00 | | | | | | | | |
| | 18:00 | | | | | | | | |
| | 19:00 | | | | | | | | |
| | 20:00 | | | | | | | | |
| | 21:00 | | | | | | | | |
| | 22:00 | | | | | | | | |
| | 23:00 | | | | | | | | |

Figure 22(f)

|  | Income | 25,001-35,000 | 35,001-45,000 | 45,001-55,000 | 55,001-65,000 | 65,001-75,000 | 75,001-85,000 | 85,001-100,000 | 100,001-125,000 | 125,001-150,000 | 150,001+ |
|---|---|---|---|---|---|---|---|---|---|---|---|
|  | 0-25,000 | | | | | | | | | | |
| Wednesday 0:00 | | | | | | | | | | | |
| 1:00 | | | | | | | | | | | |
| 2:00 | | | | | | | | | | | |
| 3:00 | | | | | | | | | | | |
| 4:00 | | | | | | | | | | | |
| 5:00 | | | | | | | | | | | |
| 6:00 | | | | | | | | | | | |
| 7:00 | | | | | | | | | | | |
| 8:00 | | | | | | | | | | | |
| 9:00 | | | | | | | | | | | |
| 10:00 | | | | | | | | | | | |
| 11:00 | | | | | | | | | | | |
| 12:00 | | | | | | | | | | | |
| 13:00 | | | | | | | | | | | |
| 14:00 | | | | | | | | | | | |
| 15:00 | | | | | | | | | | | |
| 16:00 | | | | | | | | | | | |
| 17:00 | | | | | | | | | | | |
| 18:00 | | | | | | | | | | | |
| 19:00 | | | | | | | | | | | |
| 20:00 | | | | | | | | | | | |
| 21:00 | | | | | | | | | | | |
| 22:00 | | | | | | | | | | | |
| 23:00 | | | | | | | | | | | |
| Thursday 0:00 | | | | | | | | | | | |
| 1:00 | | | | | | | | | | | |
| 2:00 | | | | | | | | | | | |
| 3:00 | | | | | | | | | | | |
| 4:00 | | | | | | | | | | | |
| 5:00 | | | | | | | | | | | |
| 6:00 | | | | | | | | | | | |
| 7:00 | | | | | | | | | | | |
| 8:00 | | | | | | | | | | | |
| 9:00 | | | | | | | | | | | |
| 10:00 | | | | | | | | | | | |
| 11:00 | | | | | | | | | | | |
| 12:00 | | | | | | | | | | | |
| 13:00 | | | | | | | | | | | |
| 14:00 | | | | | | | | | | | |
| 15:00 | | | | | | | | | | | |
| 16:00 | | | | | | | | | | | |
| 17:00 | | | | | | | | | | | |
| 18:00 | | | | | | | | | | | |
| 19:00 | | | | | | | | | | | |
| 20:00 | | | | | | | | | | | |
| 21:00 | | | | | | | | | | | |
| 22:00 | | | | | | | | | | | |
| 23:00 | | | | | | | | | | | |

Figure 22(g)

| | Education | | | | | | |
|---|---|---|---|---|---|---|---|
| | Elementary School | Junior High School | High School | Some College | Associate's Degree | Bachelor's Degree | Master's Degree or Above |
| Wednesday 0.00 | | | | | | | |
| 1.00 | | | | | | | |
| 2.00 | | | | | | | |
| 3.00 | | | | | | | |
| 4.00 | | | | | | | |
| 5.00 | | | | | | | |
| 6.00 | | | | | | | |
| 7.00 | | | | | | | |
| 8.00 | | | | | | | |
| 9.00 | | | | | | | |
| 10.00 | | | | | | | |
| 11.00 | | | | | | | |
| 12.00 | | | | | | | |
| 13.00 | | | | | | | |
| 14:00 | | | | | | | |
| 15:00 | | | | | | | |
| 16:00 | | | | | | | |
| 17.00 | | | | | | | |
| 18.00 | | | | | | | |
| 19.00 | | | | | | | |
| 20.00 | | | | | | | |
| 21.00 | | | | | | | |
| 22.00 | | | | | | | |
| 23:00 | | | | | | | |
| Thursday 0.00 | | | | | | | |
| 1.00 | | | | | | | |
| 2.00 | | | | | | | |
| 3.00 | | | | | | | |
| 4.00 | | | | | | | |
| 5.00 | | | | | | | |
| 6.00 | | | | | | | |
| 7.00 | | | | | | | |
| 8.00 | | | | | | | |
| 9.00 | | | | | | | |
| 10.00 | | | | | | | |
| 11.00 | | | | | | | |
| 12.00 | | | | | | | |
| 13.00 | | | | | | | |
| 14.00 | | | | | | | |
| 15.00 | | | | | | | |
| 16:00 | | | | | | | |
| 17:00 | | | | | | | |
| 18:00 | | | | | | | |
| 19.00 | | | | | | | |
| 20:00 | | | | | | | |
| 21.00 | | | | | | | |
| 22:00 | | | | | | | |
| 23:00 | | | | | | | |

|  | | Race Caucasian American | African American | Asian / Pacific Islander | Hispanic | Native American | Indo-Pakistani | African | Middle-Eastern |
|---|---|---|---|---|---|---|---|---|---|
| Friday | 0:00 | | | | | | | | |
| | 1:00 | | | | | | | | |
| | 2:00 | | | | | | | | |
| | 3:00 | | | | | | | | |
| | 4:00 | | | | | | | | |
| | 5:00 | | | | | | | | |
| | 6:00 | | | | | | | | |
| | 7:00 | | | | | | | | |
| | 8:00 | | | | | | | | |
| | 9:00 | | | | | | | | |
| | 10:00 | | | | | | | | |
| | 11:00 | | | | | | | | |
| | 12:00 | | | | | | | | |
| | 13:00 | | | | | | | | |
| | 14:00 | | | | | | | | |
| | 15:00 | | | | | | | | |
| | 16:00 | | | | | | | | |
| | 17:00 | | | | | | | | |
| | 18:00 | | | | | | | | |
| | 19:00 | | | | | | | | |
| | 20:00 | | | | | | | | |
| | 21:00 | | | | | | | | |
| | 22:00 | | | | | | | | |
| | 23:00 | | | | | | | | |
| Saturday | 0:00 | | | | | | | | |
| | 1:00 | | | | | | | | |
| | 2:00 | | | | | | | | |
| | 3:00 | | | | | | | | |
| | 4:00 | | | | | | | | |
| | 5:00 | | | | | | | | |
| | 6:00 | | | | | | | | |
| | 7:00 | | | | | | | | |
| | 8:00 | | | | | | | | |
| | 9:00 | | | | | | | | |
| | 10:00 | | | | | | | | |
| | 11:00 | | | | | | | | |
| | 12:00 | | | | | | | | |
| | 13:00 | | | | | | | | |
| | 14:00 | | | | | | | | |
| | 15:00 | | | | | | | | |
| | 16:00 | | | | | | | | |
| | 17:00 | | | | | | | | |
| | 18:00 | | | | | | | | |
| | 19:00 | | | | | | | | |
| | 20:00 | | | | | | | | |
| | 21:00 | | | | | | | | |
| | 22:00 | | | | | | | | |
| | 23:00 | | | | | | | | |
| Sunday | 0:00 | | | | | | | | |
| | 1:00 | | | | | | | | |
| | 2:00 | | | | | | | | |
| | 3:00 | | | | | | | | |
| | 4:00 | | | | | | | | |
| | 5:00 | | | | | | | | |
| | 6:00 | | | | | | | | |
| | 7:00 | | | | | | | | |
| | 8:00 | | | | | | | | |
| | 9:00 | | | | | | | | |
| | 10:00 | | | | | | | | |
| | 11:00 | | | | | | | | |
| | 12:00 | | | | | | | | |
| | 13:00 | | | | | | | | |
| | 14:00 | | | | | | | | |
| | 15:00 | | | | | | | | |
| | 16:00 | | | | | | | | |
| | 17:00 | | | | | | | | |
| | 18:00 | | | | | | | | |
| | 19:00 | | | | | | | | |
| | 20:00 | | | | | | | | |
| | 21:00 | | | | | | | | |
| | 22:00 | | | | | | | | |
| | 23:00 | | | | | | | | |

Figure 22(j)

| | Income | | | | | | | | | | |
|---|---|---|---|---|---|---|---|---|---|---|---|
| | 0-25,000 | 25,001-35,000 | 35,001-45,000 | 45,001-55,000 | 55,001-65,000 | 65,001-75,000 | 75,001-85,000 | 85,001-100,000 | 100,000-125,000 | 125,001-150,000 | 150,000+ |
| Friday 0:00 – 23:00 | | | | | | | | | | | |
| Saturday 0:00 – 23:00 | | | | | | | | | | | |
| Sunday 0:00 – 23:00 | | | | | | | | | | | |

Figure 22(k)

|  | Education | | | | | | |
|---|---|---|---|---|---|---|---|
|  | Elementary School | Junior High School | High School | Some College | Associate's Degree | Bachelor's Degree | Master's Degree or Above |
| Friday 0:00 – 23:00 | | | | | | | |
| Saturday 0:00 – 23:00 | | | | | | | |
| Sunday 0:00 – 23:00 | | | | | | | |

CONTENT REACTION DISPLAY

REFERENCE TO RELATED APPLICATIONS

The present application is a CIP of and claims priority to U.S. patent application Ser. No. 10/020,512, filed Dec. 18, 2001, now U.S. Pat. No. 7,146,329 which is a CIP of U.S. patent application Ser. No. 09/759,640, filed Jan. 16, 2001, now U.S. Pat. No. 7,139,723 which claims priority to U.S. Provisional Patent Application Ser. No. 60/176,177, filed Jan. 13, 2000, and the teachings of the above-referenced applications are incorporated herein by reference in their entirety.

FIELD OF THE INVENTION

The present invention relates to the field of data analysis. In a preferred embodiment, the present particularly provides a system and method for analyzing privacy-compliant set-top box data to determine content ratings, share, demographic characteristics, and the like.

BACKGROUND OF THE INVENTION

Advertisers tend to group prospective customers into broad demographic and geographic categories, possibly due to limitations in currently available market research methods with respect to determination of the effect of their advertisements. In addition, they use information gleaned from data mining to mass-market products to groups of prospective buyers. Unfortunately, the data searched during this data mining often contains low-validity information that is derived from small sample populations.

Due to these inherent data validity problems, statistics generated by such data mining may not accurately reflect a given market. That is, the statistics may not mean that all persons in a group will buy a product, but rather they imply that some person in a group may have a higher probability of buying the product than someone in another categorized group. For example, the data mining may show that more scuba equipment could be sold to 20-40 year-olds in Miami than to 50-80 year-olds in Kansas City.

Based on this data, advertisers carefully select the television shows, magazines, billboards, or other media on or in which their advertisements run. In the case of television, advertisers traditionally gravitate toward programs that garner higher ratings for desired audiences and then select advertising slots within those shows. Advertisers purchase ratings data from market research organizations, who collect and analyze data on the viewing habits of individuals and then publish the results.

Examples of such research organizations include A. C. Nielson and Arbitron. Such companies typically monitor television-viewing habits of a relatively small number of viewers through telephone polls, specialized set-top monitoring "Nielson" boxes, or viewer diaries. The results of these surveys are then extrapolated to the population at large.

As can be expected, extrapolation of small-population data to the population at large is prone to many different limitations, with accuracy perhaps the most notable. For example, if there were only 200 persons over 65 years of age in a sample, their compiled viewing behaviors may be purported to be representative of the viewing behaviors of the 35 million people in the U.S. over 65 years of age.

Obviously, larger, more random sample populations are preferred over smaller sample populations. This is true because a larger sample population tends to reduce the impact of suspect behaviors. Such suspect behavior might include distorted or inaccurate information provided in written television viewing logs, or intentionally leaving the television "on" to a certain channel to insure higher ratings for a desired show even if the individual being sampled is not watching that show. If the behavior of even one of the 200 persons in the previous example was suspect, this may translate to errors in the predictions of approximately 175,000 people; if the sample population is increased to 50,000 people, an individual whose behavior was suspect would translate into prediction errors for only approximately 700 people. As advertisers continue to base their decisions on small-sample data, they are continuing to question whether their advertisements are reaching intended audiences.

While accuracy is certainly a big problem in the prior art, it is not the only problem. Another limitation is the specificity with which behaviors may be inferred as they pertain to specific demographic groups. For example, if only one of 200 sampled senior citizens is a single Asian with no dependents and has an annual income over $100,000, making an inference based on this more specific group is likely to be highly inaccurate; in many cases the behaviors of an entire demographic sub-group are attributed to the sampled behavior of only one person.

Another factor contributing to the inaccuracy of prior art is reliability. Invasive sampling methods such as those described above can cause many problems, including determining how much of the data can be trusted. Sampled individuals may not to be willing to disclose, for example, that they watch adult (e.g., X-rated) programming or other controversial programming. Without such information, all data generated becomes unreliable.

Still another problem is that even if the sample data can be trusted, the memory of a sampled individual or the ability of a sampled individual to adhere to documented guidelines may not be accurate or complete. If a given individual is asked what they watched last week, the likelihood that the response may be correct and specific is likely to be low. Often, low response rates or missing journal information are extrapolated according to previously collected data and rules determined therefrom. However, this extrapolation is built on data generated through the inherently faulty means described above.

The invasive sampling techniques used in the prior art also suffer from an inherent flaw. Since these methods are invasive and participation is optional, differences between the types of persons who may be willing to be sampled and those that are not willing to be sampled may not be accounted for in such techniques.

While the effects of some of the problems in the prior art can be limited by increasing the population sample size, population sample size increases are typically cost prohibitive. The increased costs are the result of several factors, including equipment purchase, installation, and repair; data collection and validation; and participant compensation.

However, even when equipment and other costs are taken out of consideration and larger samples are collected, such an increase in sampling size does not solve all of the problems in the prior art. For example, the prior art also faces a problem with data resolution. Most major media research organizations consider data in an all-or-nothing fashion. For example, if a set of channels was watched during some sampling interval, only the channel that was watched the most, or the one watched at the time of the sample, would be counted, and it would be recorded as having been watched for the entire sampling interval (typically anywhere from 30 seconds to several hours). Although some in the prior art have attempted to mitigate this effect by sampling more frequently, there is always the possibility that changes occurring between samples will be missed. Thus, the use of data collection methods employed by the prior art tends to result in the generation of misleading or inaccurate viewing data.

Data collected by media research organizations and inferences resulting therefrom face still another problem; one of substance. The fact that overlapping data is collected across different medium types (digital, written, verbal, etc.) makes the determination of common denominators difficult, and thus renders objective statistical mining impossible. Inferences drawn from such data may only be lateral in nature, and cannot be readily mined for trends. For example, while the data collected may support the conclusion that one show is more popular than another, the particular reason why one is more popular than the other cannot be extracted from this data. Such methods may be barely capable of supporting the most general popularity-type conclusions; any further analysis upon relationships of the conclusions is likely to be questionable at best, and accuracy may be lost each time more complicated, or deeper, inferences are drawn.

Unfortunately, there are many other problems with existing market research methodologies, such as the use of "Sweeps" or ratings periods, but most of these problems are at least partially statistically-correctable. However, the five major issues discussed—accuracy, group specificity, reliability, resolution, and data substance—are inherent to actively monitoring data within small samples and cannot be overcome by the prior art.

SUMMARY OF THE INVENTION

Accordingly, the present invention is directed to a content reaction display that substantially obviates one or more of the problems due to limitations and disadvantages of the related art.

It is an object of the present invention to provide content producers, and specifically management-level personnel, with detailed statistics governing content experiences (such as, but not limited to, ratings) on a second-by-second basis.

It is another object of the present invention to provide content producers, and specifically management-level personnel, with detailed demographic information concerning the user who experience a particular piece of content on a second-by-second basis.

It is still another object of the present invention to provide content producers, and specifically management-level personnel, with user flow analysis (i.e. information about how the demographics associated with particular content vary) on a second-by-second basis.

It is yet another object of the present invention to provide as much of the aforementioned information as possible in an easy to read, yet detailed format.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The data collection techniques used in the prior art arise from a model developed in the 1960's and 1970's. At that time, market research data collection and data transmission costs were very high, and a system of periodic sampling was established. A thirty second sampling window was chosen because a given household had an average of three channels available, and "surfing" was a non-existent phenomenon; thus, it was a safe assumption that the same channel was watched for the entire sampling period. Today, most television viewers have over 65 channels available to them, and they are barraged with more commercials per hour on each channel. This combination gives viewers incentive to frequently change channels within what would be a sampling period in the prior art.

Obviously, sampling methods from the 1970's are not capable of accurately representing television viewing habits in the year 2000 and beyond. Thus, a need exists to more accurately sample viewer data, insure the data collected is not suspect, infer from such data relationships and trends in viewing habits, project sampled data more accurately to the population at large, and determine not only what shows, advertisements, or other content were watched, but also but what portions of such content were watched. There also exists a need for ratings systems which can more accurately and objectively provide ratings of future programs. The data collection and data analysis aspects of the present invention can readily fulfill these needs.

A preferred embodiment of the present invention can provide advertisers with accurate ratings predictions of commercials and programs for specific demographic groups, rather than just providing overall ratings of programs which have already aired. While a preferred embodiment of the present invention involves television viewership statistics, the present invention can draw correlations between any dataset combinations, such as, but not limited to, television program or commercial viewership and sales figures, or sales figures and demographics. The present invention may provide advertisers with a better understanding of both consumer needs and their own advertising needs.

One aspect of a preferred embodiment of the present invention provides a system and method by which viewing behaviors of television viewers can be extracted electronically. While instrumentation and infrastructure development costs may be initially high, the present invention can allow data collection from a vast number of households without significant data collection, data storage, and data analysis cost increases as the number of households increases, or as the number of times data is collected per household is increased.

The present invention takes a different approach to television market data collection than the prior art. Rather than periodically sampling user behavior, the present invention tracks user behaviors by recording set-top box events. Such a set-top box may record events including, but not limited to, set-top box state changes, such as a set-top box being turned on or off, channel changes, volume changes, the use of an SAP feature, or muting of particular content; the use of interactive content guides; Internet web site usage; and combinations of such events. Recorded set-top box events data may be periodically transmitted to a central data collection point where data analysis may begin, or such transmission may occur instantaneously. In a preferred embodiment, this data collection method allows data to be gathered without requiring subjects to keep journals, push buttons, or even know their behaviors are being observed. This can be seen as an improvement over the prior art, as the invasive data collection methods used therein are likely to destroy data integrity.

The present invention also includes a method for mining compatible datasets so that correlations and trends within and between the datasets can be uncovered. The present invention is tailored to the analysis of datasets that are extremely large; result from passive, privacy-secure data collection; and are relatively unbiased, such as datasets collected by set-top boxes described above. While the analysis of television marketing data is presently preferred, it will be apparent to one skilled in the art that the system and method herein can be employed in other data collection and data analysis scenarios. Other contemplated embodiments include, but are not limited to, privacy-secure actuarial analysis, radio and Internet market data collection, and thought and behavioral predictions for artificial intelligence efforts and governmental planning.

The data mining and prediction portions of the present invention attempt to uncover the interrelated rules that cause various data to arise, and a preferred embodiment does so while still respecting privacy concerns. Privacy can be maintained through anonymous data collection, which can be accomplished through a software upgrade to a standard set-top box. In a preferred embodiment, a satellite, cable, or other television provider ("cable company") can provide a viewer with a set-top box which may be specially instrumented to allow monitoring, recording, and transmission of set-top box events, as described above.

Traditional set-top boxes include a unique identification number ("ID"), and this number can be used by a preferred embodiment of the present invention for identification purposes in lieu of personal information. To facilitate data analysis, a cable company can provide to the present invention a geographically associated code, such as, but not limited to, a zip code or telephone number prefix, that corresponds with each set-top box. Given this information, set-top box ID's to be monitored can be chosen through various means, including, but not limited to, the present invention selecting set-top box ID's at random, the present invention selecting set-top box ID's based on geographic coverage, a cable company selecting ID's based on its own criteria, or selecting all set-top box ID's. A combination of set-top box ID and geographically associated codes allows the present invention to maintain participant privacy while still allowing for determination of detailed demographic information through the inverse mathematical methods described herein.

Although privacy is an important part of the present invention, an alternative embodiment would allow set-top box operators to request a list of their viewing habits. This might be useful for parents or businesses wishing to monitor programs watched by their children or employees during a given day, or parents or businesses wishing to monitor other DATA1 datasets, such as internet viewing behaviors exhibited by employees or family members.

Analysis of data collected through a privacy-oriented approach such as the set-top box method described above is inherently self-limiting, as only viewership information for a particular show or commercial can be determined for a given time over the sample population. While this may be of interest to advertisers, an advertiser's real concern is that a show is reaching a particular target-market, and thus that they are spending their advertising money on shows which users of their products will watch. Thus, advertisers prefer detailed, grouped market research data, such as the ages, incomes, and other demographic information associated with a show's viewers. Through its novel data-correlation scheme, the preferred embodiment of the present invention can determine such information while still maintaining the anonymity of those being sampled. However, the present invention is not limited to providing only correlations between user behavior and demographic data; the present invention can draw correlations within and between any number of data sets with a common feature, such as the zip code of a given television viewer and the demographics associated with that zip code, regardless of the data represented therein.

In a preferred embodiment, the present invention augments television viewing behavior data collected from set-top boxes with relatively static data from outside sources, such as, but not limited to, demographic information from demographic providers, news information from news providers, weather information from weather providers, and sales information from advertisers, manufacturers and producers. This information can be used not only to increase the number of categories into which individuals may be grouped, but also to take into account specific confounding events, such as a severe weather alert, a national or regional news story, a local school's play-off game, and special promotional offers. Demographic, regional, and other such relatively static data may be updated at intervals specific to the type of data collected.

The present invention may make certain assumptions based on collected data to reduce data storage requirements. These assumptions are well-fitted with the use of matrix manipulation schemes. For example, the present invention may assume individual age is intrinsic to a person, household income is intrinsic to a household, and weather patterns are intrinsic to geographic regions. Thus, demographic information comprising a matrix needs not be mutually exclusive. That is, if weather is a considered factor, weather data need not be collected and stored for every person in a geographic region, but simply can be held in one matrix that can be accessed for all people living within that geographic region.

The present invention can draw inferences within and between data sets through a variety of means. In a preferred embodiment, the present invention may use inverse mathematical methods to perform the desired analyses. These methods can be more simply expressed as techniques of linear and matrix algebra.

With established data mining and data comparison methods in place, another step is to extrapolate any calculations to the rest of the country. Through the data-collection methods described above, present invention can track viewing behaviors, demographic characteristics, and preferences associated with a geographically based group of people. If this same demographic information is obtained for the country as a whole, the present invention can use the data stored therein to extrapolate out its results to any region of the country, or to the country as a whole. The present invention includes, but is not limited to, the development of an extrapolation system, which itself involves the use of mined trends and will evolve and improve over time. For example, "white males age 70-80" in the non-sample population may be considered to have more similarities with all persons age 70-80 in the sample than with whites alone due to a dominance of the age factor in whites. Due to characteristics particular to a given geographic location, such as, but not limited to, such a location including a resort community, or a local sports team in a playoff game, some factors, such as age, race, and gender, or even entire geographic regions, may be ignored in extrapolation procedures.

While some in the prior art have attempted to provide statistics similar to those available through the present invention, none have done so at confidence levels approaching those provided by the present invention. In addition, the present invention improves over the prior art by allowing the extrapolation of very specific cases, even when no data exists for that specific case. For example, if no Single Asian Males, 23-24 years old, with partial custody of 1 child, one previous marriage, with a B.S. in Chemistry, working as an assistant in a Chemical Laboratory, having an income between $24,000-$27,000 per year, and living in a specific zip code in Miami, Fla. were in the sample, the present invention could still calculate an anticipated behavior based upon combinations of subsets of these characteristics and their observed influences.

In fact, not only can the present invention infer viewing preferences and other behaviors for previously aired content, but, as additional sample data is collected, the present invention can also predict reactions to future content. The present invention can characterize previously aired content, such as a television program or a commercial, based on specific attributes thereof, such as volume changes; color changes; changes in brightness or contrast; speed of motion; background music mood; content; genres; actors appearing on the screen; plotlines; languages spoken; use of foul or offensive language; and the like. This information can then be cross-referenced against viewer reaction to that content, and suggestions can be made to make the content more appealing to a particular audience. With a database of viewer reactions to previously aired content, the present invention can also be used to analyze proposed content before it is aired, or even to suggest optimal programming content structure and substance.

It should be obvious to one skilled in the art that the system and method described in this specification are not constrained by the same limitations as traditional data collection and analysis techniques. The present invention provides non-invasive sample data collection, significantly increasing reliability. The viewing habits of increasingly specific demographic groups can be ascertained while still maintaining high accuracy levels.

Additionally, the behavior data resolution is so fine as to allow the redefinition of television viewing behavior. For example, the exact percentage of each program that each group watched can be determined. In addition, the answer to "What percentage of Group A watched at least 80% of Program 1 who watched less than 10% of Program 2 three weeks ago?" is just as easy for the computers to determine as a seemingly simpler question. Furthermore, event data for every set-top box and geographic region can be archived as a large, unbiased database of 1's and 0's; therefore mining the data for trends would entail literally 0% loss of related-accuracy. This is to say that the data's substance is the same regardless of specificity of analysis.

It should also be obvious to one skilled in the art that the system and method described above can be used not only to rate television programs, but, unlike the prior art, the present invention can also rate television advertisements. The prior art is limited to television program ratings because the sampling periods required to accurately rate television advertisements would result in more data than can be accurately collected, handled and characterized by the prior art. The novel data collection method described above provides viewer behavior data at a finer resolution than is possible through the sampling methods implemented by the prior art, and can thus be used to determine viewer behavior at any instant, including sections during a commercial.

Once data is collected, a further aspect of the present invention provides advertisers or others wishing to analyze the data with an interactive interface for such data analysis. Such an interface can allow data analysis requests to be entered through a variety of interfaces, such as through command-line queries, graphical interfaces, or even as natural-language questions. Further, an output representation may be selected, including, but not limited to, raw data, pie chart, time-progression, and the like. The present invention may further track frequently requested analyses and automatically update those on a periodic basis to expedite delivery of such information.

While the present invention improves over the prior art when evaluated using current advertising schemes, the present invention can also allow a new type of advertising. Rather than an advertiser purchasing time during a given show that is broadcast to a large audience, many of whom may not be in a product's target audience, the present invention may allow advertisements to be delivered to only those set-top boxes whose viewers exhibit certain behaviors or exhibit a propensity toward specific products or services. This allows advertisers to directly reach those viewers who would be interested in an advertiser's product or service, thus decreasing the cost per viewer of running such advertisements. A very simple example of such is continuing to show bicycle-related commercials to those who haven't turned the channel when bicycles have been shown in the past, or have recently bought or searched online for a bicycle.

The system and methods of the present invention also allow content producers to evaluate content effectiveness or appeal to a given demographic. The present invention even allows such analysis on a second-by-second basis, a resolution which prior art systems have been unable to achieve due to the data collection techniques used. Through the present invention, a content producer can determine a specific time at which users of a specific demographic stopped experiencing or otherwise interacted with the content in question, and can readily draw a correlation between such interactions and the content itself.

For example, the present invention provides a method of evaluating content reactions by collecting content reaction data and identifiers associated with the content or the user/household creating the data, storing the data and identifiers in a database, presenting the content to a television executive or other reviewing user, and simultaneously presenting the content reaction data, and an analysis of the content reaction data, to the reviewing user. The analysis provided by the present invention in such an embodiment can include the ratings and share associated with the content as derived from the database of content reaction data. In addition, the present invention can allow a reviewing user to interact with the content and content reaction data to obtain a more detailed analysis thereof or an overview of the content reaction data as desired by the reviewing user. While the content reaction data is preferably comprised of set-top box event data, it should be apparent to one skilled in the art that alternative data can be substituted therefor without departing from the spirit or the scope of the present invention. By way of example, without intending to limit the present invention, traditional viewership logs, such as those created by users participating in A. C. Nielsen or Nielsen Media Research ratings surveys, can be used in the present invention.

Thus, it can be seen that the present invention represents significant improvements over the prior art. Not only can the present invention collect more reliable data through its use of private, non-invasive data collection techniques, but the present invention can also provide data which lends itself to more advanced, thorough, and privacy-secure analysis techniques. The present invention can also analyze data more accurately than data analysis and data mining techniques of the prior art. Further, the present invention allows data analyses to be performed on behaviors observed from a larger portion of the population than the prior art, and can more accurately extrapolate such data to the population in general.

DESCRIPTION OF THE DRAWINGS

Figure 22A:
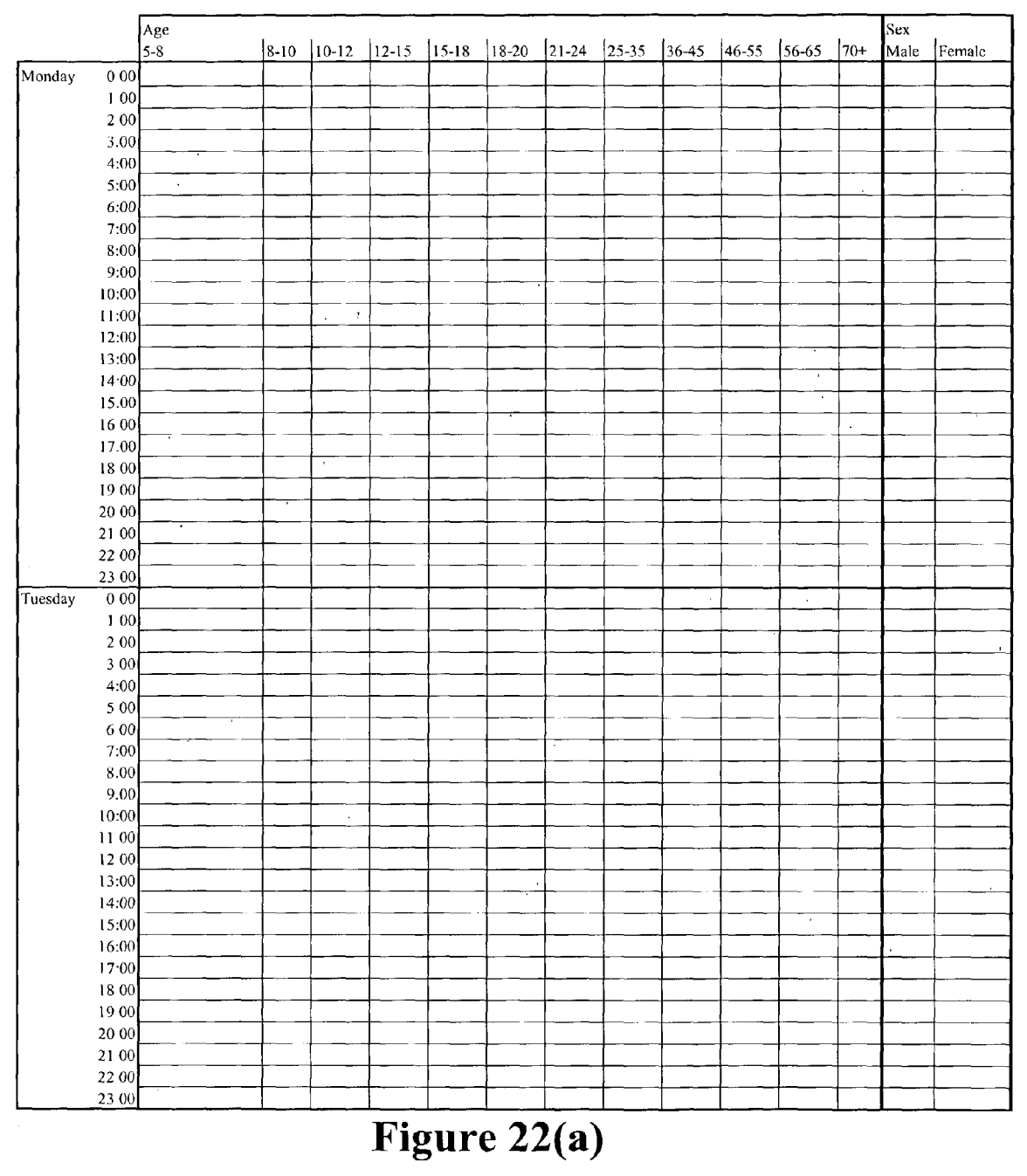
Figure 22C:
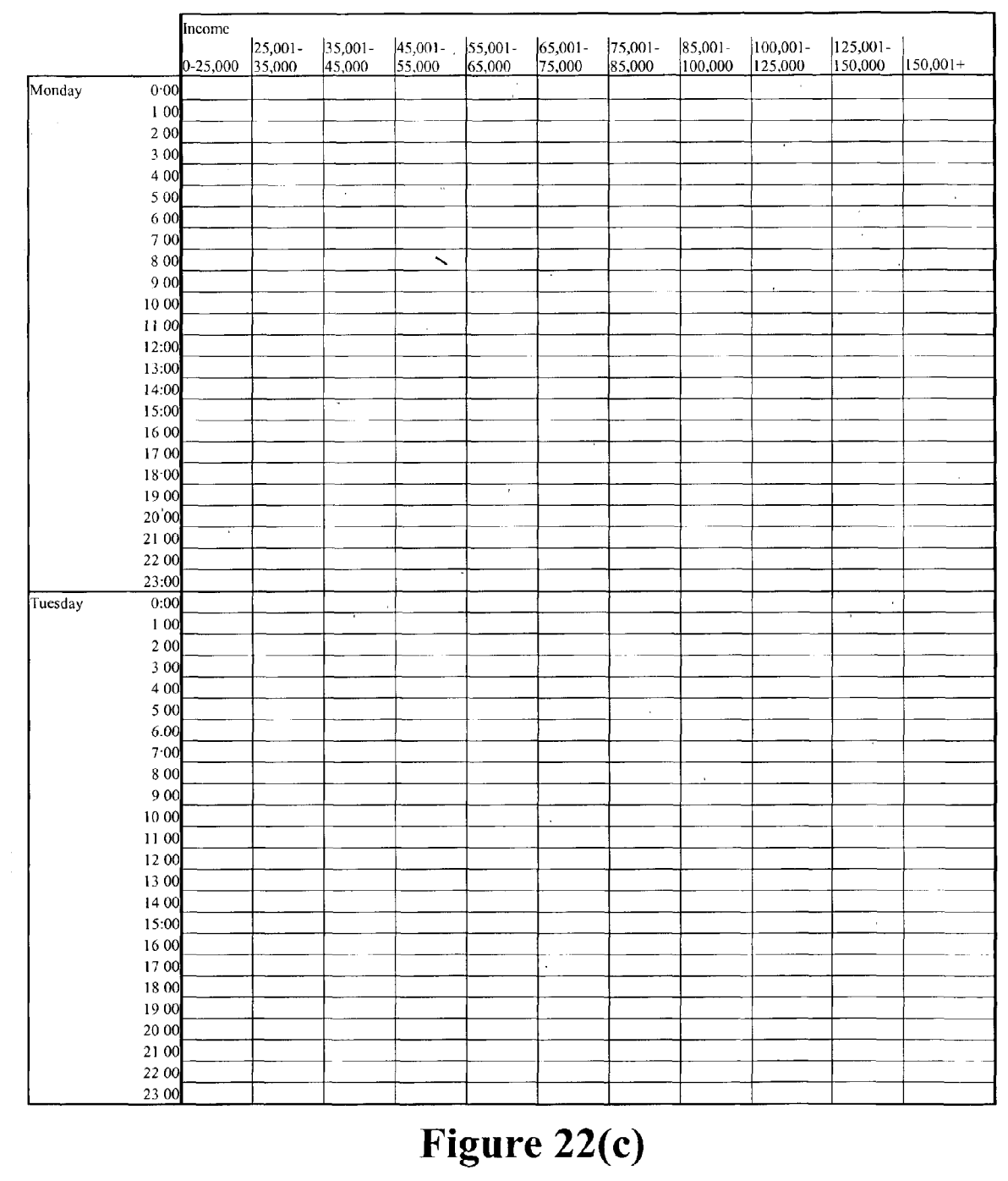
Figure 22E:
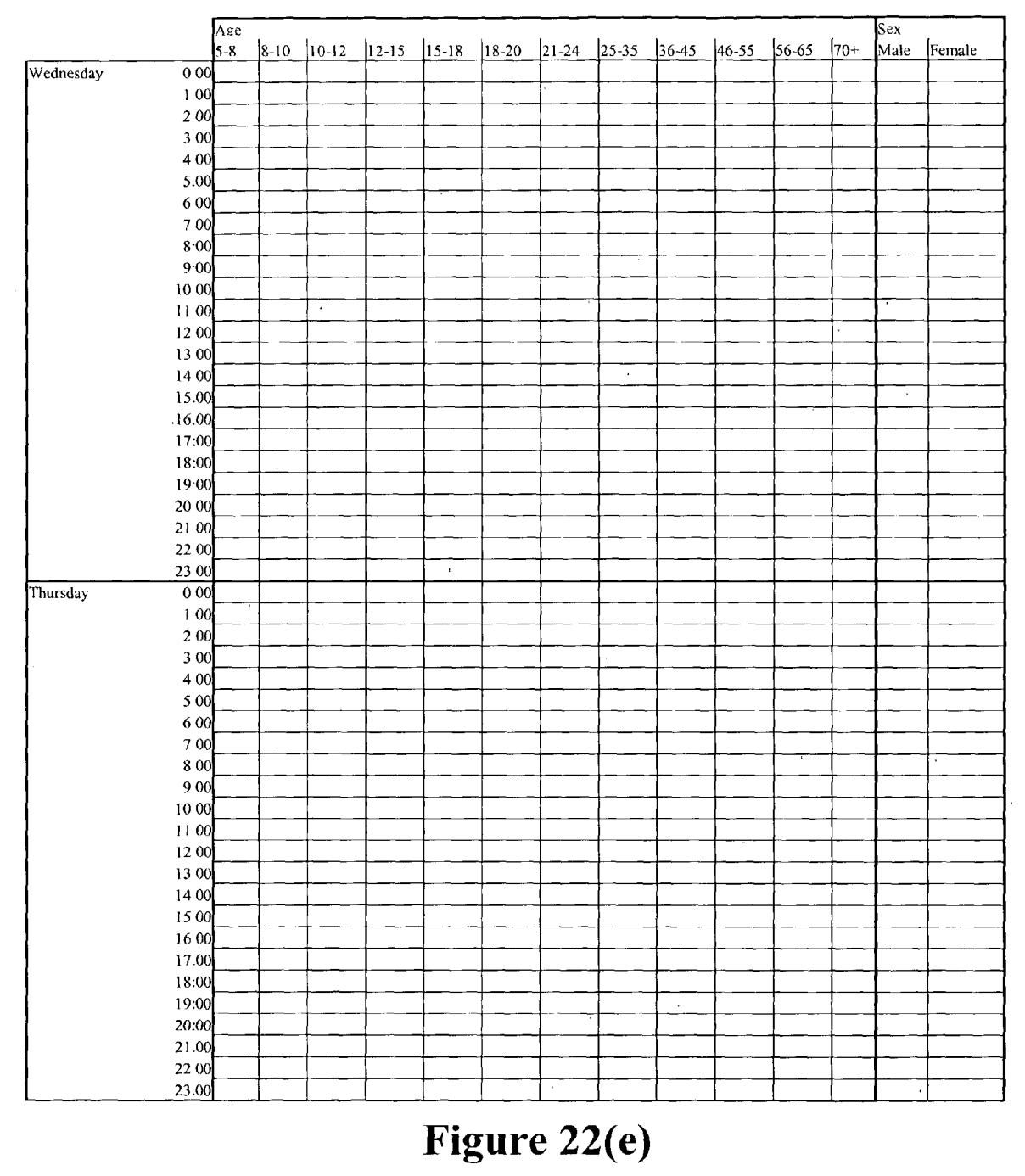
Figure 22I:
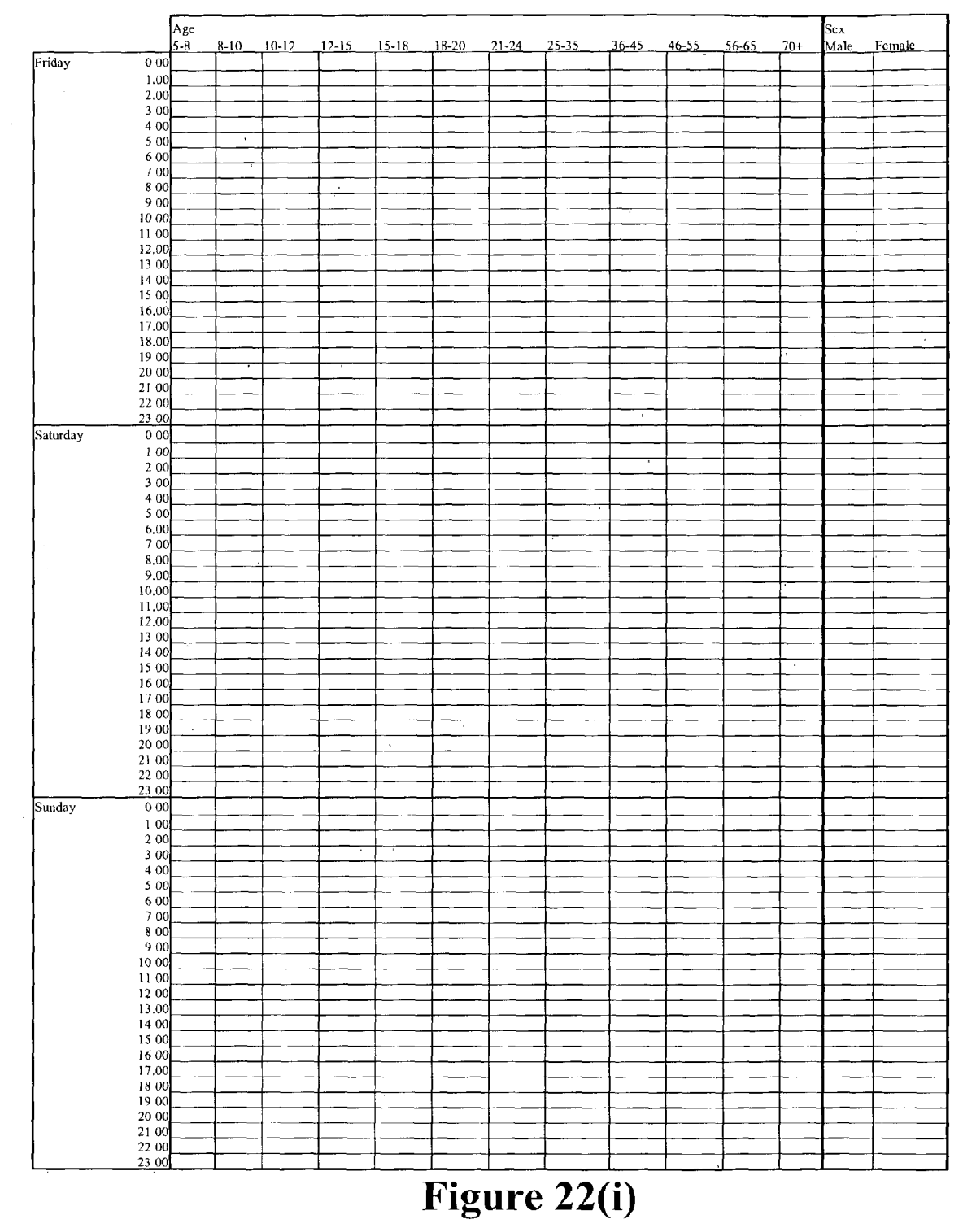

FIGS. 22(a) through 22(l) are components of a sample STB demographic table.

FIG. 28 is a screen capture of a preferred sub-account information display screen.

DETAILED DESCRIPTION OF THE PREFERRED EMBODIMENT

Figure 1:
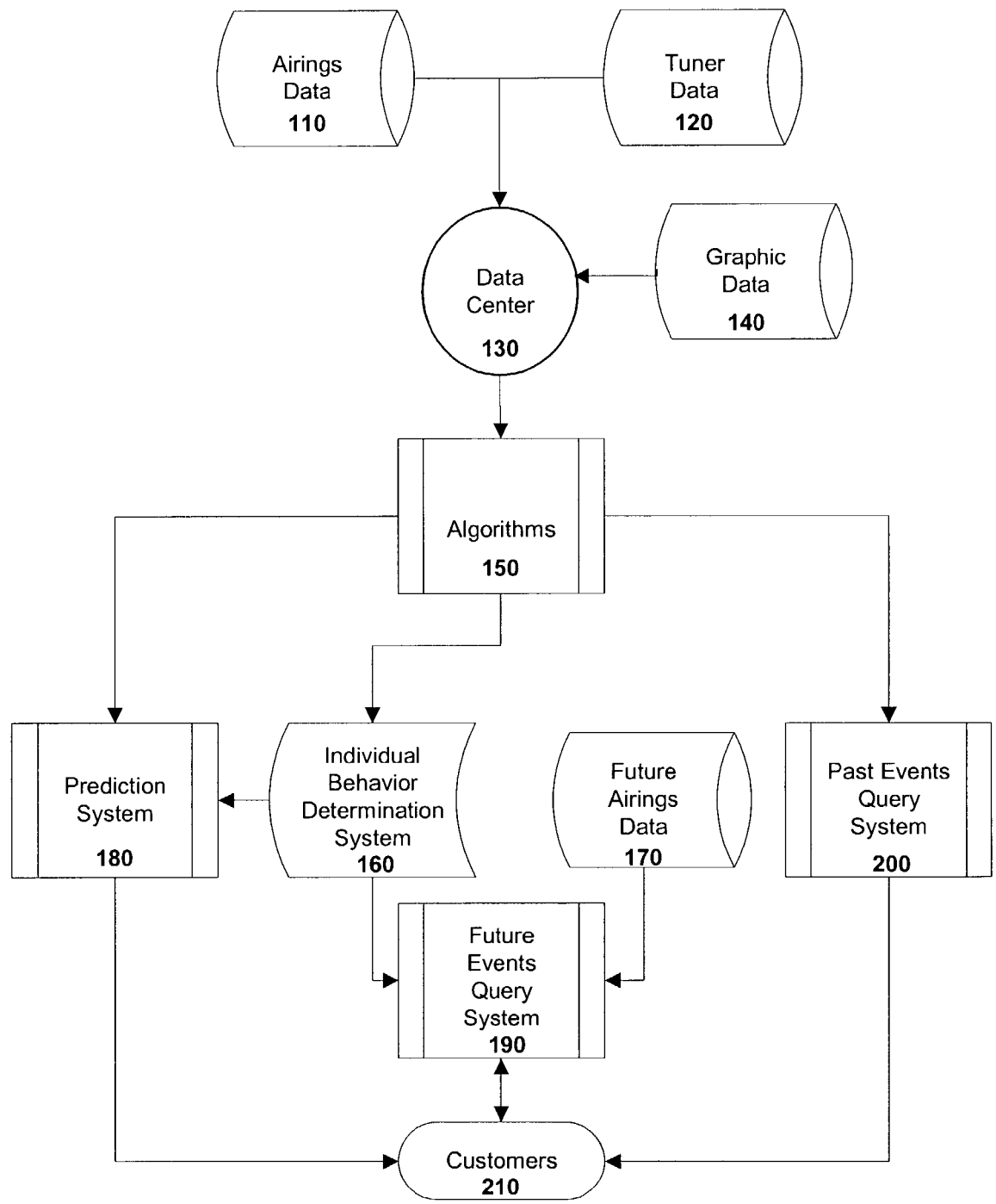
FIG. 1 is a block diagram providing a general overview of the consumer data acquisition, prediction, and query system of the present invention.

FIG. 1 is a block diagram providing a general overview of consumer data acquisition, prediction, and query systems of a preferred embodiment of the present invention and their interaction with each other. In this embodiment, the present invention may monitor user behavior while a user experiences television, radio, Internet, or other content. Examples of such content can include television shows, radio shows, music, advertisements, news, weather, and other multimedia or sensory-stimulating material.

Airings Data 110 comprises detailed content attributes. Examples of such content attributes include times at which such content was available; geographic or other regions to which such content was made available; actors or models appearing in or otherwise associated with such content; types of characters portrayed by such actors or models; content authors, producers, and directors; content genres, subjects, and settings; background music tones, tempo, and related characteristics; visual effect speed, colors, pixel change ratio, brightness, and other related characteristics; scents and tastes associated with such content; and other such content attributes. Additional content attributes stored by Airings Data 110 may include general plot themes or plot styles, such as comedic or dramatic segments; and a time- or position-based order in which such content attributes appear within such content.

As users view, listen to, or otherwise experience content, user behavior may be monitored through a set-top box, personal computer, radio, portable music player, or other device ("set-top box"). In a preferred embodiment, user behavior may be monitored by recording set-top box events. Tuner Data 120 may comprise a collection of such user behavior information. Tuner Data 120 may also comprise other user information, such as, but not limited to, billing information and personal demographic information.

Airings Data 110 and Tuner Data 120 may be transmitted to a data center of the present invention via a telecommunications infrastructure. In a preferred embodiment, such telecommunications infrastructure may include cable television systems, satellite television systems, telephone systems, or other wired or wireless telecommunications systems.

In addition to the above-described information, the present invention may include data from external sources, as indicated in FIG. 1 by Graphic Data 140. Graphic Data 140, also referred to as DATA2, may include demographic, geographic, sales, weather, and other information ("demographic information"). Geographic information used by the present invention may include, but is not limited to, distances between zip codes, population sizes within a zip code, and terrain types (coastal town, metropolitan area, etc.) within a zip code. Demographic information used by the present invention may include, but is not limited to, age, race, gender, and income distributions within a zip code or sub-zip code. In a preferred embodiment, such data may be of high enough resolution as to provide information at the zip code or sub-zip code level. The only requirement is that such data share a comment aspect, such as zip code, with Tuner Data 120 or any other DATA1 data with which it may be correlated.

Data Center 130 represents a database or other data storage device in which data from Airings Data 110, Tuner Data 120, Graphic Data 140, and the like can be stored. Data Center 130 may correlate data stored therein (such as correlating Airings Data 110 to Tuner Data 120), and such correlations may indicate content that was viewed, listened to, or otherwise experienced ("viewed") by a user or group of users, and any reactions thereto.

In a preferred embodiment, Algorithms 150 may use one or more statistical methods to determine correlations among and between data stored in Data Center 130. Such correlations may include, for example, which persons and groups viewed certain content, and why. Past Events Query System 200 may allow users to extract meaningful and directed information from Data Center 130 using Algorithms 150 as described above. Past Events Query System 200 may focus on extraction of probabilities for events that have already taken place. These events can include, but are not limited to, past viewing habits of demographic groups, past sales based on advertising, past sales and viewing based on weather, and the like.

In a preferred embodiment, Past Events Query System 200 may comprise a web-based system that allows customers to query a database of past viewing behaviors. A web-based system may utilize a natural language, graphical, or command-line input interface for such queries. The Past Events Query System 200 may allow a customer to query Data Center 130 while preventing a customer from obtaining any information about individual consumer behaviors, or allowing a customer to duplicate processes employed in Algorithms 150 to produce such information.

As used in this specification, the term query can include any data-related question asked of the present invention. A query may concern specific content, content portions, content combinations, or mixtures thereof. By way of example, without intending to limit the present invention, a query may be, "How many African Americans in Florida, but not in Bradenton, watched at least 20% but no more than 80% of the primetime Friends last week, but did not watch at least 45% of the rerun of Seinfeld right before it or at the same time 3 weeks before that."

While Past Events Query System 200 can generate statistics for television airings or other events that happened in the past, the present invention is not limited to such queries. Customers, illustrated by Block 210, can also enter predictive queries through Future Events Query System 190. Future Events Query System 190 can, in turn, parse such requests into terms useable by Prediction System 180.

Prediction System 180 may predict future viewer behavior based upon trends found in Data Center 130 and extracted using algorithms in Algorithms 150. While these trends are of limited predictive use, such trends can be analyzed against demographic data specific to each monitored set-top box, thus providing better analysis of viewing trends across various demographic groups. Such analysis can be performed by Individual Behavior Determination System 160. The addition of Future Airings Data 170 allows further predictive refinement, as Future Airings Data 170 provides a basis onto which behaviors can be mapped or extrapolated.

Customers 210 of the system may access data that has been analyzed by Algorithms 150 through Past Events Query System 200 and Future Events Query System 190. By these systems, a customer may tailor queries so that Algorithms 150 or Prediction System 180 may answer them. Due to possible privacy concerns, Customers 210 may not have direct access to Individual Behavior Determination System 160, thus restricting access to behaviors of sampled households or persons.

Figure 11:
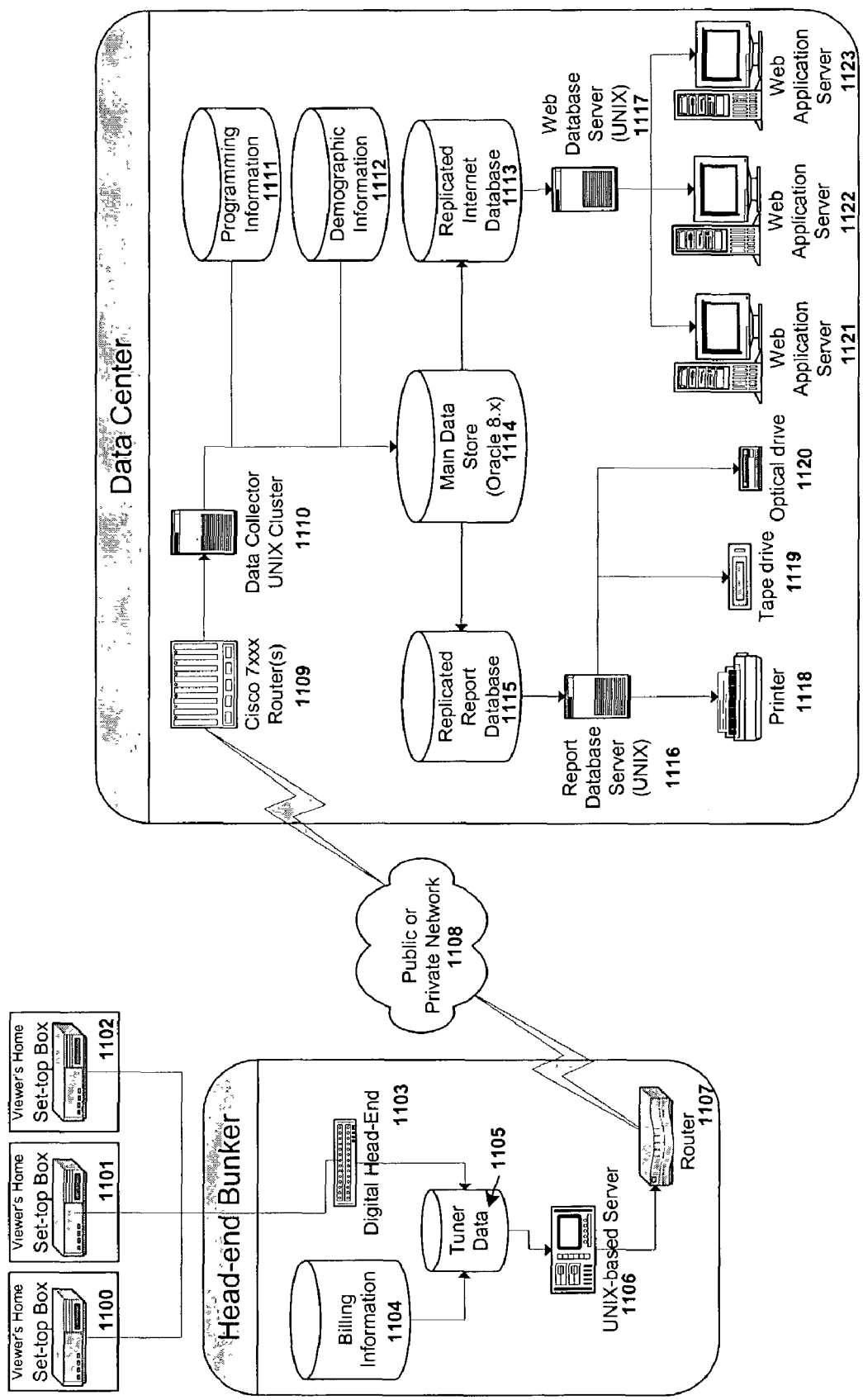
FIG. 11 provides a high-level view of a technology infrastructure employed in a preferred embodiment of the present invention.

FIG. 11 provides a high-level view of a technology infrastructure employed in a preferred embodiment of the present invention. As illustrated by FIG. 11, analog or digital set-top boxes (Blocks 1100 to 1102) reside in viewer's homes, and can control content presentation. Such control can include, but is not limited to, the selection of a television channel or increasing or decreasing volume. Such set-top boxes may also include software which provides additional set-top box functionality, such as, but not limited to, managing communications between a set-top box and a head-end (Block 1103), monitoring set-top box events, forwarding events to a head-end, and managing bandwidth utilization via configurable application parameters.

A head-end bunker can house equipment that distributes content downstream to a group of households. In a preferred embodiment, a head-end bunker can also include a combination of hardware and software that monitors user behavior information from downstream set-top boxes (Block 1105). In a preferred embodiment, such set-top box data can be transmitted to a head end through a cable television cable, telephone line, or other telecommunications infrastructure. Such transmissions can also occur through a cable shared with return path equipment, even though such equipment may be separate from distribution equipment.

In a preferred embodiment, a head-end bunker, as used in the prior art, may be enhanced with the addition of a UNIX-based server (Block 1106) that is connected to return path equipment via a telecommunications infrastructure. Such a server may allow collection of user behavior information.

A preferred embodiment of the present invention also provides a server with access to information from a customer billing database (Block 1104). Such billing system access can provide correlations between set-top boxes and customer data, such as billing zip code, billing area code and prefix, and the like. To address privacy issues regarding viewership, a preferred embodiment of the present invention will identify set-top box data by zip code, area code and prefix, or other geographic (i.e., regional) identifier associated with a region in which a set-top box resides. Correlations between set-top boxes and zip codes can be maintained in a cable television or other content provider's billing system; thus, access to such billing data may be preferred.

A highly available and highly reliable server is preferred for set-top box event monitoring, as such a devices may reside in a rack at a head-end bunker, and head-end bunkers may be physically disparate or in remote regions. A preferred embodiment of Server 1106 includes a UNIX-based server; a UNIX-based server is preferred as such servers may reduce maintenance requirements. In addition, backup circuits may be implemented to provide fault tolerance depending on availability requirements for gathered data.

Server 1106 can also attach to a network access device (Block 1107) to upload data gathered from set-top boxes to a data center. Such network access devices can include, but are not limited to, modems, routers, and satellite transceivers. As illustrated in FIG. 11, a private network link (Block 1108) is preferred for connecting a server to a data center for data uploads, as well as network and systems management, and for other functions. However, such functions may also be accomplished across a shared network, such as the Internet. Data transmitted across public or private networks may be encrypted or otherwise encoded to reduce the likelihood that such data may be used by unauthorized individuals.

Data uploads may occur in real-time or data may be temporarily stored on a server and transmitted to a data center on a periodic basis. Such periods may be time based, or may be based on the occurrence of an event, such as, but not limited to, receipt of a certain quantity of data or data from a particular set-top box.

In a preferred embodiment, data transmitted by Server 1106 may be received at a data center. Such a data center may be a central repository for all data gathered from a plurality of head-ends. FIG. 11 includes an illustration of major data center components.

Data from Server 1106 may come into a data center through wide area circuits (Block 1109) and into temporary storage space (Block 1110). Any data cleansing or pre-processing prior to import of such data into the main database can be accomplished as data is stored thereon. Pre-processed data may then be imported into a main data store (Block 1114).

In addition to user behavior data, a data center's main database may also store or access data from sources external to the present invention. Such external information may include, but is not limited to, content attributes from various content providers (Block 1111), demographic information from third party providers (Block 1112), and sales data from retailers or producers.

As illustrated in FIG. 11, data stored in a main data store may also be replicated to one or more databases for other purposes. In a preferred embodiment, data may be replicated to a database that is dedicated to Internet access (Block 1113), and another database that is dedicated to report generation (Block 1115). Such replication may provide data security, as data stored in one database can be compared against data stored in other databases to ensure its authenticity. Data storage and retention properties can also be adjusted for each server as needed.

By way of example, without intending to limit the present invention, Internet Database 1113 can be configured to provide dedicated access to a time-limited amount of viewership data. A web-based application (Block 1117) can then provide customers with access to data in Internet Database 1113, and can also analyze and report on such data. Web servers (Blocks 1121 through 1123) can provide a front-end query system for customizing such analyses and viewing reports. In a preferred embodiment, fields and data made available through Internet Database 1113 will also be structured to ensure that queries complete in a reasonable period and that impact on other users is controlled.

As an alternative example, again without intending to limit the present invention, data replicated to a reporting database (Block 1116) can be used to create hard copy reports (Block 1118), electronic reports (Block 1119), and CD-ROM's (Block 1120) for customers who request access to data by means other than through a Web interface. A reporting database may also have time-limited data retention.

Figure 2:
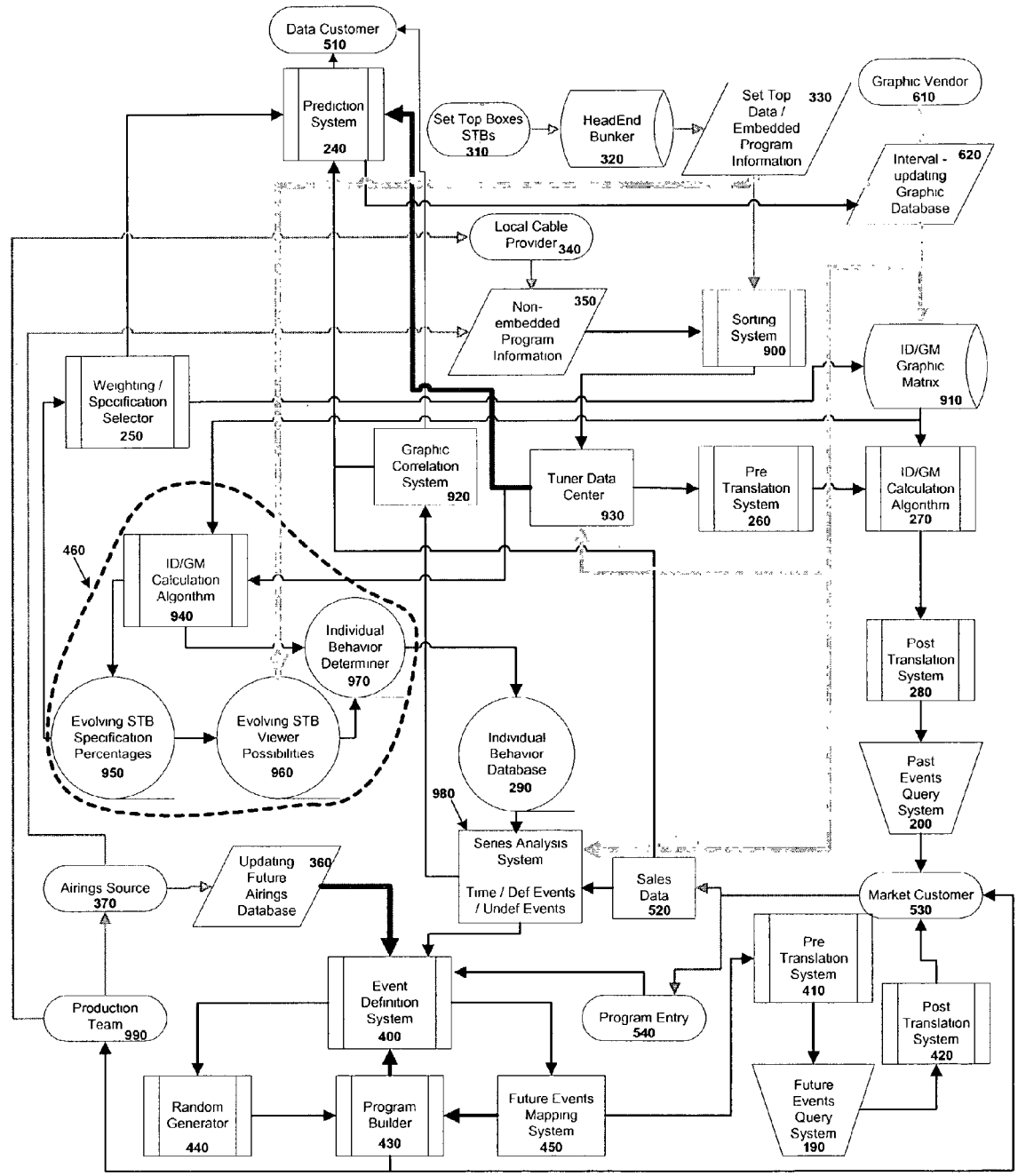
FIG. 2 is a block diagram of the market data acquisition, prediction, and query system of the present invention.

FIG. 2 is a detailed block diagram of market data acquisition, prediction, and query systems of a preferred embodiment of the present invention. Although FIG. 2 includes language specific to this preferred embodiment, the principles of the present invention are also illustrated there, and can be seen with respect to any arbitrary data by replacing 'Tuner Data Center' by 'DATA1', 'Interval Updating Graphic Database' by 'DATA2', and 'Sales Data' by 'DATA3'.

While a preferred embodiment of the present invention applies the concepts of the present invention to a television ratings system, the present invention has other applications as well. Such applications include, but are not limited to, Internet advertising and actuarial analysis in the insurance industry. Whenever multiple datasets exist and correlations are desired between such datasets, the present invention can draw such correlations provided at least one dataset is relatively static and a common aspect, such as a zip code, is shared between the datasets. In the preferred embodiment disclosed in this specification, DATA1 can represent a variable data set, such as data from a set-top box, and DATA2 may represent a relatively static dataset, such as demographic data for a given geographic region. The system and method described herein can determine correlations between such datasets without direct knowledge of DATA2 values for DATA1 data.

FIGS. 3 through 9 illustrate individual modules of the present invention, and FIG. 2 illustrates the modules of FIGS. 3 through 9 overlaid atop one another and interconnected, thereby illustrating interoperability of various modules and relationships between such modules. Elements of FIG. 2 will be described below in connection with FIGS. 3 through 9.

Figure 3:
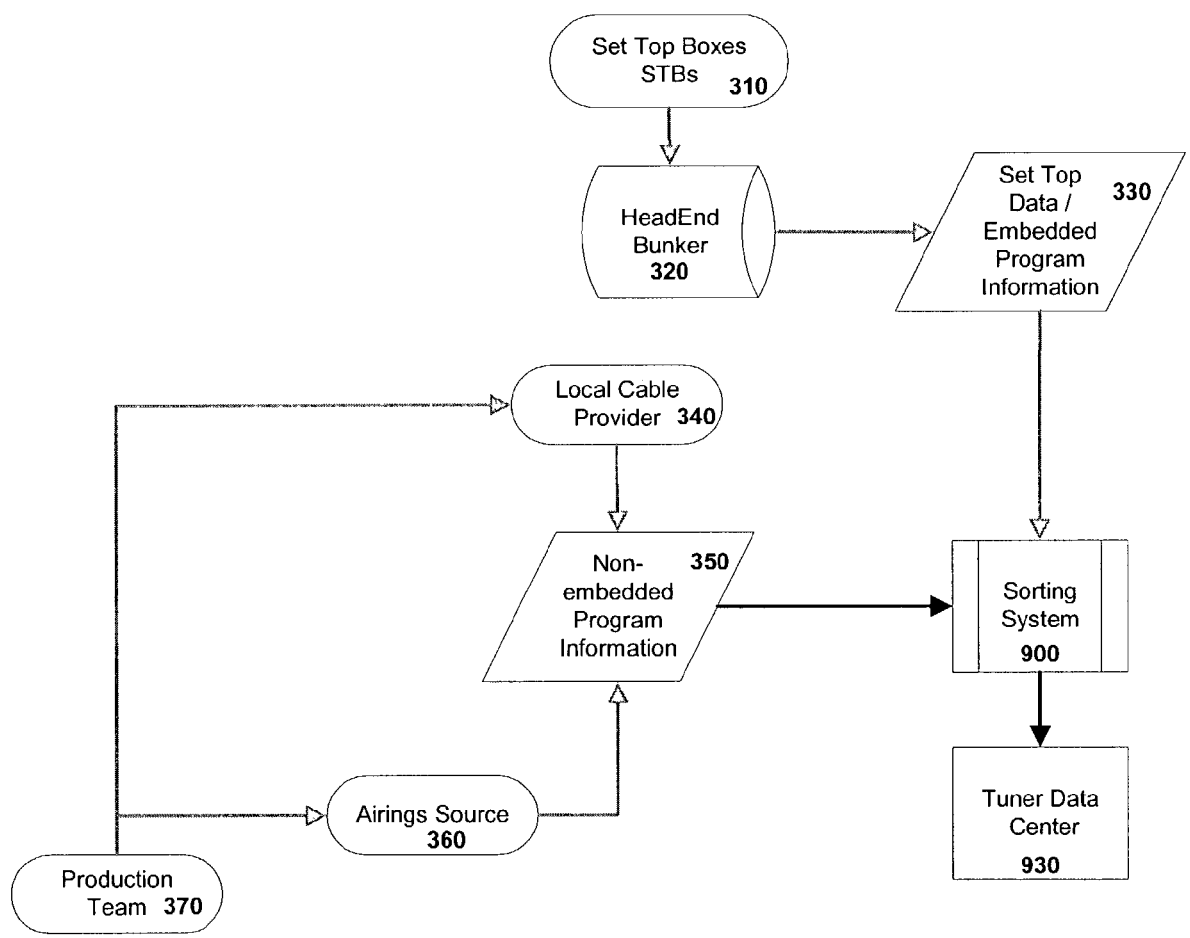
FIG. 3 is a block diagram of a Tuner Data Collection System of the present invention.

FIG. 3 is a block diagram of a Tuner Data Collection component of the present invention. In the more general functionality provided by the present invention, FIG. 3 illustrates the acquisition of some data, DATA1. As it relates to a preferred embodiment, FIG. 3 is a flow chart of modules useful in moving tuner data to Data Center 130 of FIG. 1.

Set-Top Boxes 310 can comprise one or more set-top boxes, which can be located in one or more households. Set-Top Boxes 310 may collect and record event information based on behavior of one or more sampled users, as well as embedded content attributes, where such attributes are available. Such embedded content attributes can allow the present invention to quickly match data about specific content to set-top box events, rather than pulling such attributes from external data sources. Embedded content attributes may pertain to content with which said attributes are transmitted, or embedded content attributes may pertain to previously presented content or content to be made available in the future.

Set-Top Boxes 310 may constantly transmit state-change information to HeadEnd Bunker 320, or Set-Top Boxes 310 may send batches of state-change information to HeadEnd Bunker 320. HeadEnd Bunker 320 can forward such state-change information, along with content attributes (Block 330), to Sorting System 900.

Sorting System 900 may comprise one or more sorting algorithms that place set-top box event data into efficient arrays. Due to reliability issues associated with data from set-top boxes operated by a consumer who knows he or she is being observed, these sorting algorithms may separate data into two or more classes based on whether a set-top box owner or operator has specifically requested access to monitored data, or is otherwise aware that they may be monitored.

In a preferred embodiment, the present invention may not collect individual-specific information, such as name, size of family, name or type of business, address, and the like from sampled users, with the exception of a zip code, area code and prefix, or other geographic identifier. Local Cable Provider 340 or other entity, which may be acting as a privacy guard for a sampled population or a governmental agency, may also provide these geographic identifiers.

While data acquired by HeadEnd Bunker 320 may contain embedded content attributes, not all content may be so encoded. Non-embedded Program Information 350 may be acquired from a content airing source, such as Local Cable Provider 340, or possibly other sources, such as Internet-based guides. Non-embedded Program Information 350 may comprise information that identifies content for which attributes are not available. Where such data is not electronically available, employees may make phone calls, consult published guides, or otherwise obtain such data through manual methods.

These latter methods and data collected thereby are illustrated in FIG. 3 as Airings Source 360. Airings Source 360 may also include a list of content that may be available at a time in the future. In addition, Production Team 370 may work with content creators to provide content to Local Cable Provider 340 and provide Non-Embedded Program Information 350 to Airings Source 360. Production Team 370 can include an organization working with content creators who have access to program details and airings times for Non-Embedded Program Information 350. In its representation in the figures, Production Team 370 may refer to any unit or process involved in content creation or distribution, such as writers, producers, studios, networks, and the like.

As Sorting System 900 receives such data, appropriate sorting may occur and correlations may be drawn between such data and data from Block 330. Sorted data may be stored in Tuner Data Center 930. Tuner Data Center 930 may comprise a database of set-top box data arrays of relevant age. Arrays of information of non-relevant age may be stored off-line, but may still be permanently accessible.

Figure 4:
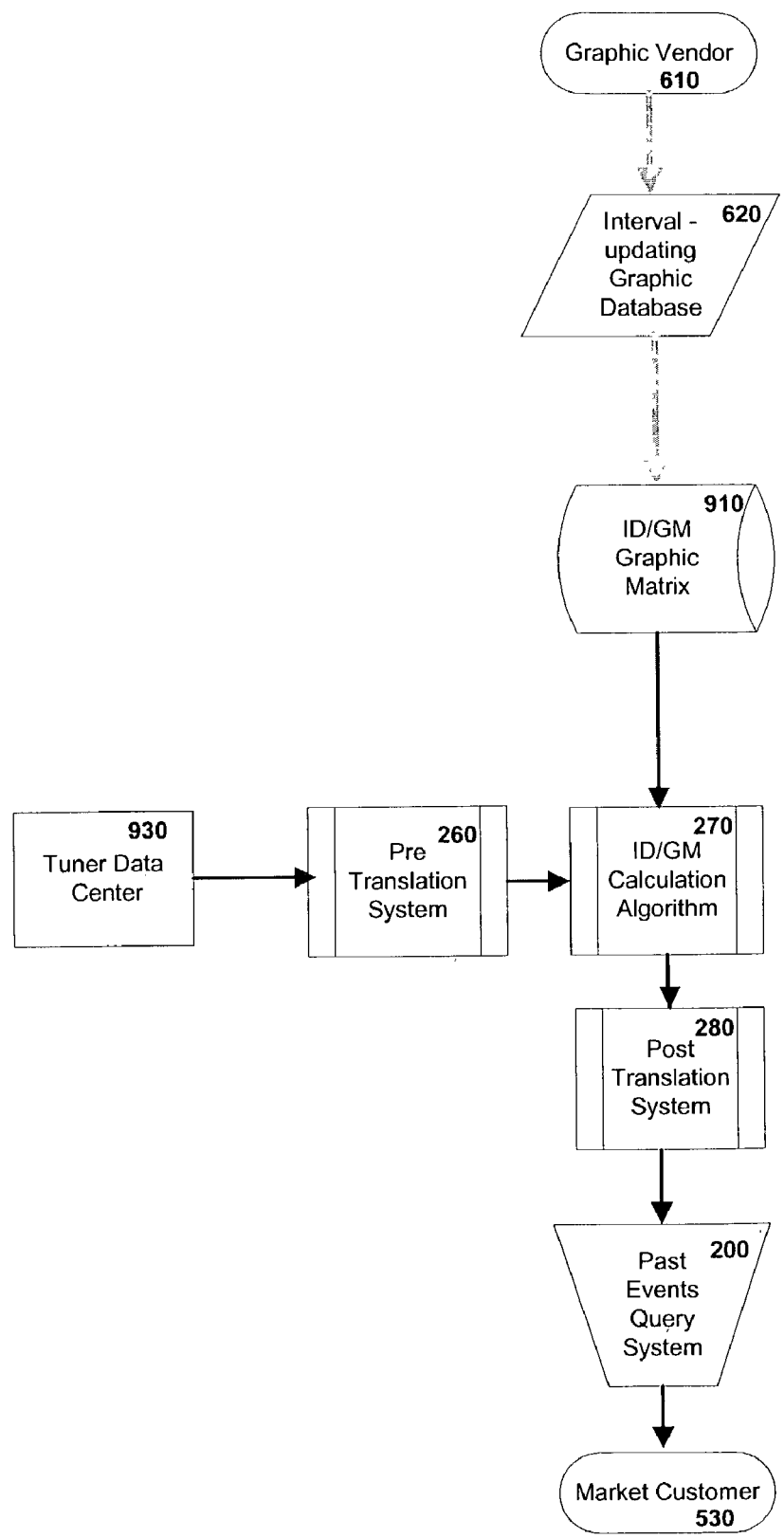
FIG. 4 is a block diagram of a Past Events Query System of the present invention.

FIG. 4 is a block diagram of Past Events Query System 200 of FIG. 1. Although illustrative of a preferred embodiment of the present invention, FIG. 4 also illustrates the general concepts of the present invention with respect to any arbitrary DATA1 and DATA2 if 'Tuner Data Center 930' is replaced by 'DATA1' and 'Interval Updating Graphic Database 620' is replaced by 'DATA2.'

Graphic Vendor 610 may comprise one or more data vendors supplying the present invention with demographic data for a geographic or other region. Graphic Vendor 610 may provide such information broken into distribution units, where such distribution units share a common factor such as zip code or sub-zip code.

Figure 5:
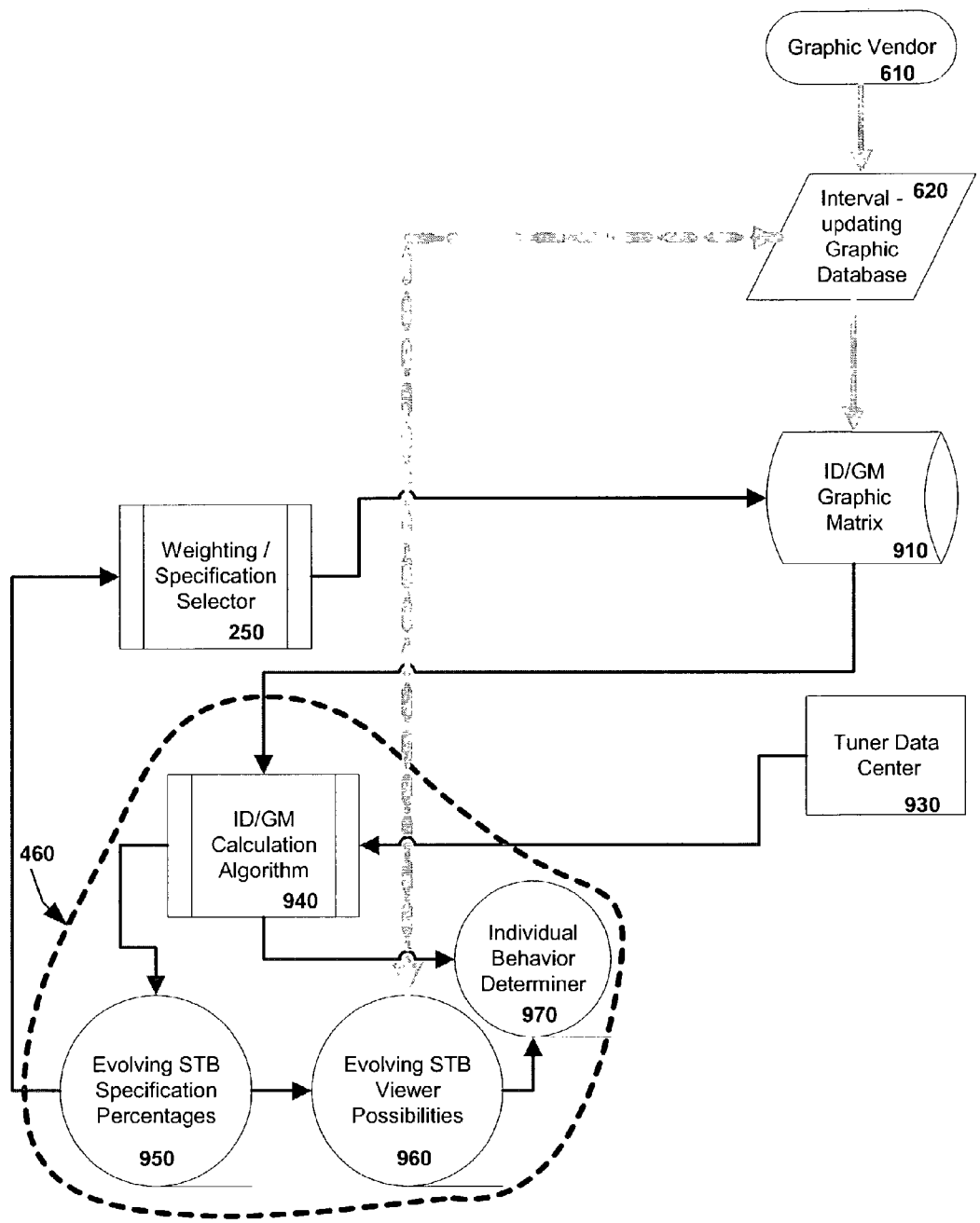
FIG. 5 is a block diagram of a Graphic System of the present invention.
Figure 6:
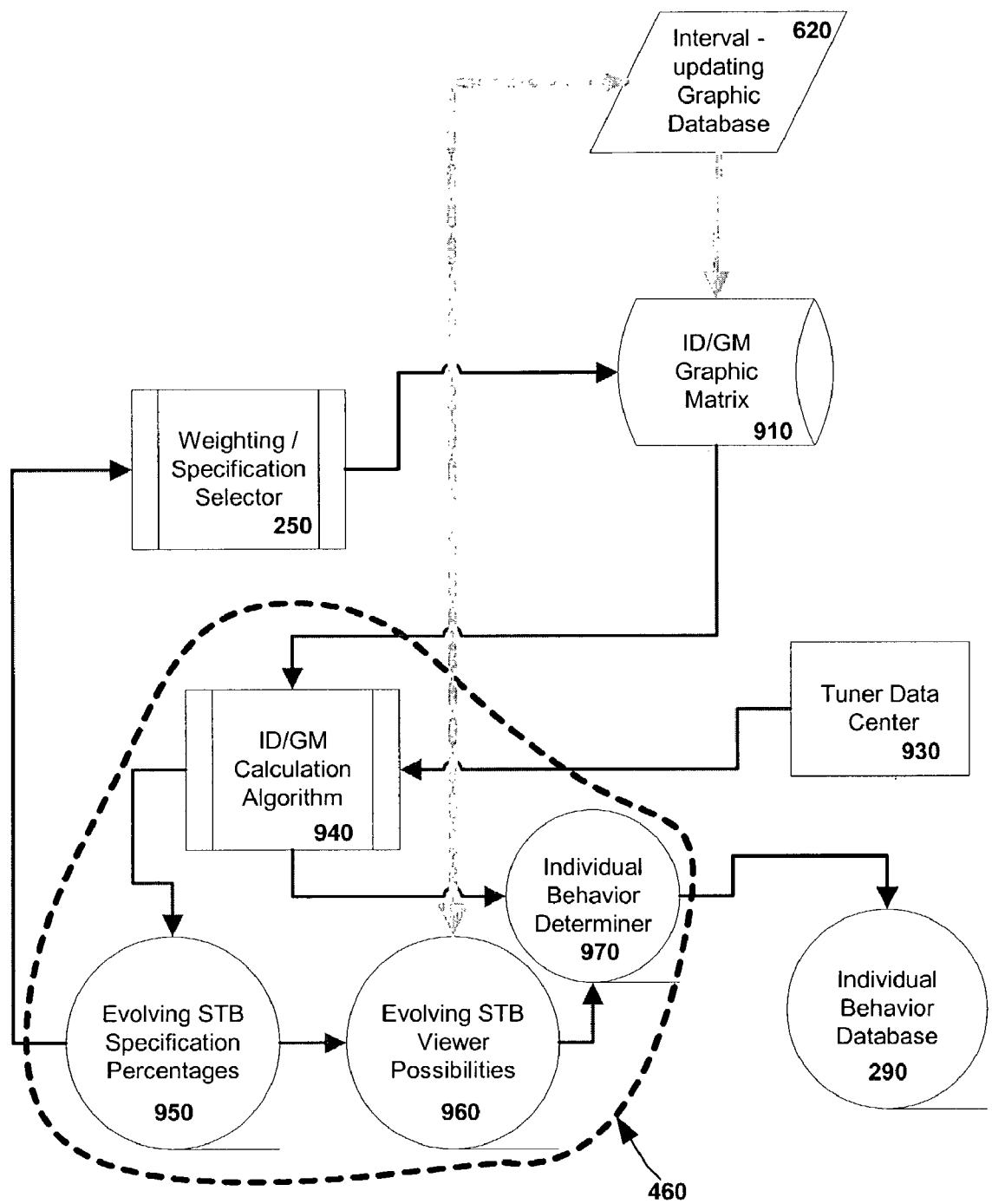
FIG. 6 is a block diagram of the Individual Behavior Determination System of the present invention.

While Graphic Vendor 610 may supply such data in a preferred embodiment, an alternative embodiment can replace data supplied by Graphic Vendor 610 with data determined internally by a Graphic System as illustrated by FIG. 5. A Graphic System can use data collected by an Individual Behavior System, which is illustrated in FIG. 6, to provide necessary data. In another embodiment, data from a Graphic System can be augmented by data from Graphic Vendor 610 to provide the present invention with more comprehensive data.

In a preferred embodiment, the present invention may periodically request data from Graphic Vendor 610 and such data can be stored in Interval-Updating Graphic Database 620. As Interval-Updating Graphic Database 620 receives data from Graphic Vendor 610, data stored in Interval-Updating Graphic Database 620 may be modified to reflect changes implied by data from Graphic Vendor 610. Interval-Updating Graphic Database 620 may then be used by the present invention as a source of graphic data.

The present invention may use data from Interval-Updating Graphic Database 620 to create data arrays representing relative data distribution percentages. Such arrays can be compiled by IDGM Graphic Matrix 910 at any time. In a preferred embodiment, IDGM Graphic Matrix 910 may be updated when new data is received by Interval-Updating Graphic Database 620.

IDGM Graphic Matrix 910 may create matrices for each set of graphic data. Such matrices may contain arrays that refer to zip codes or other geographic descriptors to which information contained within an array corresponds. In a preferred embodiment, arrays may be formed with column headings corresponding to graphic characteristics, such as, but not limited to, gender or age, and rows corresponding to a set of zip codes. A number corresponding to the percentage of said row that can be attributed to said column may be stored in the intersection of each row and column. Thus, for example, if 65 percent of the population of a particular zip code were male, 0.65 could be stored in the intersection of the male column and the row corresponding to said zip code. Such arrays can then be used by a Process Computer for matrix operations that provide numerical data to a report processor prior to delivery to a customer.

Customers, illustrated in FIG. 4 by Market Customer 530, may request such reports from Past Events Query System 200. The present invention may translate such a request into a mathematical formula, or a machine-language representation of such, through Post-Translation System 280. Formulae created by Post-Translation System 280 may be interpreted by IDGM Calculation Algorithm 270 to properly extract and analyze data stored in IDGM Graphic Matrix 910 and Interval-Updating Graphic Database 620.

Figure 10:
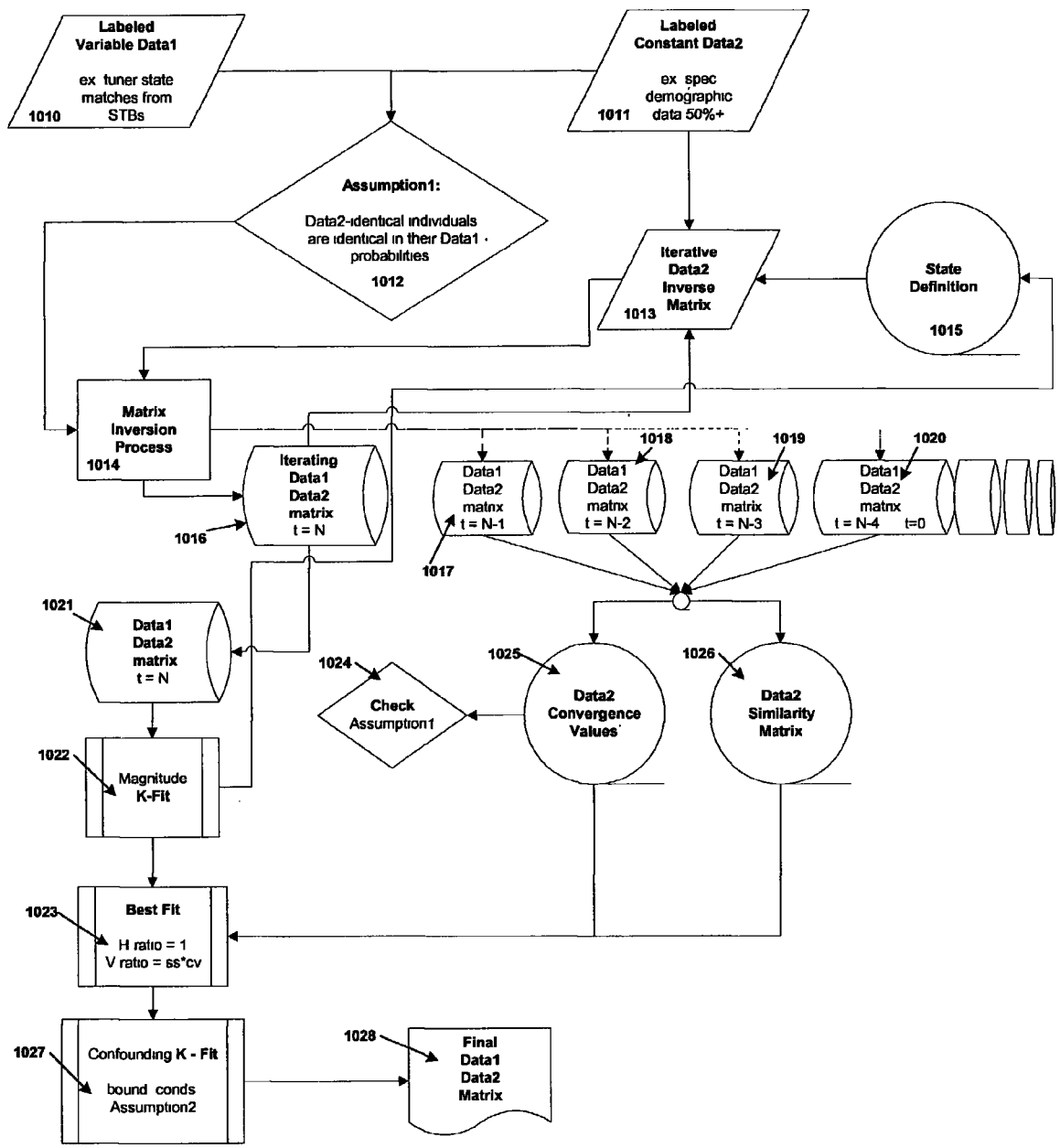
FIG. 10 is a block diagram illustrating aspects of a sample IDM Calculation Algorithm of FIGS. 2, 4, 5, 6 and 9.

FIG. 10 provides an overview of a sample IDGM Calculation Algorithm 270 that can perform such analyses. As illustrated by Block 1012, algorithms used by IDGM Calculation Algorithm 270 may take advantage of an assumption used by media researchers, which is that each member of a given DATA2 (Block 1011) group has the same probability of exhibiting some DATA1 (Block 1010) behavior as any other member of the same group. The present invention extrapolates from this an assumption that probabilities associated with behaviors of groups of people can be determined by their demographic specification (this is referred to as the "demographic assumption"). IDGM Calculation Algorithm 270 uses calculations derived from these assumptions to develop DATA2 correlations for DATA1 data without collecting DATA2 information about DATA1 data directly, and to determine confidence intervals associated with such correlations.

IDGM Calculation Algorithm 270 may use inverse mathematical principles to find such correlations (Blocks 1013 and 1014). The following are two methods through which such correlations may be determined by IDGM Calculation Algorithm 270. While these examples are provided for enablement and best mode purposes, these examples should not be construed as limiting the present invention. In alternative embodiments, subsets of these examples may be used, as may additional calculation methods.

A preferred embodiment of the present invention assumes that a person's demographic description has some influence on his choice of television viewing. A goal of this embodiment of IDGM Calculation Algorithm 270 is to apply the inverse of this assumption; that is, a person's demographics can be determined from his viewing habits. To achieve this, the present invention can invert region-specific viewing and demographic data to compute demographic-specific viewing information.

The following are definitions that will aid in understanding this embodiment:

Demographic Data—As with this specification as a whole, the term "demographic data" includes ordinary demographic categories as well as geographic variables and general local characteristics. Examples of ordinary demographic categories include, but are not limited to, age, race, gender, income, education level, marital status, and number of dependents. Examples of geographic variables include, but are not limited to, climate and weather, urban or rural environment, coastal or inland geography, population density, and amount of traffic. General local characteristics may include, but are not limited to, progress of regional sports teams and local news events.

Demographic Characterization—A demographic characterization is a set of values for each of a given set of demographic categories.

Demographic Characterization Level—A demographic characterization level is the number of categories comprising a demographic categorization. For example, a level-one characterization might be a specification of race, while a level-two characterization might be an age group together with a race.

Demographic Specification—A demographic specification is a full demographic characterization that uses all demographic categories tracked by the present invention.

Demographic Aspect—Demographic aspects are potential demographic category values. For example, the category "gender" has aspects male and female.

Orthogonal Characterizations—A set of demographic characterizations is said to be orthogonal if there is no overlap among them; that is, a given person can fit into no more than one of them.

Complete Characterizations—A set of characterizations is said to be complete if any given individual person necessarily falls in at least one of the characterizations in the set.

Orthogonal and Complete Characterizations—A set of characterizations is said to be orthogonal and complete if any given individual falls into exactly one characterization.

STB—A set-top box.

Program State—Program states reflect particular content, or portions and combinations of content, presented by an STB at a particular time. For example, a program state could be defined as some specific 10-second interval of a particular commercial which just aired, combined with an entire program that aired 2 weeks ago.

Tuner State—Tuner states represent a current STB state.

Event Rating—An event rating represents a probability that a person or group of people, represented by a demographic characterization, matched or will match an STB event.

ERINRating—An erinRating is produced for each event rating by prorating all event ratings for a given geographic area and over a given time period with a given set of program state choices. The number of persons in a geographic area exhibiting an event can be determined by multiplying the number of persons matching a demographic characterization in a given area by an associated erinRating.

STB Event Time—STB event time is a time series that is defined by STB event sampling. For example, if a cable provider's system is inoperable for 10 hours, this gap is not considered in STB event time.

A goal of the present invention is to determine the extent to which the demographic assumption is valid. This determination can be a factor in calculating confidence intervals for data resulting from the present invention.

The demographic assumption can be expressed mathematically in the following relation equation:

$$m_k = \Sigma_i p_{ki} v_i \qquad \text{Equation 1}$$

Here $m_k$ is an observed number of STB's in zip code k experiencing some defined event, $p_{ki}$ is the number of people in zip code k with demographic characterization i, $v_i$ is the fraction of people of characterization i that are watching the event, and the sum is over a complete set of demographic characterizations i. This formula embodies the demographic assumption because $v_i$ depends only on i. In English, Equation 1 simply says that the total number of STB's experiencing a particular event can be determined by summing the number of people of each demographic characterization that are experiencing the event.

In a more general application of the present invention and its related formulas, $m_k$ can be seen as corresponding to DATA1, and $p_{ki}$ to DATA2.

Given that $m_k$ values can be determined through the present invention, and $p_k$ values can be obtained from demographics vendors or by other means, the present invention can use Equation 1 to solve for $v_i$. This can be accomplished by defining an error function such as:

$$\psi^2 = \Sigma_k \Sigma_i (m_k - p_{ki} v_i)^2 \qquad \text{Equation 2}$$

If a dataset under consideration contains more zip codes than demographic characterizations, Equation 2 can be solved through a standard least-squares approach. If a dataset under consideration contains fewer zip codes than demographic characterizations, fitting methods may be applied prior to application of a standard least-squares approach. A least-squares approach can involve inverting a matrix based on $p_{ki}$, and for that reason is referred to as an inverse demographic matrix, or IDM, solution. This is illustrated by Block 1014 in FIG. 10.

An IDM can be implemented in different manners, depending on the set of demographic characterizations. For example, if a particular query involves only one category, such as age, then demographic characterizations can be defined across the whole set of age-intervals (0-10, 11-20, 21-30, . . . , 101-110, 111+, for example). In this case, a set of twelve age-intervals forms a complete (all individuals fall into at least one interval), orthogonal (an individual falls into no more than one interval) set of characterizations. A resulting $p_{ki}$ matrix will then be a matrix of size $N_{zip} \times 12$, where $N_{zip}$ is the number of zip codes used in the calculation. Equation 2 can then be solved for twelve values of $v_i$, $v_1$, through $v_{12}$.

Alternatively, if a query involves only one particular age-interval, such as ages 11 to 20, a set of demographic characterizations with only two elements can be used, one set containing people between 11 and 20, and one containing all others. The resulting set is also complete and orthogonal, and can be represented in a $p_{ki}$ matrix. In this case, the $p_{ki}$ matrix is $N_{zip} \times 2$, and Equation 2 can be solved for two values of $v_i$, $v_1$, (the number of people in the age range 11 to 20 who are watching), and $v_2$ (the number of people of all other ages who are watching).

An IDM solution for a query involving a set of level-n characterizations may be referred to as IDMn. The age-group example given above, using an $N_{zip} \times 12$ $P_{ki}$ matrix, can thus be seen as an example of IDM1. If a query involves two categories, for example age group and gender, then a complete, orthogonal, level-2 demographic characterization set would have 24 elements, and an IDM2 solution would involve a $p_{ki}$ matrix of size $N_{zip} \times 24$.

When a query involves only a single characterization, such as ages between 11 and 20, this may be referred to as IDMn-P. Thus, the second example in the previous paragraph is an IDM1-P solution. As another example, if a query only involved women in age interval 21 to 30, then an IDM2-P solution, for which the $P_{ki}$ matrix would again be of size $N_{zip} \times 2$, could be used.

IDM solutions can be normalized with complementary IDMn-P solutions to supplementary IDM(1, 2, 3 . . . n)-P solutions. Complementary normalization involves IDMn-P computation of all characterizations of the same "n" which contribute to a whole IDM(n−1) mutually exclusive demographic characterization. IDMn-P values can then be normalized to total the value computed for the IDM(n−1)-P characterization (which was previously normalized itself if n>1). All normalization can begin at characterizations of lowest n value. By way of example, when n equals 7, characterizations 1 through 6 should be calculated, so that normalization occurs between all two-level combinations.

While the present invention may calculate an IDM solution, such a solution may not be presented to a customer querying the present invention. Rather, the present invention may present a range of values that fall within a particular level of statistical confidence. As STB usage expands to include the majority of the population, such value ranges may have a non-zero size due to a violation of the demographic assumption. Values for such ranges can be determined by uncertainty estimations provided by a least-squares fit.

While STB's are well below complete penetration but data is sampled in a random fashion, value ranges returned as a result of a query can have an additional uncertainty contributed by sampling error. In addition, sample bias, which can occur, for example, when a sampled individual knows of such sampling, or simply as a result of a difference between those willing to be sampled and those unwilling to be sampled, can cause additional sampling error. The methods outlined below can address these complicating issues, and can calculate error ranges for various datasets.

As data is collected by the present invention, a 2-dimensional array holding the number of matching events between all combinations of demographic characterizations is kept in a specification similarity matrix, illustrated by Block 1026 in FIG. 10. For each demographic characterization combination, the Pearson-r correlation can be computed with respect to all pre-defined events.

Over time, IDM values for demographic characterizations or combinations of demographic characterizations can become predictors for demographic characterizations, within determinable statistical confidence intervals. Such demographic characterizations can be combined to create a similarity index. The present invention can use a similarity index to determine probability ranges for various levels of demographic characterizations that can be used by a possibilities reduction system of the present invention.

The present invention may also apply another assumption to determine a combination of demographic aspects that can have a relationship on television viewing. Such relationships can be determined by applying rules to demographic aspects over time. Such rules may include, but are not limited to, additive, subtractive, and dominance or recessiveness rules. If an IDM2 value for a level-two characterization is greater than the IDM1 value for both demographic aspects comprising the level-two demographic characterization when viewed alone, that value is said to correspond to an additive rule. If an IDM2 value for a level-two demographic characterization is less than the IDM1 value for both level-one demographic characterizations when viewed alone, that value is said to correspond to a subtractive rule. If an IDM2 value for a level-two demographic characterization falls between IDM1 values for the respective demographic aspects of the level-two characterization, that behavior is deemed to be dominant/recessive, and the IDM1 value closest to the IDM2 value is deemed the dominant IDM1 value.

A multi-dimensional array can be kept which records rules appropriate to each IDM relationship for each event over time. Such an array may also be extended to include rules comparing multi-aspect combinations. Statistical tests can be applied to determine confidences with which an aspect or combination of aspects is related to another aspect or combination of aspects by any of the given rules. Weights may be assigned to each rule, with a preferred embodiment using linearly higher weights to represent exponential rule growth.

Values produced by such a system may be stored in an array, or recombination matrix. Rules can be applied additively for a demographic characterization of a particular level from lower level IDM solutions at which such rules are identified. Final confidences can be determined through Pearson-r correlation with IDM calculations. Demographic characterization recombination matrices can aid in the calculation of probability ranges.

A mean of each demographic specification's event matching representation may be stored over time in aspect representation indices. Such one-dimensional arrays can also be used in confidence determinations for information obtained through other portions of the present invention. These indices can be updated as IDM calculations continue through STB event time. Aspect representations can give the present invention approximate sample sizes for behaviors of each demographic characterization.

Aspect representation indices can also be used when determining individual behaviors. To determine such behaviors, probabilities can be assigned to each demographic specification and each STB event. If an STB matches an event, corresponding probabilities can be ascribed to an STB, where such probabilities are normalized so the highest probability is unity. If an STB does not match an event, probabilities ascribed to such an STB may be the linear inverse of probabilities ascribed to an STB matching an event. For each STB and demographic specification at a given time, summing ascribed probabilities for each demographic specification and dividing by the number of probabilities can compute the probability that an STB corresponds to a given demographic specification. A one-way analysis of variance can then be performed on such data to determine the likelihood of such data representing a user of a respective STB.

As previously discussed, confidences with which a demographic specification can be linked to an STB can be useful in refining data generated by the present invention. This usefulness arises out of the fact that combining relative confidences with a level-n demographic characterization yields a level-n+1 demographic characterization. Such relative confidences are also useful when evaluating assumptions, or rules, generated by the present invention. Such assumptions may be generated in the above-described aspect recombination rules, specification similarities, aspect representation, and individual behavior determination processes.

Information developed by each assumption has an empirical validity, which can be converted to a statistical confidence. This empirical validity can be determined over STB event time by the assignment of expectation values, tracking of empirical values, and through time-correlation tests between expectation and empirical values. Each assumption's validity may require determination through a slightly different statistical formula.

Assumption validities, along with sample numbers and sample values, can provide probabilities and ranges for information concerning demographically specific groups. The present invention may translate information into a chosen confidence interval, then, for each specification and each process performed, sets of individuals matching and not matching all possible events can be produced.

Through this process, each demographic specification group can be labeled with statistical "guesses" at a final range of values for an event rating. A system of linear equations can then be solved to further reduce the ranges and fill in residual gaps left by such processes. Demographic numbers for each demographic characterization can also be used to further reduce the ranges by this possibilities reduction system. By way of example, without intending to limit the present invention, imagine a set of viewers matching a set-top box event contains 300 people who are Asian, and this same set contains 200 people who earn over $80,000 per year. If it is known that all people in the set who earn over $80,000 per year are Asian, then the 100 remaining Asian people can be placed into categories corresponding to incomes below $80,000 per year. Some of these categories may already be reduced, so information can be filled in quickly.

Essentially, while an IDM and other processes of the present invention may have increasingly low confidences as demographic specificity levels increase due to low sample representation for many of demographic characterizations at these higher levels, a possibilities reduction process can take advantage of these low numbers by filling in demographic characterizations with certain matches or non-matches of STB events. A possibilities reduction system can accomplish this because demographic data is known at these levels, and thus reduces the set of possibilities remaining.

Ranges can be reduced even in cases where demographic characterization numbers are not filled completely. The possibilities reduction system may use linear algebra rules to describe the remaining possibilities in terms of mathematical symbols after each piece of information is considered. A matrix of specific probability ranges and their mathematical relationships with other specific probability ranges for a given event can be iteratively updated in a pre-determined order until such iterations do not significantly change any matrix values.

Ultimately, ranges that cannot be further reduced may not be modified by this iterative process without first modifying the confidence level. For example, by decreasing the confidence level (for example, from 90% to 88%), ranges may be reduced and some demographic characterizations be filled in. An iterative process can then go through all characterizations and iteratively again reduce value ranges as much as possible. At some point, the confidence level in the matrix may be increased to its original level. However, additional mathematical procedures may be introduced to avoid an error function of the of this matrix getting trapped in a (spurious) local minimum.

It is important to note that even if a customer is only satisfied with confidences associated with level-five data, the relevant level-five characterizations can be composed of any five demographic categories about which the present invention collects demographic data and in which a customer may be interested.

In addition to a probability reduction process, a preferred embodiment of the present invention may further reduce the likelihood of errors by employing a Monte Carlo-type fit to such data after a probability reduction process has been applied. Such a fit may account for bias issues associated with data collected by the present invention. The present invention may further address bias issues by monitoring set-top box usage and identifying inconsistent behavior. For example, the present invention may detect when households leave a set-top box on while playing a DVD, videotape, or even while on the telephone or when out of the home for extended periods by analyzing usage patterns for each set-top box. By way of example, without intending to limit the present invention, the present invention may define "special events" which correspond to situations in which a particular set-top box remains on but no state changes occur over a period that is significantly longer than an average state-change interval for that set-top box.

The present invention may also be integrated with recording systems, such as the Replay-TV and Tivo systems, to allow more detailed analysis of consumer behavior. Recording systems may be of interest in the present invention because of the level of control a user has over a given program, including the ability to pause live programming.

An alternative calculation method which may be used by IDGM Calculation Algorithm 940 essentially involves a more additive, yet thorough approach based on the demographic assumption to determine DATA2 values for DATA1 data. However, rather than defining an error function to be minimized, this method represents a lengthy process of linear algebra by essentially comparing each zip code to each other zip code for each demographic characterization in a tailored customer query. This calculation method is an alternative mathematical method that solves the same problem as the previous method.

The present invention may essentially translate customer queries into a query of the type "What percentage of a certain demographic specification performed some action during a program state?" and calculate the result of such queries. Definable Viewing Units ("DVU's") include whole or partial content that can be matched to time and location. Customer queries can take the form of combination of actions and DVU's.

Customer queries can be translated to a final query through determination of a plurality of values within subsystems of the present invention and then operating on those values to derive a final query value. Subsystem query values can be determined by a process computer, which employs multiple sub-processes to determine each sub-value. A processor can convert any percentages generated by such sub-processes to numbers, prorate and extrapolate such numbers to include non-sampled individuals, and accounts for those STB's at presenting content to multiple viewers.

A process computer may receive queries specific to a demographic category. A process computer can break apart a query into two components; a set of zip codes for which the query will return data, and all other query components. For each zip code in a query, which may be referred to as a "query zip," the query zip can be matched against other zip codes for which the present invention collects market data. This process will result in n–1 zip code combinations ("zip-zip combination"), where a query zip is the first combination, and where n is the total number of zip codes about which data is collected by the present invention. These zip-zip combinations can be run through a multi-step process that determines final query values.

The first of these processes, CP1, determines weights for each zip-zip combination. CP2 determines a value each zip-zip combination can infer for the final query, or for some sub-query. CP3 can determine if there is more than one pattern of inferred query values and, if there are, determines a set of values from the current dataset. CP4 reduces values from CP3 by one level. CP3 and CP4 can be iteratively acted upon until only one pattern is apparent, and a result set can be determined.

CP1 determines weights for each zip-zip combination based on a variety of factors. One such factor is the percentage of a test zip code's population that falls into the query category in question. In a preferred embodiment, a test zip code's population should be as different as possible from a query zip. This provides a resolution increase, as the larger the differences between the categories, the better the effect of individual common points can be determined.

For each category other than zip codes, CP1 may give higher weight to those categories for which the population of the test zip is similar to the query zip. The importance of these other categories can be determined to make an overall determination of how similar the test zip is to the query zip in terms of such other categories. By way of example, without intending to limit the present invention, if test zip(1) is ninety percent similar by age distribution and ten percent similar by religious affiliation, test zip(1) will likely be assigned a higher weight than one that is ten percent similar by age distribution and ninety percent similar by religious affiliation. The relevance of each category, and hence its weight, can be determined by the effect a combination of zip codes seem to have on market share for a given query.

The present invention can determine a weight for a given test zip by the formula Weight=(c)(W), where c is the percent difference between persons belonging to a query category in a test zip and those belonging to the same query category in a query zip.

As an example, without intending to limit the present invention, if CP1 received a query including query category 'African American', and the following were true for sample query zips and test zips:

query zip: 10% AA+90% other=Market Share=20%
test zip: 20% AA+80% other=Market Share=40%, then c may be calculated as a percent difference between 10.0 and 20.0.

W can be determined by summing weights assigned to each "other" category, where other categories are defined as categories in the union set of categories between a query zip and test zip, except for a query category or any sub-categories defining a query category. In equation form, this can be written as W=sum(w[x])=sum (w[1] . . . w[x]), where x is a numerical identifier of each category, and x is incremented over the number of categories.

For each category:

Let % $d(x,y)$=the absolute value of a percent difference between 'x' and 'y'

Let a=% $d(A[0], A[n])$, where $A[0]$ represents a demographic percentage in query zip for a given demographic category, and $A[n]$ represents a demographic percentage in a test zip for a given demographic category.

Let b=% $d(B[0], B[n])$, where $B[0]$ represents a market share for a given demographic category in a query zip, and $B[n]$ represents a market share for a given demographic category in a test zip.

Let each category weight $w(x)=q(a) \times q(b)$ where $q(a)$=the weight of 'a' and $q(b)$=the weight of 'b' where:

$q(a)=f(a)$=approximately $1/a$ $q(b)=f(a,b)$=a function in which:

as 'a' goes to 0 and % $d(a,b)$ goes to 0, $q(b)$ goes to infinity, and as 'a' goes to infinity and % $d(a,b)$ goes to 0, $q(b)$ goes to 0.

For example, if a query category is African American, categories in a complete union set of categories between the query zip and test zip which do not include African Americans should be reviewed. One such category may be White Male, and by way of an example, the following may be true:

query zip: 24% WM+76% other=Market Share=20%
test zip: 30% WM+70% other=Market Share=40%

The statistics above can be rewritten as follows if the "other" categories and their respective percentages are disregarded:

query zip: $A(0)WM=B(0)$, where $A(0)$=24%, $B(0)$=20%
test zip: $A(n)WM=B(n)$, where $A(n)$=30%, $B(n)$=40%

An optimum weight function for a test zip code is an intrinsic property of its relationship to a query zip. $q(a)$ can be seen as a measure of a percent similarity of a given category between query and test zips, and $q(b)$ can be seen as a measure a category has on describing market share differences between query zip and test zip. Thus, categories receiving heavier weights are those in which % $d(A[0], B[n])$ is low or null and at these low values % $d(B[0], B[n])$ is a similar trended value. In a preferred embodiment, As % $d(A[0], B[n])$ increases, that % $d(B[0], B[n])$ should decrease.

A natural function fitting $q(a)$ and $q(b)$ requirements will be one that provides a proper optimization of zip codes, such as a Laplacian function. It is clearly a symmetrical surface in 3D space with four specific boundary conditions. If a specific function can not be found that provides such a fit, a practically optimal function can be created through power series.

CP2 can evaluate the percentage of persons falling into a query category in a query zip and the percentage of persons falling into the query category in all test zips, and use this to evaluate specific market share differences between the query zip and each test zip codes. CP2 then evaluates the information about these two zip codes, and establishes a best guess as to the query category differences that contributed to an observed market share difference.

CP2 can take demographic and market share information corresponding to individual zip codes and solve a set of linear equations for variables involved. One variable resulting from such a solution can be related to a percentage of persons falling into a query category for a given zip code or set of zip codes. Another such variable may be the percentage of persons in a zip code not falling into a category. CP2 may set the right-hand side of each equation to the market share of a query DVU.

By way of example, without intending to limit the present invention, a given zip code or set of zip codes may yield a formula such as: 10 AA+0.90o=0.20. Such a formula may indicate that a zip code or set of zip codes has a demographic makeup that is ten percent African American and ninety percent "other." To further ease understanding of this example, assume the DVU is the percentage of TV sets that watched all of the show ER from 10.00.00 to 11.00.00 on Nov. 11, 1999. In the above example, the market share for this DVU is 20 percent. It should be clear to one skilled in the art that in the equation above, the variable 'AA' refers to the percentage of African American persons in a given zip code fulfilling DVU criteria.

A preferred embodiment of present invention may represent such an equation using the following three matrices for computational clarity and storage efficiency:

[AAo] [10 90] [20]

CP2 may translate information for all query and test zip codes into this form for a query category and for other categories in which none of the persons making up those category percentages fall into a query category. If the zip code, category, and DVU example above were expanded to include a test zip(n), there would be 3 matrices again, but this time 2-dimensional:

[AAo] [10 90] [20]
[AAo] [12 88] [19]

Relationships between such matrices and their resulting linear equations can be seen when the linear equations are represented graphically by a line in 2-dimensional space. If two lines are on the same plane, such lines must either 1) be the same line, 2) be parallel lines, or 3) cross at some point. Through these relationships, CP2 can create a "best guess" at a mutual answer for variables in the equations based on information the equations imply. This guess need not fall onto a point in the interval of either equation.

This process can be seen as analogous to drawing a set of lines in 2-dimensional space and then finding intersections of these lines. This intersection may occur once per two dimensions, indicating two particular variables. The first of these variables relates to a particular category of interest, and the second variable is always 'other'.

Statistically, with several test zips with which to work and each with a given number of samples, CP2 may be seen as analogous to sampling a much larger number of samples than are in any individual sample zip, and drawing a normal curve for each. The resulting curves may then have each curve subtracted from them, and one normal curve may be built from the differences. In some cases, this curve may be a line representing a single value, rather than a curve.

At this point, the normality of an extrapolated curve is no longer an assumption, as only one specific category variable is of concern at a given time. Any "other" values not under the peak of a curve represent a mathematical confidence level based only on sample size versus population error, and not a statistical skewing possibility.

CP3 can take information from CP1 and CP2 in the form of a series of test zip codes and the best guess value for each. Based on this data, CP3 can then determine whether such best guesses exhibit a one-dimensional pattern. If such a pattern exists, CP3 can return the peak of the pattern as the query return value. If such a pattern is not exhibited, CP3 may pass data to CP4.

CP4 takes CP3 data and attempts to establish a one-dimensional pattern from it. CP4 can run multiple queries through CP1, CP2, and CP3 using each zip code in the present invention's sample population as a query zip. For each iteration through CP3, a phantographic category percentage can be assigned to each zip code. These can be reinserted to CP1, CP2, and CP3 using a query zip and its assigned phantographic categories in place of demographic category percentages.

With each iteration, the complexity of CP4 data is reduced by one level. When CP4 data exhibits a one-dimensional pattern, this result can be returned as a final query value. If CP4 data exhibits more than a one-dimensional pattern, the data can be fed back through CP1, CP2, and CP3 for additional analysis, using new phantographic category percentages with each iteration. Through this process, CP3 and CP4 can identify those demographic categories having a high effect on viewership.

As previously described, CP3 can receive data from CP1. Such data may be in the following form:

| test zip 1 | zip 1 weight |
|---|---|
| test zip 2 | zip 2 weight |
| test zip 3 | zip 3 weight |
| ... | |
| test zip $n$ | zip $n$ weight |
| | total = 1.00 |

In addition to data from CP1, CP3 may also receive data from CP2. Such CP2 data may resemble the following:

| test zip 1 | query zip - zip 1 linear equation solution value |
|---|---|
| test zip 2 | query zip - zip 2 linear equation solution value |
| test zip 3 | query zip - zip 3 linear equation solution value |
| ... | |
| test zip n | query zip - zip 3 linear equation solution value |

CP3 can multiply solution values for each zip code by the weight of that zip code to get a sub-answer. These sub-answers can then be summed to yield a final answer.

Figure 12:
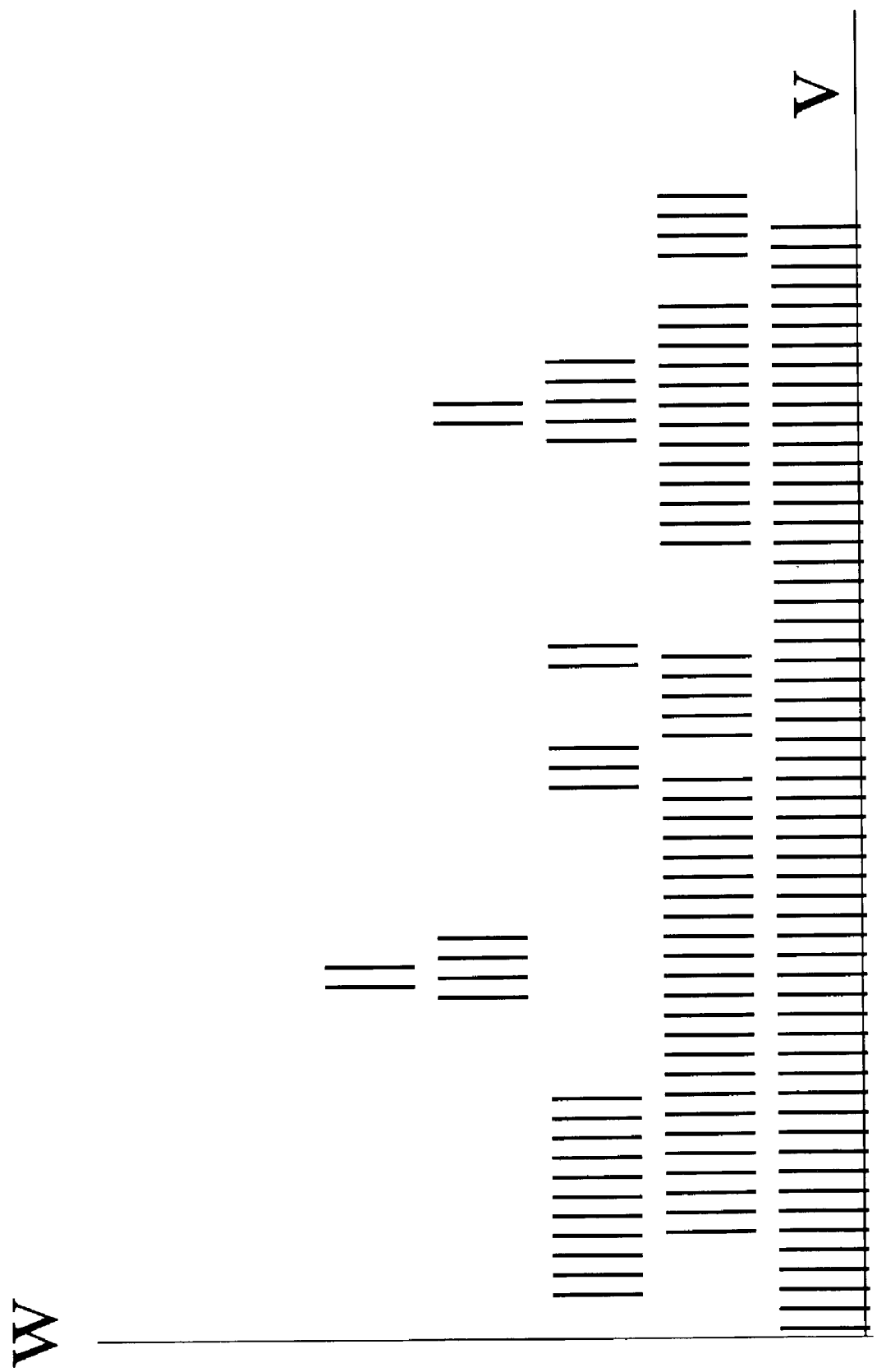
FIG. 12 is a graph of linear equation values and weights for a given geographic region.

While CP3 can generate query results based on linear equation solutions, CP3 can also generate and analyze graphs of zip code weights (w) versus linear equations solution values (v). An example of such a graph is illustrated by FIG. 12.

CP3 may reduce the influence of random noise on such a graph by assigning each w the average of its value and the values on either side of it. This procedure may be repeated until all noise is reduced to acceptable levels. The result would be a graph with one of the following conditions:

1) one defined peak from one direction;
2) one defined peak from two directions;
3) more than one defined peak, possibly with varying heights; or
4) a random curve.

If a curve exhibits conditions outlined in numbers 1 or 2 above, a near-perfect guess at an ultimate query return value can be made. Such a value may be based on a peak value observed, or may result from extrapolation of a graph over a larger data range.

If a curve exists exhibiting conditions outlined in number 3 above, which is illustrated by FIG. 12, then at least one additional category may be effecting query data. A random category can be created, called a phantographic, and relevant percentages can be assigned to that category to account for peak distributions observed in the graph. CP4 can then feed this phantographic category back into CP1 and CP2 for the query in question to determine an appropriate query return value.

By way of example, if the data in FIG. 12 represented a 60/40 distribution, the 60 percent distribution may be assigned to zip-zip combinations where test zips are directly under parts of the graph associated with the 60 percent peak. The 40 percent distribution may be assigned to zip-zip combinations where test zips are directly under portions of the graph associated with the 40 percent peak. Test zips falling under valleys between such peaks may be ignored. Through this system, the present invention should account for categories affecting market share differences without requiring tracking of a large number of categories.

As CP3 feeds data to CP4, CP4 can assign phantographic category percentages to each zip code, then route the result through CP1, CP2, and CP3, thereby reducing underlying patterns by one level. The following is an example of calculations and procedures employed by CP4.

Figure 13:
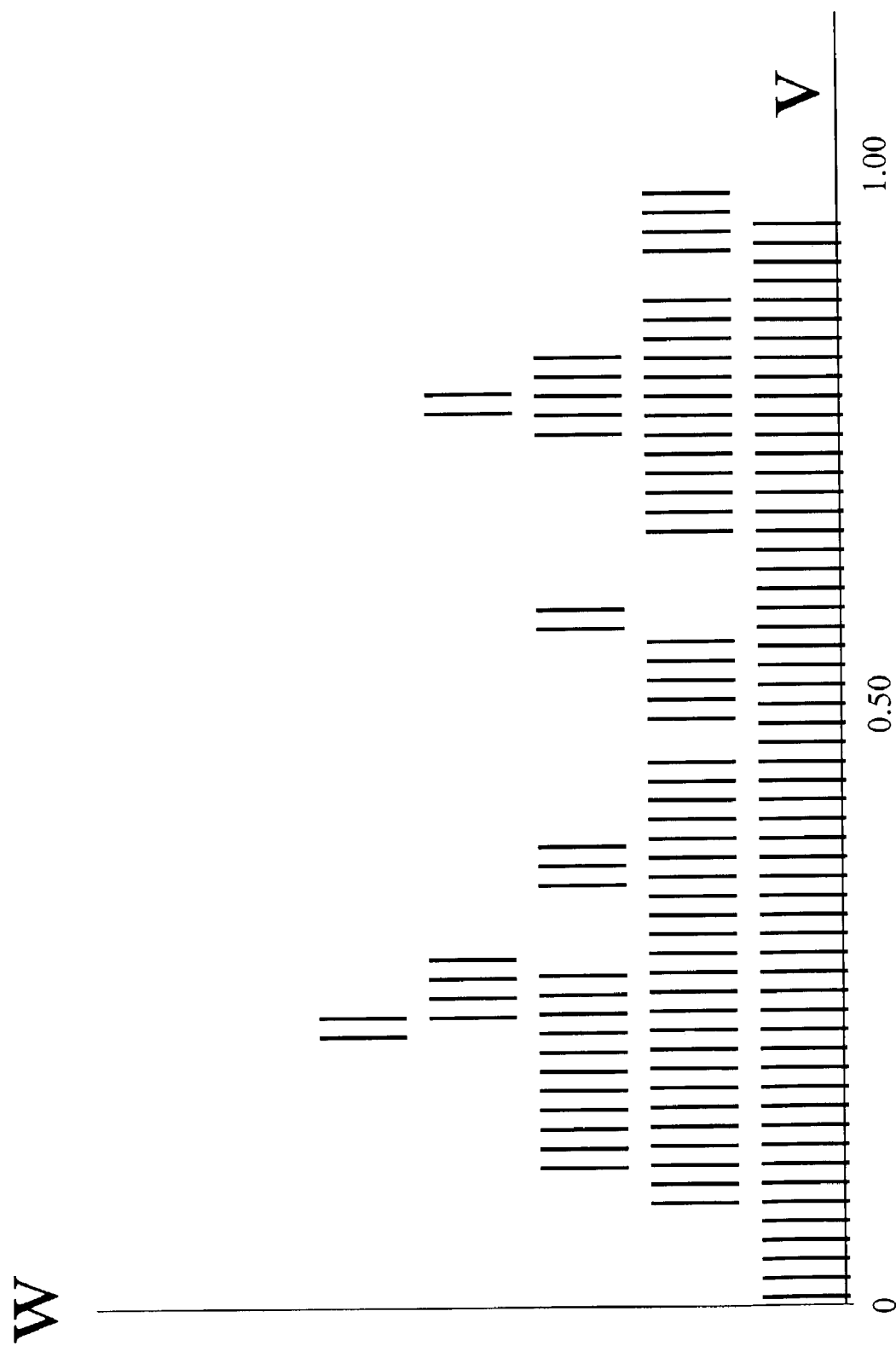
FIG. 13 is an additional graph of linear equation values and weights for a given geographic region.

FIG. 13 is a sample graph generated by CP3 for a query category, zip code, and market share. CP2 values are arranged in increasing order from left to right, with higher lines indicating heaver weighting for a given value. When CP2 generates two or more of the same value, the weight represented on such a graph may be increased to the sum of the individual weights for all matching values.

Figure 14:
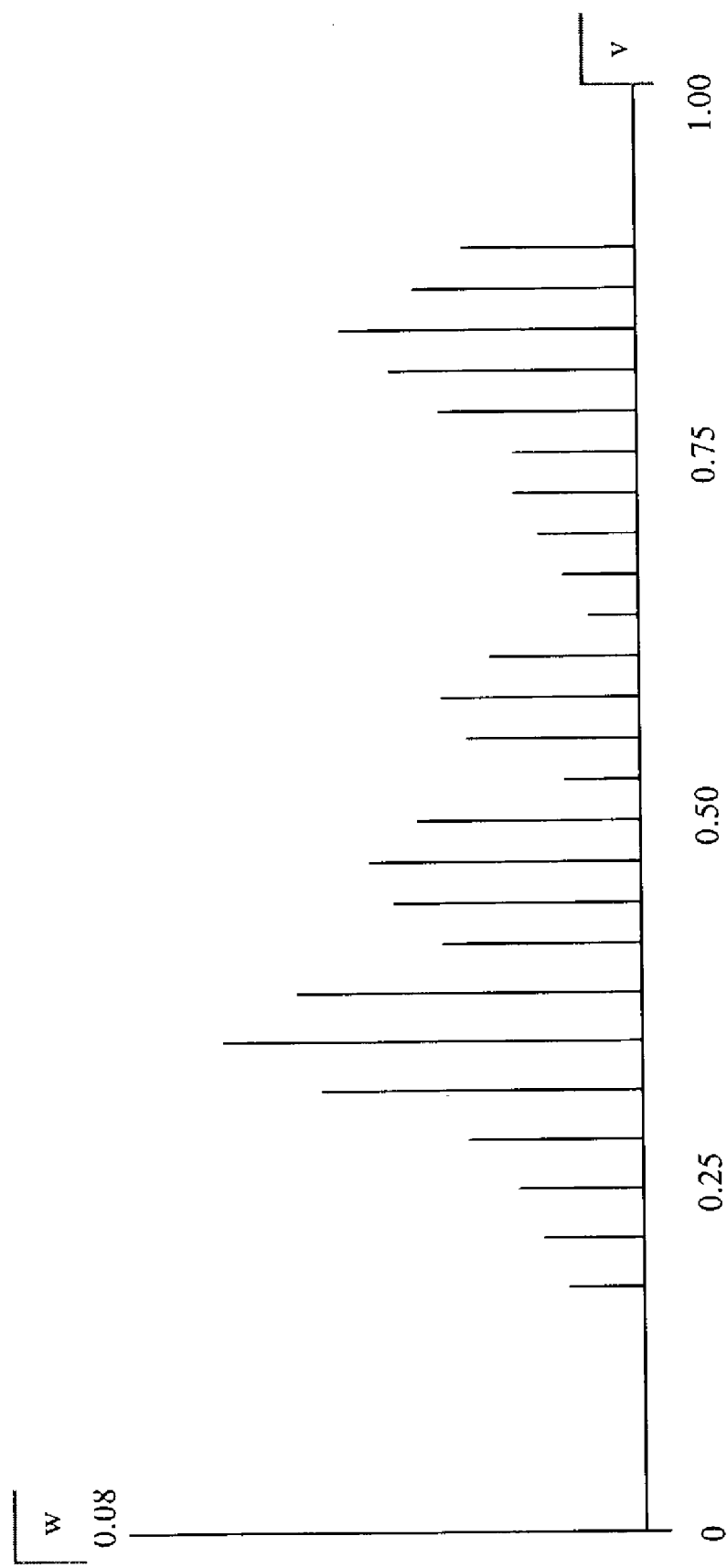
FIG. 14 is an alternative view of the graph of FIG. 13.
Figure 15:
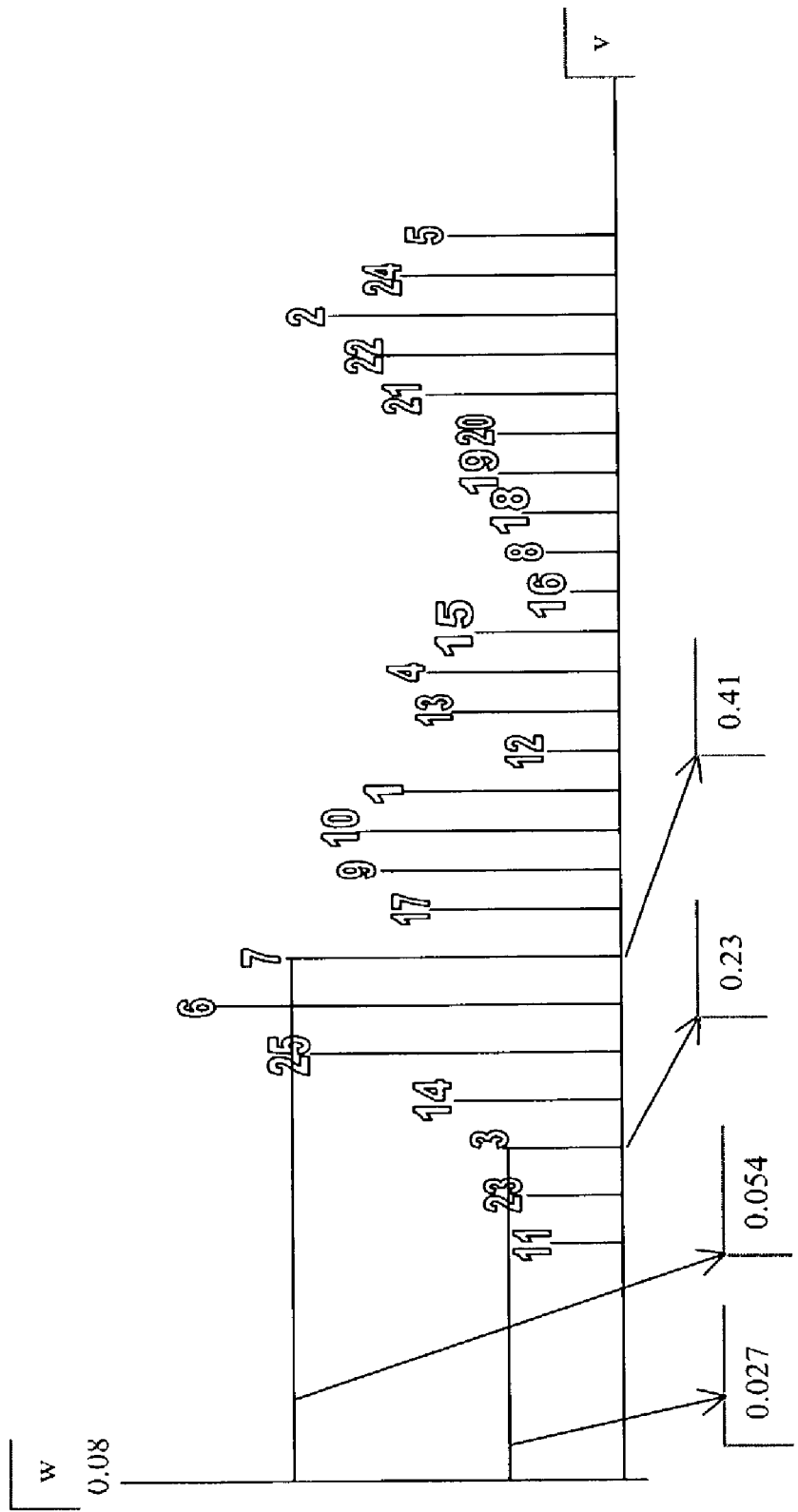
FIG. 15 is an alternative view of the graph of FIG. 14, and includes additional details.

FIG. 14 provides a more detailed view of the graph in FIG. 13. The sum of all weight values in the graph should total 1, and all weights must fall between 0 and 1. This is due to the prorating step performed after CP1. FIG. 15 provides an additional view of FIG. 14, with values provided for various points on the graph, and zip codes numbered 1 through 25. The following is a table of values illustrated by FIG. 15:

| Zip Code | weight (to 3 significant digits) | value (to 2 significant digits) |
|---|---|---|
| 1 | 0.402 | 0.50 |
| 2 | 0.515 | 0.79 |
| 3 | 0.027 | 0.23 |
| 4 | 0.040 | 0.71 |
| 5 | 0.038 | 0.90 |
| 6 | 0.070 | 0.29 |
| 7 | 0.054 | 0.41 |
| ... | ... | ... |
| ... | ... | ... |
| 25 | 0.052 | 0.26 |

Figure 16:
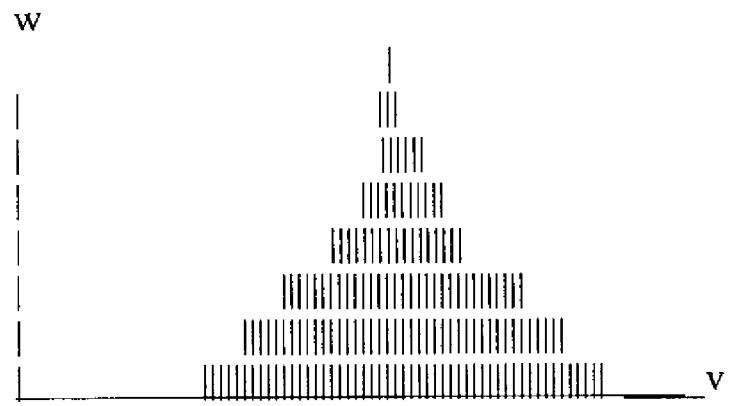
FIG. 16 is a sample, single-peak graph of linear equation values and weights for a given geographic region.
Figure 17:
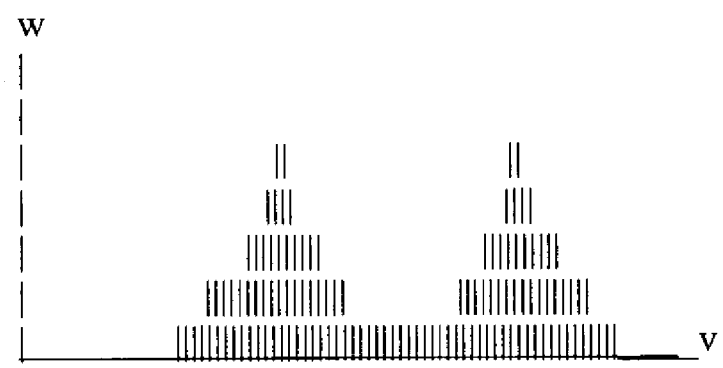
FIG. 17 is a sample, two-peak graph of linear equation values and weights for a given geographic region.
Figure 18:
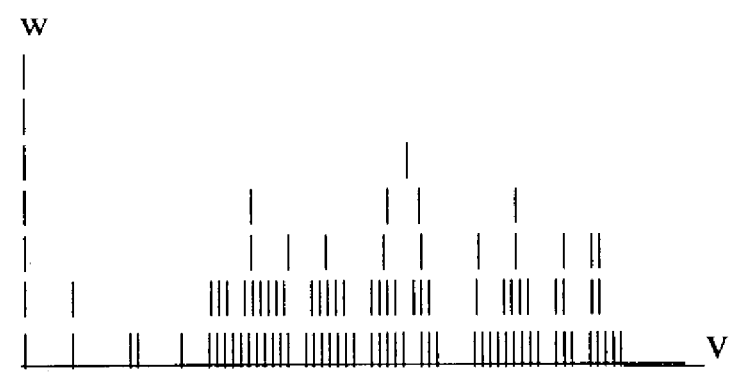
FIG. 18 is a sample, random pattern graph of linear equation values and weights for a given geographic region.

In a more abstract sense, data passed from CP3 to CP4, when graphed, may resemble FIG. 6, FIG. 17, or FIG. 18. FIG. 16 illustrates CP3 data resulting in a graph with a single peak. FIG. 17 illustrates CP3 data resulting in two peaks. FIG. 18 illustrates CP3 data with many peaks. While CP3 data may resemble one of these three figures, CP4 does not distinguish between such cases.

If, for a given query, CP3 resulted in a graph similar to FIG. 16, this may result in a great deal of confidence in a query result value. Such a value may be either the sum of the means of each value times its respective weight or simply the value underneath the peak of the graph. Assuming a symmetrical and "natural" weighting function or algorithm, CP3 data yielding FIG. 16 would provide validity to the assumption that persons with more similar graphic makeup have more similar television viewing patterns. The present invention can answer the questions customers truly intend to ask, as any quality shared by that group alone is represented in the CP1, 2,3 algorithm. This alone can represent a significant improvement over statistical methods employed in the prior art.

Rather than the single-peak graph of FIG. 16, if CP3 were to result in a graph similar to FIG. 17, the correct answer is not one that would be given by a full average of all data, as this would provide a value between the two peaks. The correct answer is the value on the V axis directly under the first peak, or the value on the V axis directly under the second peak. CP4 can select an appropriate value from two or more such values.

The fact that there are two peaks in FIG. 17 indicates that another demographic category should have been part of the graphic data. When two peaks exist such as in FIG. 17, there is only one difference between the set of values forming the peak on the left versus the set of values forming the peak on the right. While CP4 may not determine what this difference relates to, CP3 data is based on zip codes, and the difference is likely to be geographic. For example, it may be that the peak on the right is formed by zip codes in coastal cities, and the peak on the left is formed by non-coastal cities. Regardless of the source of the difference, FIG. 17 clearly illustrates its existence.

If all graphic categories are ignored except the query category, a new set of categories, called phantographic categories, can be assigned to test zips making up the chart distribution. A value of 0 can be assigned to test zips creating the left-hand peak, and a value of 1 can be assigned to those test zips creating the right-hand peak. If this data set is now run through CP1, CP2, and CP3, a similar but more disperse graph should result. If all zip codes sampled by the present invention were iterated through as query zips, and all others were test zips, and the value belonging to each peak was assigned to those test zips beneath it as the phantographic category percentage for each query zip in the system, this data could be run through CP1, CP2, and CP3.

This would result in a new graph for the query zip. Such a graph should result in all phantographic categories having similar percentage distributions for a given zip code. Further, a percentage exhibited by a query zip can be determined, and thus the initial peak associated with the query zip can be properly selected by CP4.

The present invention may further employ a "category generator", which can search demographic, geographic, and other databases for a graphic distribution percentage matching any recurring phantographic distributions. While many are likely to remain undiscovered, if one is found it may be added to a list of categories monitored by the present invention.

Due to CP4, patterns in CP3 data cannot escape the present invention. Even algorithms at the heart of data generated by a random number generator could be determined through CP4's iterative processes.

FIG. 5 is a block diagram of modules used in Graphic Data acquisition. As FIG. 5 illustrates, the present invention may acquire data for Interval-updating Graphic Database 620, and ultimately for IDGM Graphic Matrix 910, from outside sources such as Graphic Vendor 610. However, as also illustrated in FIG. 5, the present invention may also garner data for Interval-updating Graphic Database 620 from Evolving STB Viewer Possibilities Database 960.

Evolving STB Viewer Possibilities Database 960 may include, for each set-top box, behaviors and demographics associated with one or more regular users of said set-top box. Evolving STB Viewer Possibilities Database 960 may also identify a set of set-top boxes whose monitored behavior best fits demographics for a given geographic region. In a preferred embodiment, regional demographics may be complied from specification percentages of such set-top boxes. In an alternative embodiment, specification percentages may be fit by the weight of their magnitudes. The present invention may correlate and assign demographics to set-top boxes, and the sum of these can be combined to indicate demographics for a specific region.

While Interval-updating Graphic Database 620 may initially receive data from Graphic Vendor 610, Interval-updating Graphic Database 620 may not always require such data. As the quality of data stored in Evolving STB Viewer Possibilities Database 960 increases, the present invention may no longer require data from Graphic Vendor 610.

Block 460 identifies a process that produces data which may raise privacy concerns. As illustrated in FIG. 5, the present invention can protect such data by restricting access to such data to only components of the present invention. Information stored inside Block 460 can only be accessed by customers through components of the present invention, such as Block 940.

FIG. 6 is a block diagram illustrating modules used by an Individual Behavior Determination System of the present invention to acquire individual behavior data. As illustrated by FIG. 6, IDGM Calculation Algorithm 940 may extract event data from Tuner Data Center 930. IDGM Calculation Algorithm 940 may also perform event analysis.

As with other parts of the present invention, an individual behavior system may use the demographic assumption at its core. An individual behavior system may also assume that statistical determinations can be made that define a viewer of an STB by measuring STB states over time and ascribing probabilities to an STB. Individual viewers of an STB can then be statistically identified based on behaviors exhibited on an STB.

The mean of all ascribed specification percentages may be kept in Evolving STB Specification Percentage Database 950, illustrated in FIG. 6. Evolving STB Specification Percentages Database 950 may comprise, for each specification, a percentage of time that a behavior associated with a set-top box matches a particular specification. Viewed over time, Evolving STB Specification Percentage Database 950 may contain a "fuzzy" percentage, or Identity Percentage, for each specification, which may be determined for each set-top box.

The "Attribution Percentage" ascribed to an STB for a given query behavior 'n' can be calculated through a piece-wise function:

$AP(n)=$

If YES: behavior match % of that specification;
If NO:

$$(1/\text{Process 1\% of spec}) \bigg/ \sum_{1}^{s(c)} (1/\text{Process 1\% of spec})$$

Where s(c) is the total number of mutually exclusive specifications of the query category/categories.

The "Identity Percentage" of any demographic specification at any time (t) is simply:

$$IP_{(n)} = \sum_{1}^{n(t)} AP(n)/n$$

Where n(t) is the total number of queries to date involving the zip code in which the sample exists.

The following is included by way of example, without intending to limit the present invention. Below are five sample queries submitted to the present invention over the first two weeks of operation, and sample results generated by the present invention. These queries involve the category "race" for the zip code 34208.

| Query #: | 1 |
|---|---|
| Behavior: | watched >80% of Friends, 8:00 pm-8:30 pm on Mar. 23, 2000 |
| Black: 08% | 16% of behavior matches |
| White: | 23%    46% of behavior matches |
| Asian/Pacific Islander: | 12%    24% of behavior matches |
| Other: 07% | 14% of behavior matches |
| Query #: | 2 |
| Behavior: | muted channel at first commercial of Lakers vs Suns, 8:00 pm on Mar. 24, 2000 |
| Black: 02% | 10% of behavior matches |
| White: | 10%    50% of behavior matches |
| Asian/Pacific Islander: | 05%    25% of behavior matches |
| Other: 03% | 15% of behavior matches |
| Query #: | 3 |
| Behavior: | watched >80% of Friends, 8:00 pm-8:30 pm on Mar. 30, 2000 |
| Black: 27% | 54% of behavior matches |
| White: | 03%    6% of behavior matches |
| Asian/Pacific Islander: | 12%    24% of behavior matches |
| Other: 08% | 16% of behavior matches |
| Query #: | 4 |
| Behavior: | watched >80% of Seinfeld rerun, 7:30 pm-8:00 pm on Mar. 31, 2000 |
| Black: 10% | 17% of behavior matches |
| White: | 24%    40% of behavior matches |
| Asian/Pacific Islander: | 14%    23% of behavior matches |
| Other: 12% | 20% of behavior matches |
| Query #: | 5 |
| Behavior: | watched >40% of Seinfeld rerun, 7:30 pm-8:00 pm on Mar. 31, 2000 |
| Black: 22% | 28% of behavior matches |
| White: | 11%    14% of behavior matches |
| Asian/Pacific Islander: | 23%    29% of behavior matches |
| Other: 24% | 30% of behavior matches |

To further refine this example, assume that a particular STB exhibited the above behaviors as follows, and thus percentages attributed to that STB for the category of "RACE" were as follows:

| | | Resulting AP(n) Contribution | | | |
|---|---|---|---|---|---|
| Behavior # n | Exhibited | BLA | WHI | API | OTH |
| Behavior #1: 1 | YES | 16% | 46% | 24% | 14% |
| Behavior #2: 2 | YES | 10% | 50% | 25% | 15% |
| Behavior #3: 3 | NO | 06% | 58% | 14% | 22% |
| Behavior #4: 4 | YES | 17% | 40% | 23% | 20% |
| Behavior #5: 5 | NO | 23% | 46% | 22% | 8% |
| | ΣAP(n) | 72% | 240% | 108% | 79% |
| IP(n) = | Σ AP(n)/5 | 14.4% | 48.0% | 21.6% | 15.8% |

Below are the results of a sixth sample query submitted to the present invention and sample Identity Percentage (IP) calculations for the "race" category:

| Query #: | 6 | |
|---|---|---|
| Behavior: | watched >90% of Law & Order rerun, 7:00 pm - 8:00 pm on Mar. 31, 2000 | |
| Black: | 02% | 08% of behavior matches |
| White: | 14% | 56% of behavior matches |
| Asian/Pacific Islander: | 04% | 16% of behavior matches |
| Other: | 05% | 20% of behavior matches |

| | | Resulting AP(n) Contribution | | | |
|---|---|---|---|---|---|
| Behavior # n | Exhibited | BLA | WHI | API | OTH |
| Σ AP(n − 1) 1-5 | N/A | 72% | 240% | 108% | 79% |
| Behavior #6: 6 | YES | 8% | 56% | 16% | 20% |
| | Σ AP(n) | 80% | 296% | 124% | 99% |
| IP(n) = | Σ AP(n)/6 | 13.3% | 49.3% | 20.7% | 16.5% |

These results would seem to suggest that STB corresponds to "White." Six queries may not be enough to decide such a conclusion. The probability that a person actually is some IP(n) specification can be derived simply through straightforward statistical methods.

Referring again to FIG. 6, the number of viewers for a set-top box may be constrained by Interval-Updating Graphic Database 620. Evolving STB Specification Percentages Database 950 can receive input from IDM Calculation Algorithm 940, which may run continuously on all time-possible events.

The present invention may also utilize a second evolutionary database, illustrated in FIG. 6 as Evolving STB Viewer Possibilities Database 960. A goal of Evolving STB Viewer Possibilities Database 960 is not to determine who is using a set-top box, but rather who may be viewing particular content. Thus, Evolving STB Viewer Possibilities Database 960 may track possible or probable users of a particular set-top box, regardless of whether an individual, a couple, a family, or a large group of people is watching. Evolving STB Viewer Possibilities Database 960 may be updated at regular intervals, but optimally may be updated at every update of Evolving STB Specification Percentage Database 950.

Data from Evolving STB Specification Percentages Database 950 may be best fit to the demographics of an area, and this best fit may be held in Interval-Updating Graphic Database 620. A best fit may be calculated by spot-filling, in which the highest set-top box specification percentages fill the most demographically significant spots first. This spot-filling process continues until all spots are filled. At any time, if a category has been completely accounted, no more spots may be taken and any relevant specification can be discarded.

As a result of such calculations, Interval-Updating Graphic Database 620 ultimately holds a "best guess" at the complete specification makeup of each individual in a household. Spot-filling may not be the most accurate technique, however, as a best fit reduces overall deviation. Due to higher specification percentage weighting, spot filling may provide an extremely close approximation.

The evolving database and best guess technique outlined above have been described in examples which determined viewing behaviors for a given home. However, the present invention can also account for persons in a bar watching a football game on Sunday, even if they are already counted at home.

To determine individual persons, and not just a group percentage, matching a behavior, current set-top box viewer possibilities may be best fit to IDM calculation specification percentages for any event for the population of some graphic region or set of regions. In this way, individual behaviors can be determined. This best fit may be performed by spot-filling in a manner similar to that outlined above. Every person can be accounted for by the present invention, whether at a bar, a neighbor" home, or their own home. The IDM specification percentage may be fit to evolutionary specification percentages for each box, thereby accounting for such deviations.

Ultimately, for each event, individuals matching a behavior may be known, and such data may be sent to Individual Behavior Determiner 970 and stored in Individual Behavior Database 290. Individual Behavior Database 290 may hold all individual behaviors recorded since sampling inception. Individual Behavior Database 290 may comprise a database of time-oriented arrays containing information about what each sample has done since sampling inception. Individual Behavior Database 290 may comprise a database approximating individual behaviors for each event from IDM Calculation Algorithm 270 or 940.

Individual Behavior Determiner 970 comprises a linear system that can find a best fit between IDM Calculation Algorithm 270 or 940 and Evolving STB Viewer Possibilities Database 960. Individual behaviors may be approximated as a best fit of the data groups from IDGM Calculation Algorithm 940 and Evolving STB Viewer Possibilities Database 960 for each event. In this manner, the behavior of one individual may be tracked over time.

New specification percentages from Evolving STB Percentages Database 950 may be continuously available and periodic recalculation of individual behaviors may be preferred. Percent changes in Evolving STB Percentages Database 950 may be small and determinable through time, and this may be the factor used to determine the interval of individual behavior recalculation.

Figure 7:
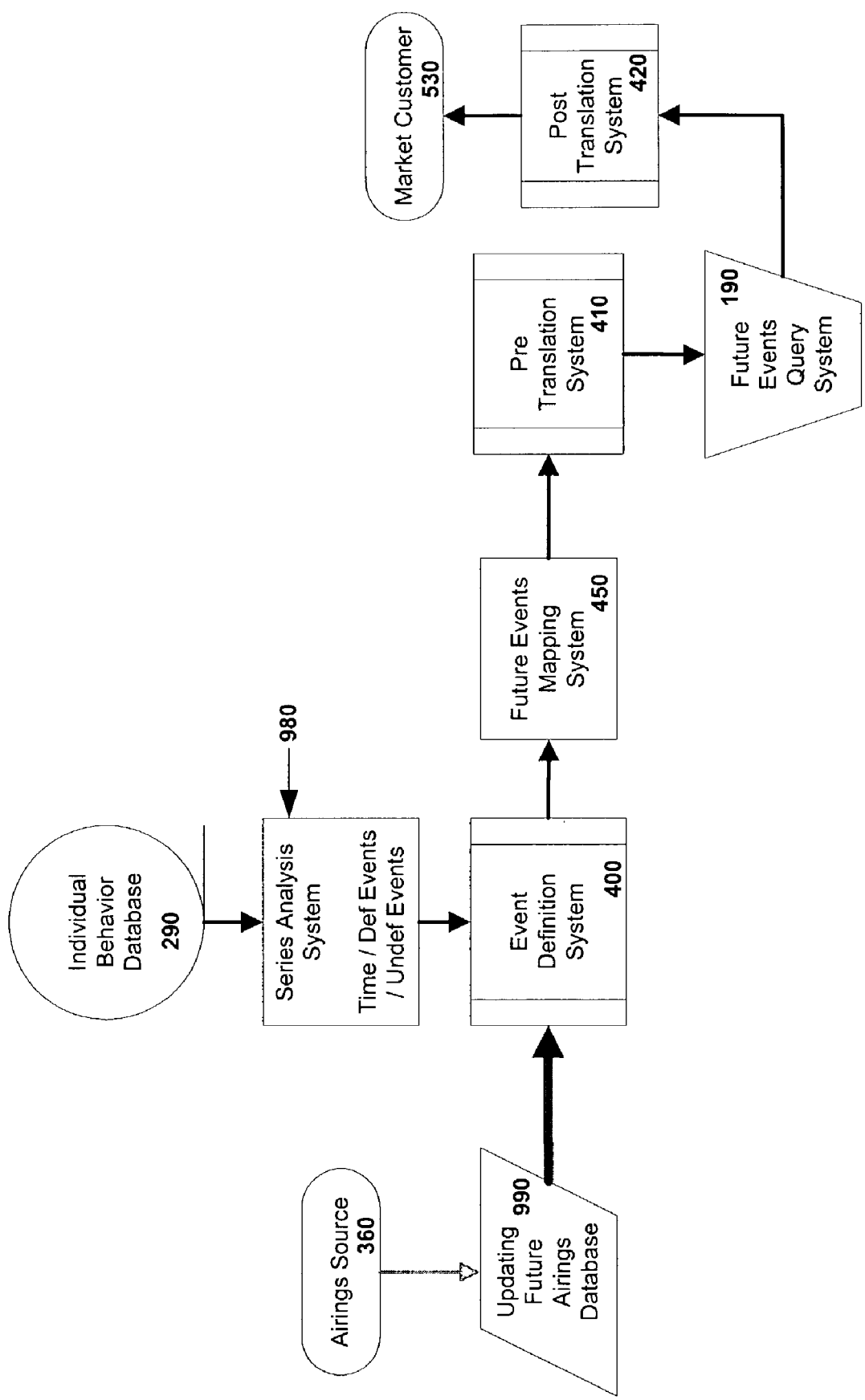
FIG. 7 is a block diagram of the Future Events Query System of the present invention.

FIG. 7 is a block diagram of modules comprising Future Events Query System 190 of FIG. 1. Future Events Query System 190 may be different from Past Events Query System 200. Future Events Query System 190 may comprise a web-based system, which interacts with Post Translation System 420, allowing Market Customer 530 to query the present invention regarding behaviors that are most likely to occur in the future. Future Events Query System 190 may include a web-based system with a natural language, graphical, or command-line interface, providing the customer with the ability to extract information from the system.

Individual Behavior Database 290 can contain individual-specific behavior information as determined by the present invention. Individual behaviors may be analyzed by Series Analysis System 980, which can comprise a system that looks for data trends and patterns (both directed and undirected).

Series Analysis System 980 may comprise an algorithm looking for trends in individual and group viewing behaviors that may efficiently define relevant behavior patterns. Such series analysis algorithms may be time based, defined behavioral events, and undefined behavioral events, such as a straightforward series that determines behavioral patterns. These algorithms may take individual behaviors from Individual Behavior Database 290 and look for trends based on time, content, channel changes, and the like. Series Analysis System 980 may also define relevant events according to results of its analysis.

Relevant viewing events may comprise events that represent some pattern describing viewing behaviors. Events may be pre-defined events such as "changing the channel at the end of a show" or "changing the channel at the beginning of a commercial," or they may be definitions that are more arbitrary, such as "changing the channel twice in 5 seconds before changing the channel 3 times in the next 10 seconds." Events may result from individual behavior data mining based on series analysis and behavior pattern determination, and then reporting such patterns in a simple form. By way of example, the present invention may learn that a particular graphic category may not get home until 6:00 pm, then views a news channel for half an hour, then turns the set-top box off for an average of a half hour, presumably for dinner.

One series analysis that may be performed by the present invention is a Time Series Analysis ("TSA"). In a TSA, trends that can be fully described as a function of time may be identified. This distinction is made since most mathematical series analysis methods are usually referred to as 'time-series analyses.'

An alternative series analysis that may be performed by the present invention is a Defined Event Series Analysis ("DESA"). A DESA can identify trends which may be fully-described as a function of a set of behaviors, such as changing the channel near the beginning or end of an hour or near the beginning or end of certain content, watching entire programs, watching certain genres, and the like. A DESA can allow the present invention to identify not only those features that are of interest to the present invention, but also to customers of the system as well.

Still another series analysis that may be performed by the present invention is a Undefined-Event Series Analysis ("UESA"). A UESA is similar in many respects to a DESA, except that a UESA can look for general trends while defining its own events. By way of example, without intending to limit the present invention, sampled individuals may be on time schedules or have general viewing habits about which the present invention may soon learn.

After series analysis, events that the present invention identifies as describing behaviors in Individual Behavior Database 290 may be sent to Event Definition System 400, where an emphasis may be placed on behaviors that are more current. Event Definition System 400 can also accept input from Updating Future Airings Database 990 which may hold a content guide that may include content attributes and content presentation information. Such content presentation information may include, but is not limited to, to networks or channels presenting such content, and times such content was or will be made available.

Event Definition System 400 can break down programming into events defined efficiently by Series Analysis System 980. Event Definition System 400 may comprise an algorithm that may accept a broad range of content attributes.

Event Definition System 400 may also break content apart into a best fit of events as determined by Series Analysis System 980.

Updating Future Airings Database 990 may comprise a database of arrays holding a best guess at what content may be aired at any time in the future. Airings Source 360 may continuously update Updating Future Airings Database 990. For times relatively far into the future, general extrapolations may be made to save data space.

Future content may be broken down in terms of viewership events existing in Event Definition System 400. From these datasets, Future Events Mapping System 450 may map future individual and group events onto future content by describing it in terms of the events defined by the Event Definition System 400.

Future Events Mapping System 450 may comprise a simple algorithm that linearly forecasts the most probable events onto a map of future programming. Future Events Mapping System 450 may comprise an algorithm that takes input from Event Definition System 400 and maps probable mutually exclusive sets of behaviors which Series Analysis System 980 forecasts for these events. Events of both systems may be identically defined, thus requiring only a best fit mapping of individual behaviors onto the future programming.

Market Customer 530 may query Future Events Query System 190, which may comprise a user-interface with options for tailoring such queries. Post-Translation System 420 can translate such queries into a mathematical formula that may be understood by Pre-Translation System 410. Such translations may simply express a query in a format that facilitates data extraction from Future Events Mapping System 450.

Figure 8:
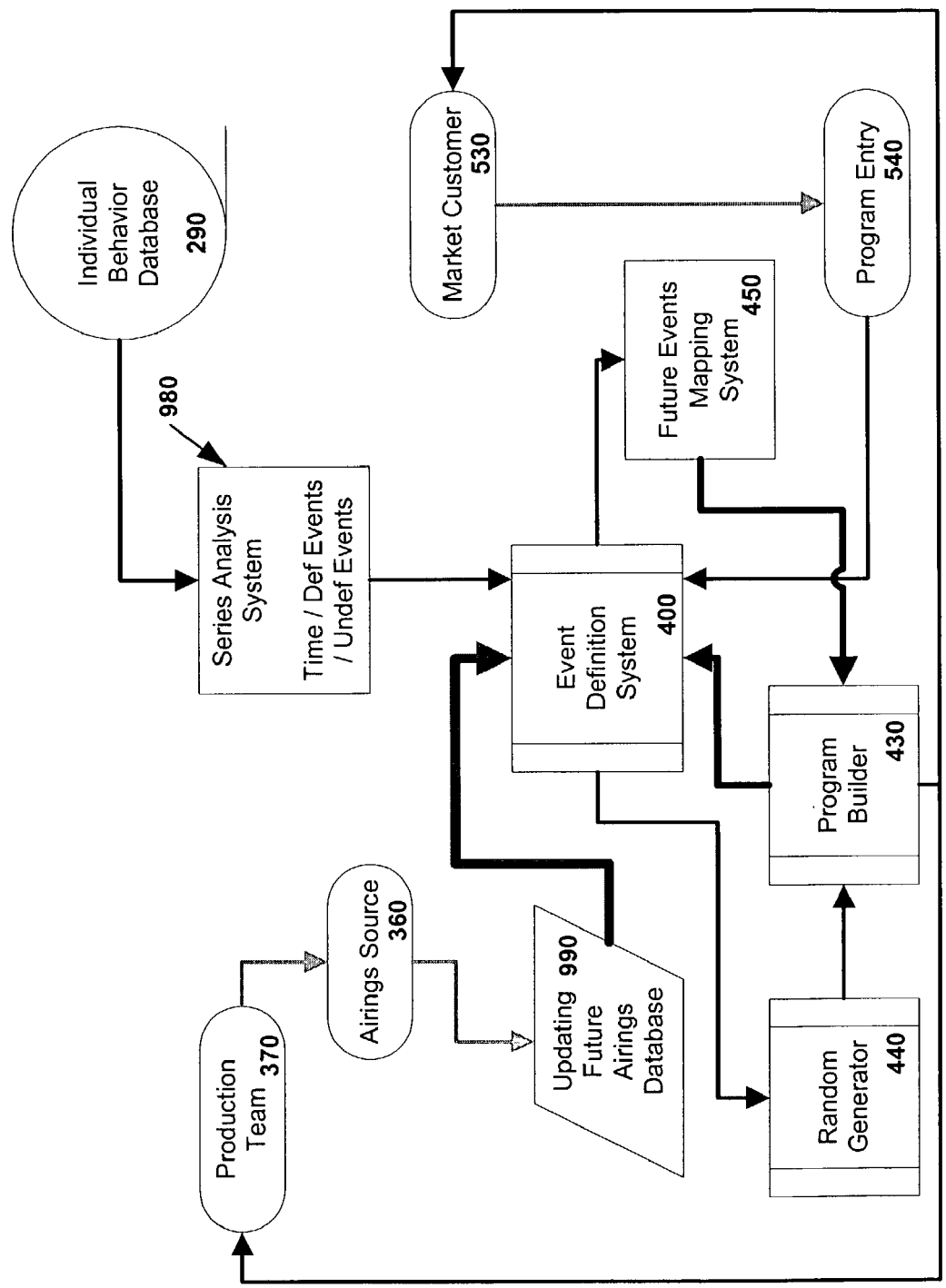
FIG. 8 is a block diagram of the Program Entry and Program Builder systems of the present invention.

FIG. 8 is a block diagram of modules used in Program Entry and Program Builder Systems of the present invention. Program Entry 540 may facilitate behavioral or viewership predictions for content which has yet to be experienced by the public based on data entered by a customer. Program Entry 540 may allow a customer to enter attribute ranges for certain content, and Program Entry 540 may report specific attribute values which best fit a desired outcome. Program Entry 540 may convert such customer data to a format readable by Event Definition System 400. Event Definition System 400 may break down content to determine likely viewership or other behaviors based on statistics generated by other portions of the present invention.

Program Builder 430 can compile a content description, including various content attributes, for content that is likely to be popular. Such content descriptions may be based on events randomly pieced together from Event Definition System 400. Program Builder 430 may have a non-random component as well, in the form of an iterative system. An iterative system may reduce processing times and increase the likelihood of quality matches per unit time.

Event Definition System 400 can pull events that best describe individual viewing behaviors and patterns from other portions of the present invention, and such events may be entered into to Random Generator 440. Random Generator 440 may comprise a random component for Program Builder 430, and Random Generator 440 may piece together content combinations to build a hypothetical program.

Random Generator 440 may comprise an algorithm which can select from content attributes and content components submitted to it in a dataset. Such selections may be performed in a computationally random manner, thereby allowing for a variety of dynamically generated content. In a preferred embodiment, Random Generator 440 may include an option, selected through Program Builder 430, which can mark as used those elements selected as part of a dataset, there by restricting the recurrence of such elements.

As with customer-generated content, probable content popularity for content generated by Program Builder 430 may be calculated through Program Entry 540. However, this calculation may also be run in an iterative or non-iterative cycle so that an optimal "proposed" program may be described.

Figure 9:
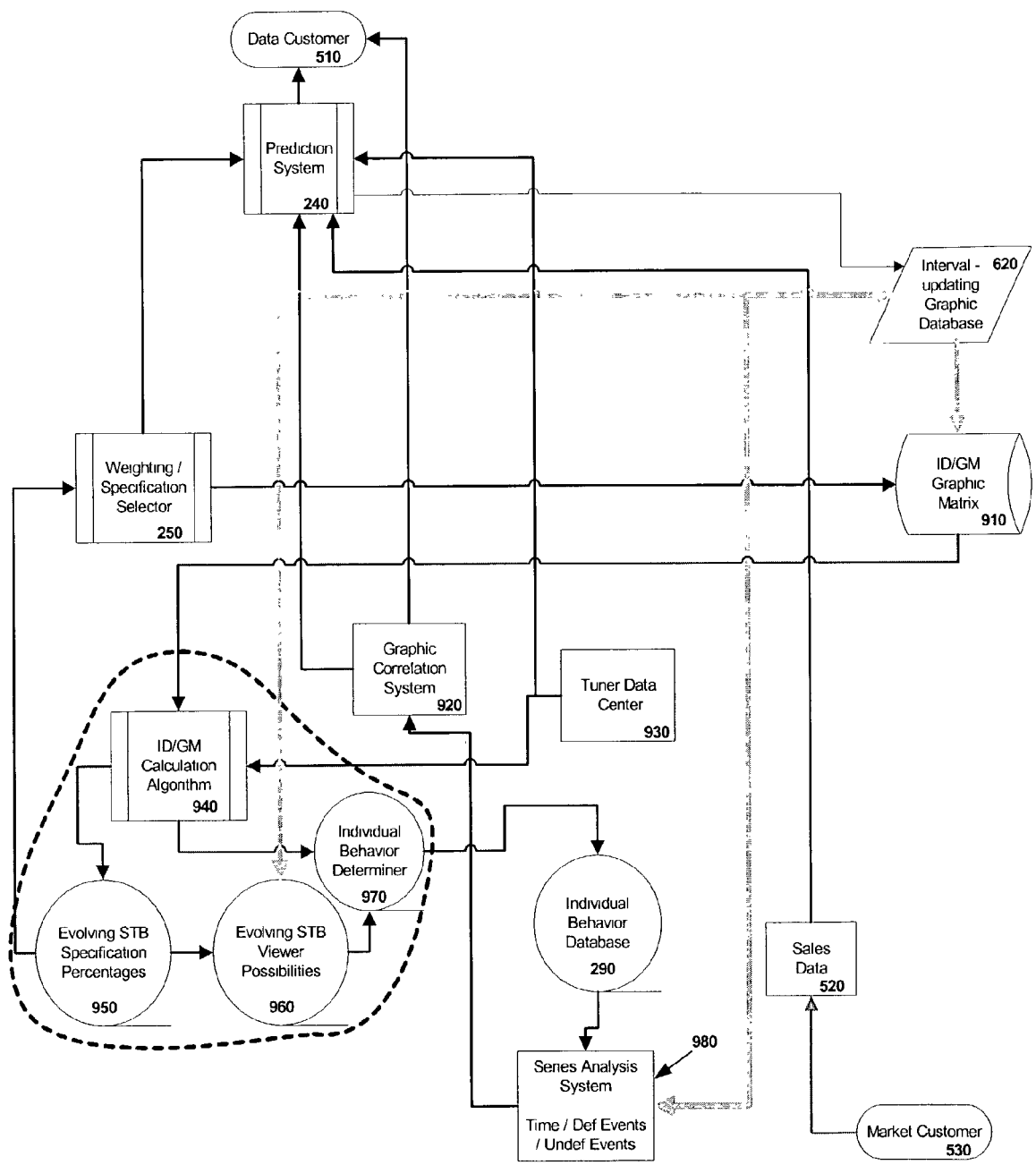
FIG. 9 is a block diagram of the Data Mining and Prediction System of the present invention.

FIG. 9 is a block diagram of modules used in a Data Mining and Prediction System of the present invention. Data Customer 510 may comprise a customer of the present invention interested in information from Prediction System 240 or Graphic Correlation System 920.

Graphic Correlation System 920 may comprise a graphic correlation database that may be updated by Series Analysis System 980. Series Analysis System 980 can analyze correlations in graphic data alone, without respect to tuner data. Graphic Correlation System 920 may hold correlations determined thus far, and may generate additional correlations. Data Customer 510 may use graphic Correlation System 920 and its correlations.

Prediction System 240 may comprise both a system of algorithms which determines statistical probabilities of DATA1, DATA2, DATA3 or other behaviors that have or will occur, and a web-based system allowing Data customer 510 to query the present invention about these behaviors or trends. Such queries may be entered through a variety of means, including natural language, graphical, or command-line interfaces. The computational algorithms of Prediction System 240 may be similar to those of Series Analysis System 980, except that Prediction System 240 may be concerned with general behavior patterns, and not necessarily those having to do with television-related behaviors.

Sales Data 520, which may alternatively be seen as DATA3, may comprise sales or other operational information about business performance or trends of customers, competitors, or an industry in general. Such data may share features, such as a zip code, with a DATA2 counterpart. Market Customer 530 or other data sources may provide such data in a format readable by Series Analysis System 980. This data may comprise data based on sales figures for operations in certain geographic regions, or other information, such as colors or street locations of stores, phone numbers, building types, and the like.

Market Customer 530 may comprise a customer interested in past viewership data or a customer attempting to predict the desirability of previously unaired content. In a preferred embodiment, Market Customer 530 may provide additional data for Sales Data 520; such data may be cross-referenced to commercial programming, competitors, and the like.

While a preferred embodiment of the present invention is geared toward measuring television viewership, the present invention may be useful for other purposes. For example, the Series Analysis algorithms used by the present invention may be run against Graphic Data, Sales Data 520, and the like without respect to set-top box data. Through such analysis, the present invention may provide detailed demographic data in addition to a market research services. Such analyses may be extended to look for trends in demographic data, thus further refining the understanding of a geographic region for advertisers, government agencies, and others interested in such data. This analysis could effectively be used to further define the effects of commercial programming, to more appropriately plan cities and city services, and other such purposes.

Weighting/Specification Selector 250 may determine graphic categories of interest to such parties by evaluating values from Evolving STB Specification Percentages Database 950. Low-relevancy categories may be rejected and new categories can be selected or introduced for evaluation. Weighting/Specification Selector 250 can determine graphic categories that may be most relevant to viewing behavior, and may comprise an algorithm that weighs categories according to sets of specification percentage sums.

Higher mutually exclusive category sums, built on a smaller number of specification percentages, may create a higher weight. A formula may be provided that determines whether a category should be excluded in the next update of IDM Graphic Matrix 910. Depending on the nature of IDM Calculation Algorithm 270 or 940, weights may be included in the calculation system rather than responsible for category exclusion in the Identity Matrix.

In addition to the embodiments described above, the present invention may also serve as a basis for revolutionizing advertisement delivery. Advertisements have traditionally been directed at viewers based on demographics associated with the content with which an advertisement runs. That is, an advertiser typically selects a television or radio program which market research has shown to be appealing to the target audience for the product being advertised. When such a program is available to a regional or nationwide audience, some advertisers may limit advertisements to specific markets in which their target audience is likely to live, thus increasing the cost effectiveness of the advertising.

While the prior art advertising method has proven moderately effective, the advertiser has no way of knowing whether the target audience actually receives the advertisement, or that the target audience was even attracted to the particular occurrence of the program in conjunction with which the advertisement aired. The present invention allows for more precise targeting of advertisement recipients and can significantly increase the likelihood that an intended recipient actually experienced the advertisement. Through its systems and methods, the present invention can thus improve overall advertising cost effectiveness by allowing advertisers to gather more information about a particular STB or group of STB's and direct advertisements thereto while still providing anonymity and privacy protection to STB users.

Figure 19:
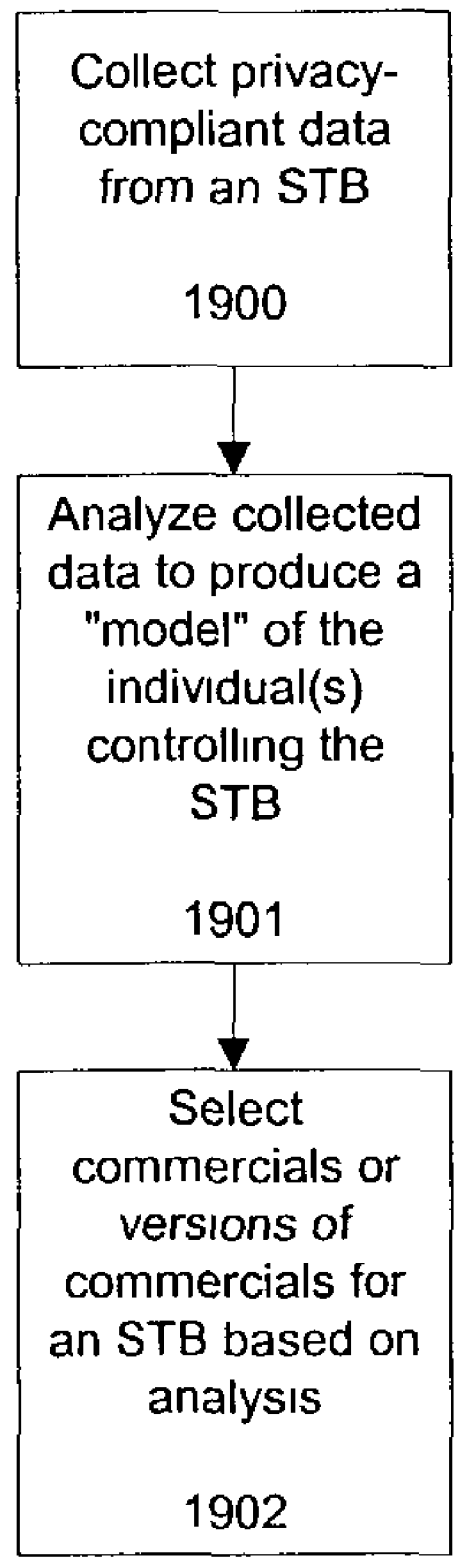
FIG. 19 is a flowchart illustrating a general method by which advertisements or other content can be targeted to individual STB's and STB users.

FIGS. 19 through 24 illustrate a sample embodiment through which advertisements can be directed to an STB utilizing the privacy compliant data collection and data analysis techniques of the present invention. In FIG. 19, a three step procedure is employed to select appropriate STB's and deliver selected advertisements to the STB's. Step 1, illustrated as Block 1900, involves collection of STB viewing data in a privacy compliant manner as described above. As noted above, STB viewing data may include, but is not limited to, television content and advertisements presented to a user; Internet and World Wide Web pages visited by a user; telephone and videophone calls placed by a user; and analog and digital recordings experienced by a user, such as Digital Versatile Discs (DVD's), Compact Discs (CD's), and videotapes.

Figure 24:
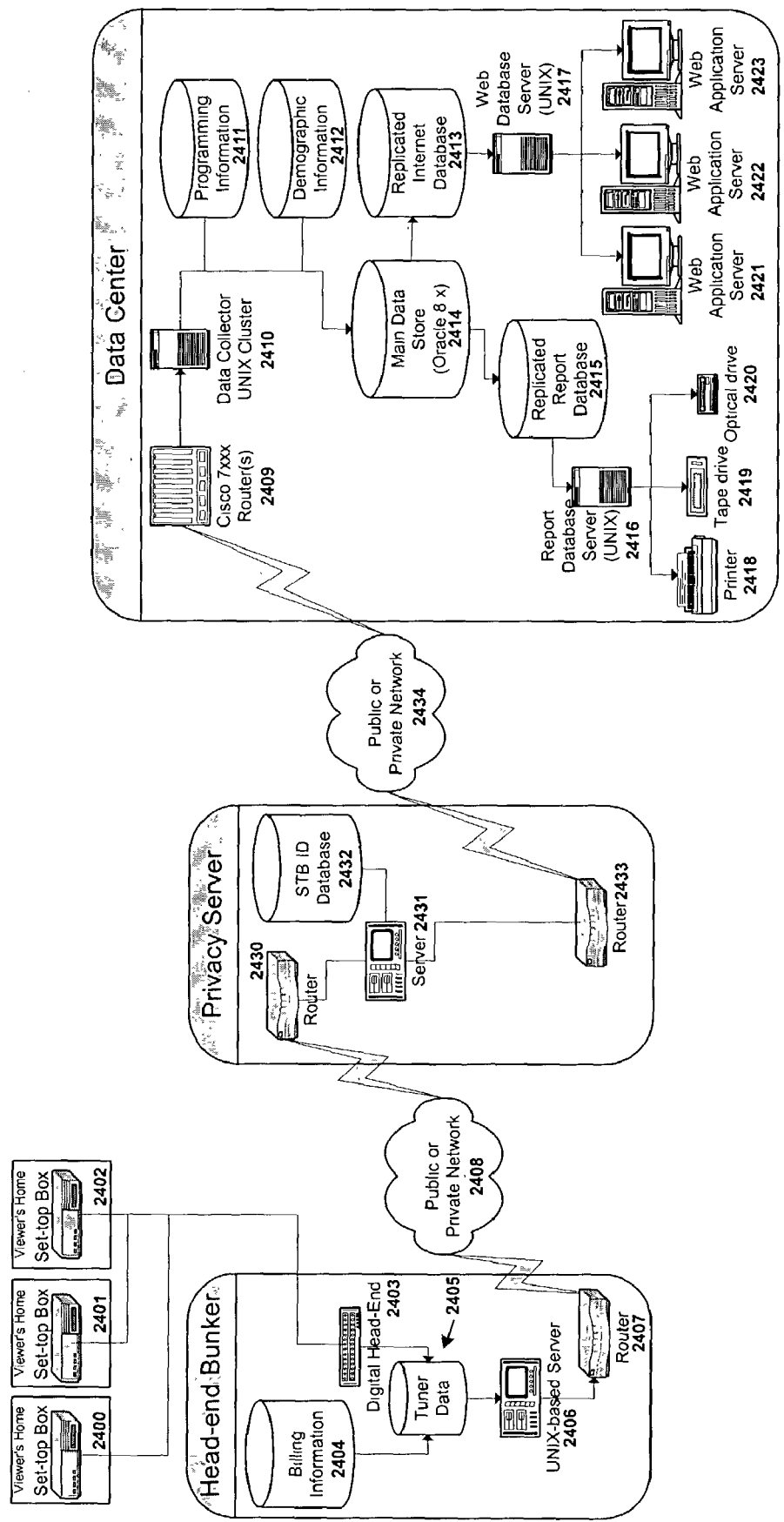
FIG. 24 provides a high level overview of a technology infrastructure through which user-specific data is be stripped from STB data by a privacy server prior to transmission of the STB data to the present invention.

In some cases, data collected from an STB may contain personal information. By way of example, without intending to limit the present invention, a user may use an STB to purchase groceries; if the user pays for the groceries with a credit card and gives a home delivery address, the STB has access to information that can be used to uniquely identify a user. FIG. 24 illustrates an architecture through which personally-identifiable information is stripped from STB data by a privacy server (Server 2431) before STB data is used by the present invention. In a preferred embodiment, a privacy server may be operated by a trusted third-party to further insure that STB data remains privacy compliant.

In addition to stripping personally-identifiable information from STB data, a privacy server can also assign a unique anonymity code (Block 2432) to each STB (Blocks 2400 through 2402). Once an STB is assigned an anonymity code, all data from that STB provided by the privacy server may reference that code, rather than a fixed address, cable television company billing number, or other reference that might be used to work backward to the particular household, thus obviating the privacy protection. Anonymity codes assigned to STB's by a privacy server should be unique to each STB so that STB usage history can be collected over time. In the embodiment illustrated in FIG. 24, the only personal information the privacy server should include in the data is the zip code in which an STB is located.

Once STB viewing data has been collected, the process continues to Step 2, illustrated in FIG. 19 as Block 1901. In Block 1901, data collected in Step 1 is analyzed to produce a demographic model of the individual or individuals controlling the STB. Thus, for each STB, a history of every action exhibited by the STB, including which shows were watched, surfing profile, propensity to sit through a commercial, and other such data, can be created.

Figure 20:
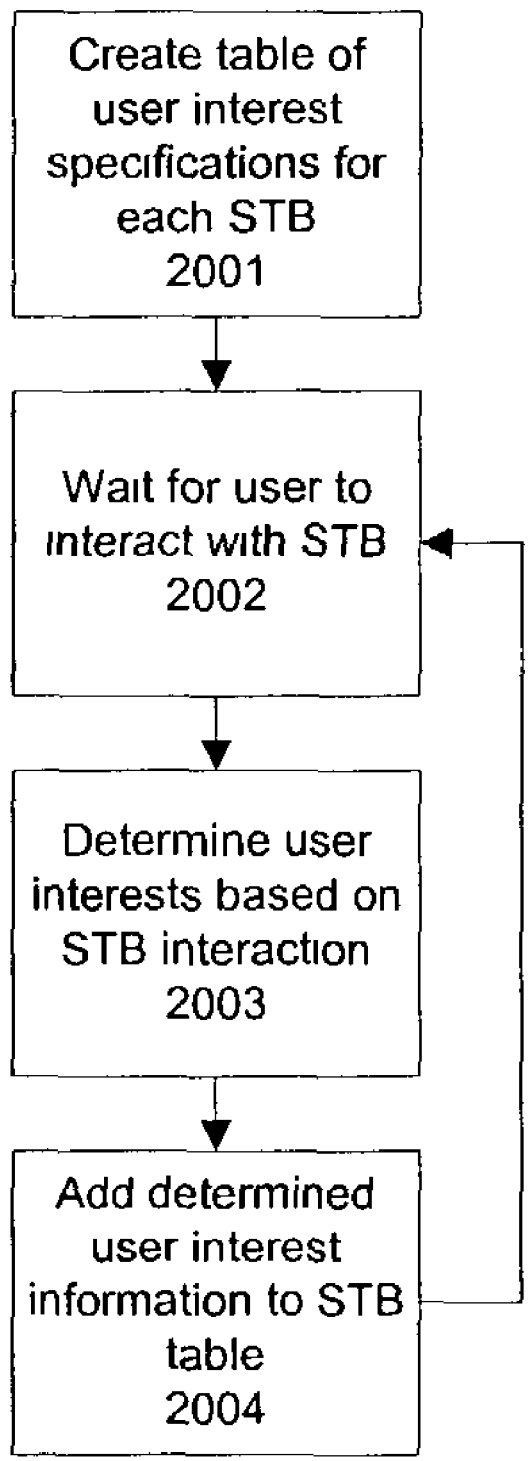
FIG. 20 is a flowchart illustrating a method by which user interests may be associated with an STB.
Figure 21:
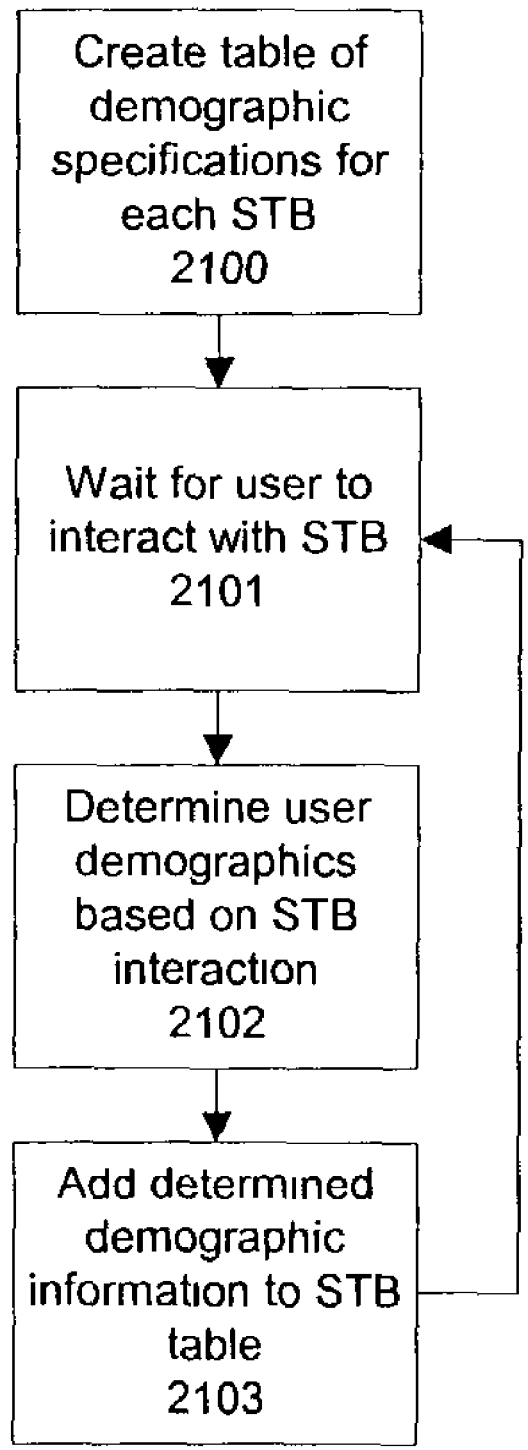
FIG. 21 is a flowchart illustrating a method by which user demographics may be associated with an STB.

As FIGS. 20 and 21 illustrate, advertisers can use data collected by the present invention to target advertisements to STB's based on a variety of criteria. To achieve such a wide range of targeting options, the present invention may track STB interest and demographic attributes through database tables (Blocks 2001 and 2100) using the inverse demographic matrix (IDM) method described above.

As a user interacts with an STB (Blocks 2002 and 2101), attributes of content presented to the user (Block 2003) and demographics associated with the user's behavior (Block 2102) are associated with the STB (Block 2004 and 2103) to create demographic and interest association tables. In a preferred embodiment, such tables are stored at a data center. However, it should be appreciated by one skilled in the art that such tables need not be stored at a data center, and can be stored anywhere that such data is accessible to the present invention, including, but not limited to, within an STB.

To ascribe demographic characteristics to a particular STB, the IDM can calculate which demographic specifications most closely match STB viewing behavior for each time period an STB is in use. In a preferred embodiment, this is implemented by creating a database table with fields corresponding to a demographic specification, such as the table illustrated in FIGS. 22(*a*) through 22(*l*). As FIGS. 22(*a*) through 22(*l*) illustrate, such a table may include fields for defining the age (FIG. 22(*a*), FIG. 22(*e*), and FIG. 22(*i*)), sex (FIG. 22(*a*), FIG. 22(*e*), and FIG. 22(*i*)), race (FIG. 22(*b*), FIG. 22(*f*), and FIG. 22(*j*)), income (FIG. 22(*c*), FIG. 22(*g*), and FIG. 22(*k*)), and education level (FIG. 22(*d*), FIG. 22(*h*), and FIG. 22(*l*)) of one or more STB users. Additional fields may be added to the table, or fields may be removed from the table, to improve the accuracy of the user model. Initially, the value of each table element is set to zero.

As illustrated by Block 2003 of FIG. 20 and Block 2102 of FIG. 21, the IDM can be invoked for each STB event or set of STB events (illustrated by Block 2002 of FIG. 20 and Block 2101 of FIG. 21) to calculate the probability that a particular demographic type is experiencing the content that an STB under study is experiencing. These probabilities are then added to a corresponding database table element (Blocks 2004 and 2103). As such data is collected, some elements of the table will greatly exceed others; these elements correspond to predicted demographic specifications of a person or persons using an STB. Through this system, demographic and interest association tables may be built in real-time, as a user interacts with an STB. In the event demographic and/or interest association tables are not created when STB monitoring begins, demographic and interest association tables may be enhanced by mining previously recorded STB data.

An important aspect of this embodiment is that derived demographics need not match the actual demographics of STB users: the idea is that STB users are behaving as though they are of the derived demographic types. Such "demographic-like" behavior can be more important to an advertiser than actual demographics. For example, if a 56-year-old man is very active and tends to watch sport and fitness shows that are demographically more appropriate to a 25-year-old man, then he will most likely be interested in spending his discretionary money in ways that reflect the buying habits of a 25-year-old more than a 56-year-old.

While demographics are useful in targeting advertisements for some products, such as luxury cars, demographics are not always the best indicator of how likely a person is to purchase a product. For example, some products, such as, but not limited to, boats, mountain bikes, skis, woodworking tools, computers, and model airplanes, appeal to a relatively small number of people, compared to the population at large, who come from a wide variety of demographics. To target such products to appropriate STB's, and thus to appropriate people, it may be more advantageous to look to the interests of the person controlling an STB.

STB interest characteristics can be determined in a manner similar to that used to determine STB demographics. By way of example, without intending to limit the present invention, the statistical pattern recognition methods described above may be applied to recorded and/or current STB behavior, thus allowing the present invention to extract important STB data correlations.

Applying statistical pattern recognition to STB viewing behaviors will find subtle user interest correlations which can be used to produce an STB profile that can be sold to advertisers to allow them to target specific commercials to a particular group of users. As a simple example, if it is found that a particular STB is used to experience a large number of home-improvement shows, it would probably be advantageous for a manufacturer of household tools to advertise to that STB.

Not only can STB user models created by the present invention include demographic and user interest tables for individual STB's, but the present invention can also create subsets thereof based on the time of day, day of the week, demographic attributes typically associated with content experienced on the STB and World Wide Web Sites visited through the STB, and other such measurements. FIGS. 22(a) through 22(l) illustrate a sample STB user demographic table capable of assisting with such determinations. By way of example, without intending to limit the present invention, the table in FIGS. 22(a) through 22(l) can allow an STB to learn that on weekdays between the hours of 2:45 PM and 5:00 PM, an 8 to 10 year old male child is typically controlling the STB; from 5:00 PM until 7:00 PM the STB is typically powered off (presumably for dinner); and from 7:00 PM until 10:00 PM the STB is typically controlled by an adult female, 25 to 35 years of age, with an income of $35,000 to $45,000. Individual advertisements suitable for the identified user can be directed to the STB based on such criteria, thereby allowing an advertiser to target content to multiple STB users through a single STB.

With an appropriate STB user model in place, processing can continue on to Step 3. Step 3 involves selecting advertisements or other content to be delivered to an STB based on the analysis of Step 2 and delivering that content to an STB. This third step includes a transformation of STB profile data to a commercial profile for that STB. A commercial profile can list types of products, commercial attributes, and the like that are likely to be successful in commercials targeted to that STB. Such a commercial profile can consist not only of product categories that appear to be of interest to the people using on that STB, but also types of information, advertising strategies, people, and the like that appear to appeal to them. For example, if the STB profile indicates that at particular times of the day, the person or people controlling the STB like to watch shows that contain attractive young women, then commercials that involve attractive young women might naturally be selected as being appropriate to that STB at those times.

While generation of a commercial profile based on STB demographic and interest tables prior to content selection is presently preferred, it should be apparent to one skilled in the art that commercial profiles may be generated dynamically as content is selected, or content selections may be made based on information stored in the STB demographic and interest tables.

Figure 23:
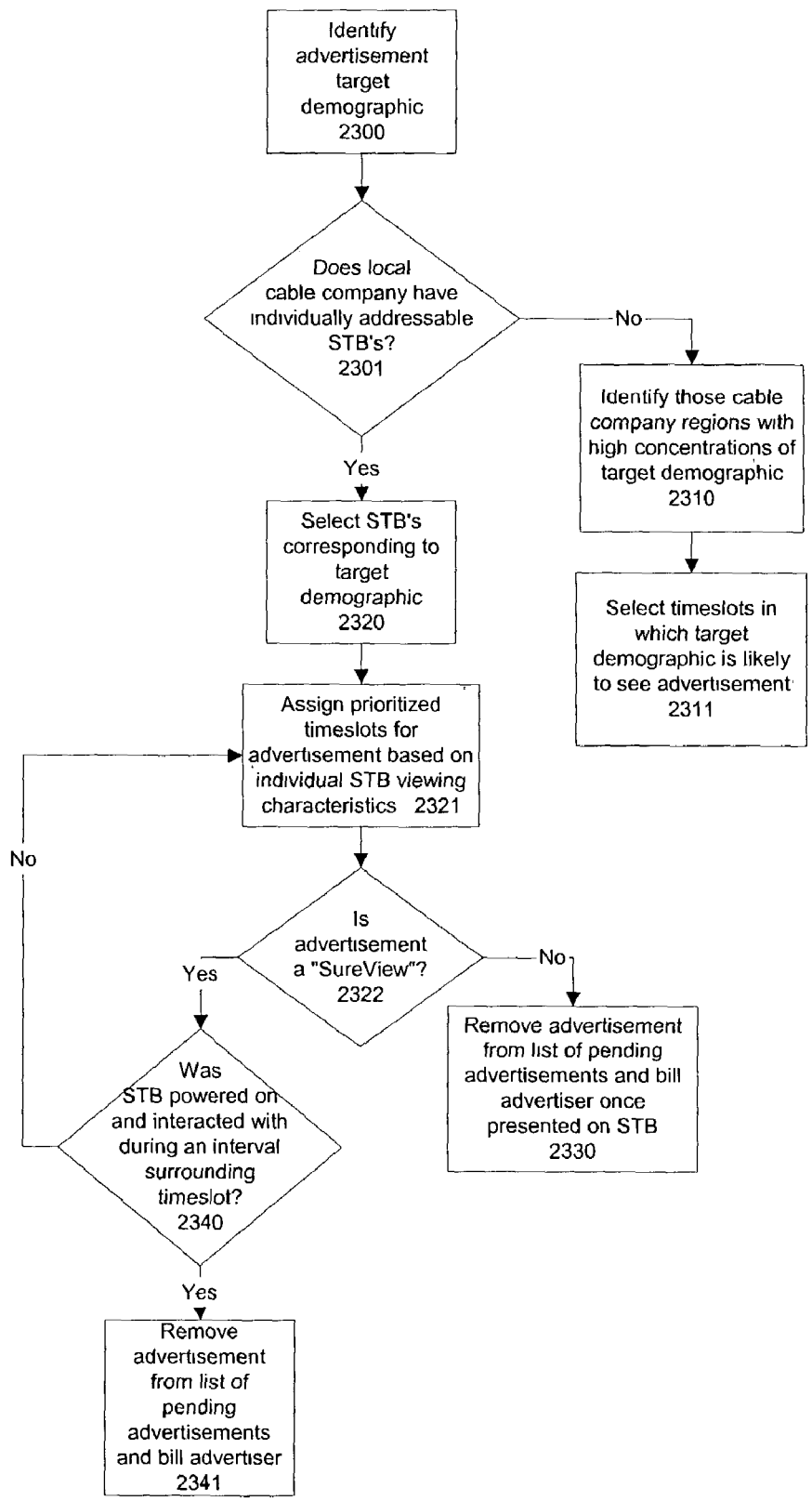
FIG. 23 is a flowchart illustrating a method by which advertisements or other content can be delivered to a user with a high probability of the user actually experiencing the content.

After a commercial profile has been created for an STB or set of STB's, commercials can be targeted to STB's based on attributes specified by the advertiser. FIG. 23 is a flowchart which illustrates a process through which an advertisement or other content can be delivered to an STB matching a targeted demographic. While the method of FIG. 23 deals specifically with demographic characteristics, it should be appreciated by one skilled in the art that an STB interest table or other STB statistics may be substituted without departing from the spirit and scope of the present invention.

The content delivery method of FIG. 23 begins with the identification of a target demographic, illustrated as Block 2300. Once a target demographic is identified, one or more cable television, satellite television, Internet, or other service providers can be selected. The content delivery method of FIG. 23 allows the present invention to behave differently depending on the capabilities of the service provider and the options selected by the advertiser.

If the service provider does not have individually addressable STB's (evaluated in Block 2201), a service provider may still be able to deliver content to a specific sub-market, such as a specific geographic area. In such a case, an advertiser may select one or more of the sub-markets with high concentrations of the target demographic (Block 2210). With appropriate sub-markets selected, a timeslot can be selected in which the target demographic is likely to see the content (Block 2211), and the content is delivered at the selected time. This is similar to prior art content delivery methods.

If the service provider has implemented individually addressable STB's (Block 2201), the set of STB's corresponding to the target demographic can be selected (Block 2220). A timeslot may then be selected in which the individual operating the STB is likely to be using the STB. If the advertiser has not chosen to make the content a "SureView" (Block 2222), the content may be removed from the list of pending content and an advertiser may be billed (Block 2230) once the content is delivered to the STB. If the advertiser has opted to make the content a "SureView", the present invention may ensure that the STB was powered on, that user-STB interactivity for a time period around content presentation was similar to the user's interactivity during other, similar time periods, and that the user did not change the channel or turn the STB off during the content presentation (Block 2240). If user interactions during the time period in which the content was presented are not similar to user interactivity in previous, similar time periods, then the content may be reassigned a prioritized timeslot. If the user interactions during the time period in question are similar to those of previous time periods, then the advertisement can be removed from the list of pending advertisements and the advertiser can be billed (2241).

Through the methods described above, a "SureView" can give an advertiser a high degree of confidence that the content was presented to the user. By way of example, without intending to limit the present invention, an advertiser may be promoting the latest combat flight simulation software, and may identify a particular STB whose demographics, user interests, or other attributes indicate a strong likelihood that the STB user would be interested in the software. Because the advertiser knows that this STB user is likely to purchase the product, the advertiser can request that an advertisement to this particular STB be a "SureView," and can initially request that the commercial be aired in the first available timeslot between 9:00 and 9:15 PM on Thursday, Nov. 8, 2001. Due to its record of user-STB interactivity, the present invention can determine that a particular STB user typically watches channel 5, but will flip to channel 27 during commercials. If, unlike typical Thursday evenings, the STB is powered off on Nov. 8, 2001, then the content can be rescheduled for another timeslot. In some cases, such rescheduling may preempt previously scheduled, non-"SureView" content. For the purposes of this example, it will be assumed that the content was rescheduled for the following Thursday. During the next scheduled timeslot, the STB is powered on and the STB user is interacting with the STB by adjusting the volume, changing channels, and the like, between 8:00 PM and 8:50 PM. Then, shortly before 9:00 PM, the user mutes the television for a period of twenty minutes, implying that the user was on the telephone or otherwise occupied, and thus unable to see the content when it was presented, and the content would again be rescheduled. If, during the next content airing, the user interacts with the STB in a manner consistent with previous interactions during similar time periods, but all or a majority of the advertisement is displayed before the user changes the channel, then the advertisement may be removed from the list of pending advertisements, and the advertiser can be billed.

In alternatively contemplated embodiments, an STB may contain a data storage element or other component that can serve as a temporary buffer in which program content can be stored. If a user changes channels during a "SureView" advertisement, the STB may force the user to see the advertisement before the channel change is recorded. In such an event, the program content aired on the alternate station during the "SureView" advertisement may be buffered and played back on the STB once the advertisement is complete. In some applications, it may be acceptable to speed the playback from the buffer, thereby allowing the buffered content to become synchronized with the delivered content and obviating the need for the buffer. If the user changes channels or turns off the STB during playback of content stored in the buffer, the buffer contents may be purged.

Figure 25:
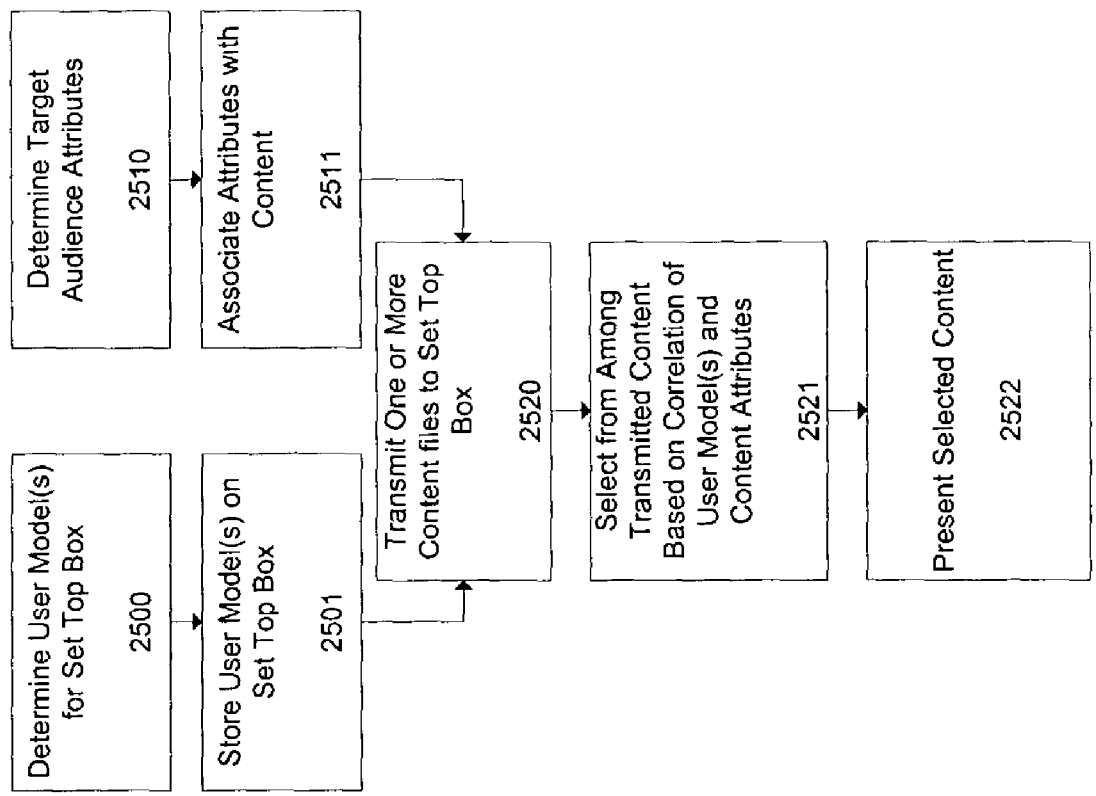
FIG. 25 is a flowchart illustrating an method through which content can be delivered to a STB.

FIG. 25 illustrates an additional content delivery embodiment. In FIG. 25, once a user model or models are developed for an STB (Block 2500), such user model information may be stored on an STB. In an alternatively contemplated embodiment, the present invention may pre-define a limited number of user categories, and an STB may store an identifier or identifiers associated with user categories to which its user or users are determined to belong.

Content creators can also create content (Block 2510) to which target audience attributes, including user model attributes and user categories, can be associated (Block 2511). In the embodiment illustrated in FIG. 25, an STB can select from multiple content files or content streams transmitted to the STB (Block 2520). In an alternatively contemplated embodiment, an STB may store one or more content files on the STB, and content selection may be based on such stored content. Content selection can be based on a correlation between the user model stored thereon and the target user model attributes associated with content (Block 2520). Once appropriate content has been selected, an STB can present the content to the user.

The concept illustrated in FIG. 25 is perhaps more easily understood by way of an example. Although the following example is directed toward commercial advertisements, one skilled in the art should appreciate that it can be applied to any content without limitation. In this example, a cola company is embarking on a new advertising campaign, and they decide to shoot four new commercials. One commercial stars an up and coming comedian, and is targeted at both males and females over sixteen years of age. Another commercial stars a group of female movie stars who star in an upcoming theatrical release, and is targeted primarily at males age sixteen to thirty five. Still another commercial stars a rising Latin-American male singer, and is primarily targeted at females age twelve to forty. The final commercial shows several adults enjoying a cola with children who appear to be their grandchildren, and is targeted at adults over the age of forty five. In each case, the targeted demographic information is stored with or otherwise associated with each commercial.

The cola company then purchases advertising time with a cable television, satellite television, Internet, or other service provider. However, rather than indicating that a specific commercial is to be aired, as is commonly done in the prior art, in the embodiment illustrated in FIG. 25 the cola company would provide all of the commercials to the service provider. At an appropriate time, the service provider transmits all four of the commercials through their system. When the STB receives the commercials, the STB selects the best commercial from among those transmitted based on a correlation between one or more user models stored on the STB and the attributes associated with the content. Thus if, at the time selected by the cola company, the STB is typically used by an eighteen year old girl, the STB may select the advertisement featuring the male singer. If, alternatively, the STB user model indicated that a sixty year old woman typically used the STB at that time, the advertisement with the adults and children could be chosen. In a final example, if the STB user model indicated that a thirty seven year old male typically operated the STB at that time, the STB might display the advertisement featuring the comedian. Although content selection in each of the preceding cases is based on a demographic attribute, it should be apparent to one skilled in the art that content selection can be based on additional user model attributes, including zip code, user interests, and the like, without departing from the spirit or scope of the invention. Once the appropriate cola advertisement has been selected, and at the time chosen by the cola company, the chosen advertisement can be presented to the user.

Through the system and methods described above, the present invention allows for privacy compliant collection of STB data. This, in turn, allows advertisers, television executives, and others to determine STB viewing habits, demographic and interest attributes, and other information associated with STB users. This information can be used to direct various content to STB's, and ultimately to users, without a user worrying that such attributes can be correlated back to the specific user.

Advertisers, television executives, and other can also use the data obtained through the present invention to analyze the impact of various content attributes on user behaviors. By way of example, as previously discussed, the present invention can help an advertiser identify what content attributes appeal to users generally, and to specific demographics. The present invention includes a system and methods for analyzing set-top box event data, viewership logs, and other such data, wherein the system and methods facilitate demographic-specific, household-specific, and/or set-top box specific content reaction analysis.

While the description below focuses predominately on the evaluation of television commercials and television shows, this is done for illustrative purposes only and should not be deemed as limiting the present invention. By way of example, the present invention can also be used to monitor user reactions to radio advertisements or radio programming, thereby facilitating a detailed analysis of user listening habits. As a further example, the present invention can be used to analyze the effectiveness of, and user interactions with, advertisements on internet web sites, including the frequency with which such advertisements are presented or changed, the size of the advertisement, whether the advertisement is placed in front of or behind the information in which the user is interested, whether the advertisements are static or dynamic, and other such attributes.

Still further, although the preferred embodiment of the present invention discussed below describes the analysis of set-top box event data, the present invention is not limited to analysis of such data and can instead accept data from a variety of sources. Thus, for example, set-top box event data can be combined with manually prepared viewership logs or data collected using other methods to enhance the amount of data available to the present invention. Alternatively, data collected using other methods may be substituted for set-top box event data without departing from the spirit or the scope of the present invention. While data collected from such data collection methods may be used in conjunction with the present invention, such data is not presently preferred as it typically does not provide the second-by-second resolution preferred by the present invention. Still further, although an individual demographic matrix based user profile creation means is preferred, it should be apparent to one skilled in the art that alternative user profile creation means can be substituted therefor without departing from the spirit or the scope of the present invention.

One advantage of the present invention is that it can supply content providers, such as local broadcast/cable TV stations and affiliates, with information necessary to produce content that appeals to a specific demographic. An object of the present invention is to give content producers, and particularly upper management, detailed viewership statistics, such as ratings, as well as detailed viewership demographic information and customer flow analysis. The present invention preferably provides such information on a second-by-second basis, which has heretofore been unavailable. Although a second-by-second analysis is preferred, it should be apparent to one skilled in the art that alternative time resolution analyses are possible, such as minute-by-minute analyses, without departing from the spirit or the scope of the present invention. In fact, the lowest resolution possible through the present invention is determined by the accuracy of the set-top box clock or other time-stamp apparatus and the number of bits used to store such time stamps within the present invention. Thus, the present invention can conceivably evaluate content reaction at the millisecond level and even finer resolutions, although such analysis may not prove valuable. As described above, this is in sharp contrast to traditional data collection methods which typically provide minute-by-minute resolution at best, which is not sufficient for analyzing some viewership trends and some types of content, such as advertisements.

Still another advantage of the present invention is its ability to present content reaction information in an easy to comprehend, yet detailed format. In a preferred embodiment, the present invention achieves the above-described goals by presenting, in a graphical format, the second-by-second ratings, share, and actual sampled number of viewers for an entire content segment, such as a half hour or hour program, as well as a dynamic graphical representation of the demographic breakdown of those experiencing the content. The present invention also preferably allows the demographic breakdown to be limited to a given geographic region, such as by zip code, area code, state, or the like, and by other factors tracked within the present invention.

Demographic breakdowns should preferably include the number of persons viewing within a geographically bounded area in the following demographic categories: Age, Sex, Race, Household Income, and Household Information. While those demographic categories are presently preferred for the creation of demographic breakdowns, it should be apparent to one skilled in the art that alternative demographic information can be added to or substituted therefor without departing from the spirit or the scope of the present invention. The demographic categories can be used individually or in combination to provide content producers with a detailed analysis of the customers experiencing the content. By way of example, without intending to limit the present invention, a television station manager can use the present invention to determine the number of Asian females between 12 and 14 years of age living in McLean, Va. who experienced the content at any given time.

Thus, through the data collection and data analysis techniques described above, in conjunction with the data presentation system and methods of the present invention, a television station manager can empirically determine that community activities, such as after-school activities, are keeping a particular target audience from experiencing content, such as an advertisement, at a particular time on particular days of the week, and can rearrange content presentations to better coincide with target audience availability. By recognizing and increasing overall target audience availability, the present invention can allow an advertiser or other content producer to reduce advertising expenditures, and can allow television station managers to demand a premium for presenting content during certain time slots.

The present invention is likely to be especially appealing to local television station managers and others who are responsible for delivering customized content to a limited geographic region. By way of example, without intending to limit the present invention, the present invention may be useful in analyzing content such as early news (traditionally broadcast at 6:00 PM local time), late news (traditionally broadcast at either 10:00 or 11:00 PM local time), and early morning programming. Traditional data collection methods, such as those described above which are used by Nielsen Media Research, do not provide a fine enough geographic resolution to make them economically feasible for local television stations. In addition, traditional data collection methods can only provide information at the household level, and cannot directly provide demographic analyses of the collected data, which also tends to make the data of limited value to local television stations. Unlike traditional data collection methods, the present invention can quickly and easily provide detailed analysis of users experiencing content, as well as behaviors exhibited by such users.

In keeping with the sample television station embodiment described above, other potential uses for the present invention include evaluation of syndicated programs purchased for broadcast on a station. The present invention can help a television station manager or other decision maker evaluate such programming for rating, share, viewer retention, demographic details, and other such valuable information. Again, the present invention facilitates such decision making without the high costs typically associated with Nielsen Media Research data, and with more information detail.

While the present invention preferably utilizes privacy compliant set-top box data as the basis for its analysis, it should be apparent to one skilled in the art that other data can be substituted therefor without departing from the spirit or the scope of the invention. The functionality of the present invention is described below from the perspective of a user, such as a television station manager. A preferred embodiment of the present invention provides content experiencing and content reaction information, such as television programming viewership information, to a user based on geographic regions to which the user subscribes. Typically, such subscriptions will cover the geographic region serviced by a particular user, although a user may subscribe to other geographic regions. By way of example, without intending to limit the present invention, a user may subscribe to alternative geographic regions to evaluate the attractiveness of expanding into an alternative geographic region.

Figure 26:
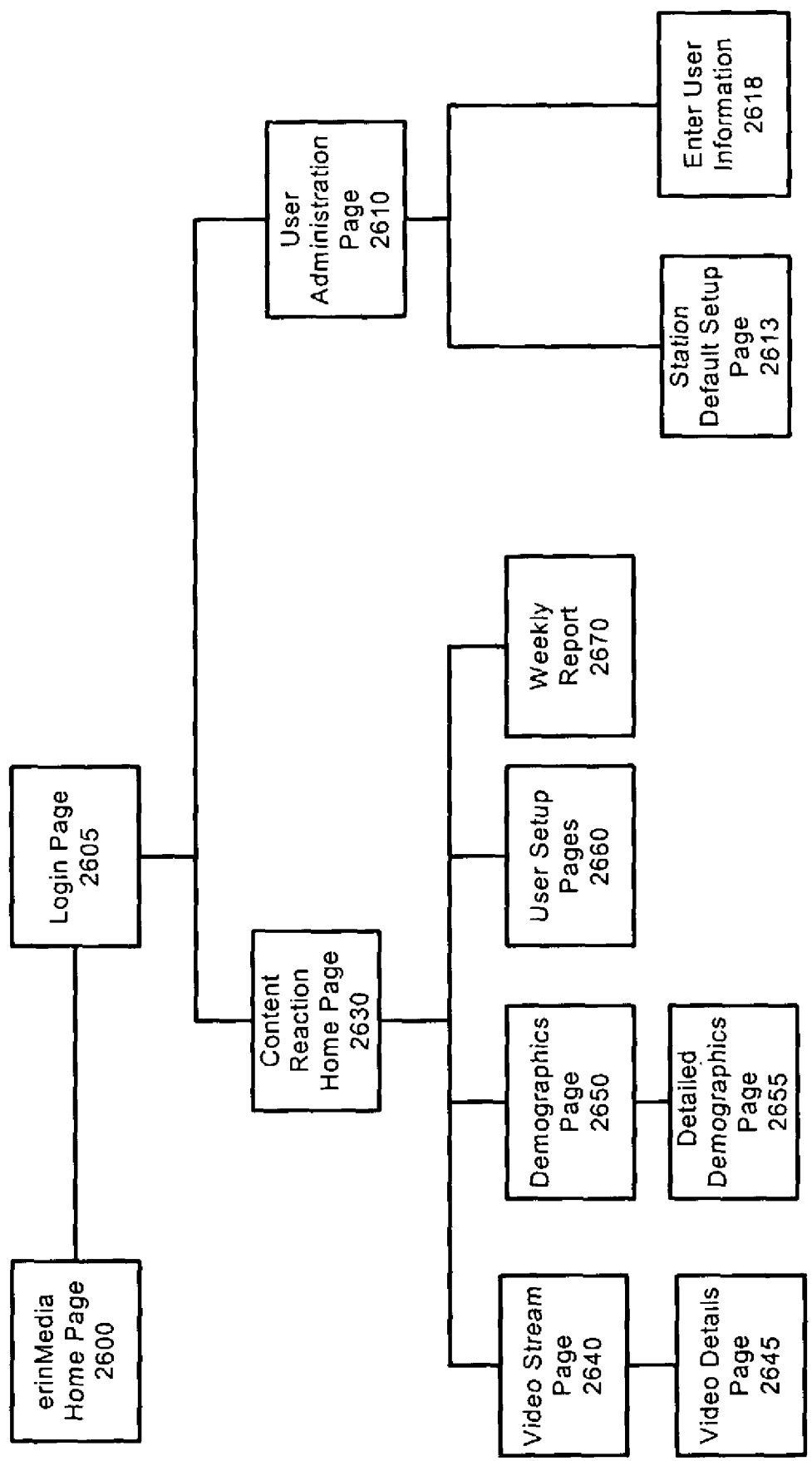
FIG. 26 is a flow chart illustrating enumerating functions available in a preferred embodiment of the present invention and a hierarchical structure through which such functions can be accessed.

As FIG. 26 illustrates, the present invention is preferably an Internet-based tool accessible through the World Wide Web. Users can access the present invention, for example, by following a link from a homepage 2600. Because one contemplated economic model for the present invention involves charging users for access to the content reaction analysis tools described herein, the present invention preferably requires that users enter a username and password or provide some other authentication information, as illustrated by Login Page 2605.

Figure 27:
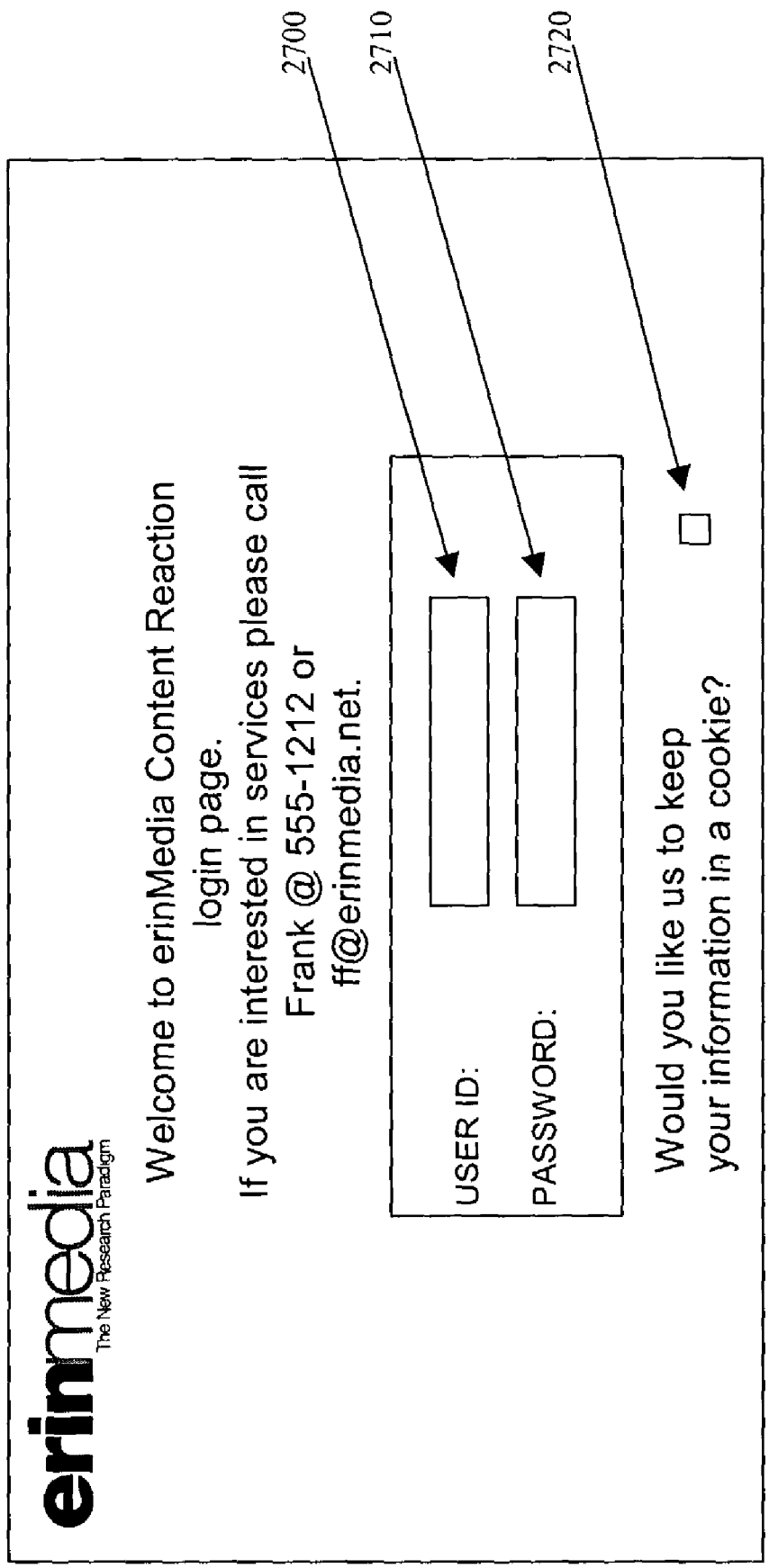
FIG. 27 is a screen capture of a preferred login screen.

FIG. 27 illustrates a sample login page. In the embodiment illustrated in FIG. 27, users enter their identification information in User ID field 2700 and their password in Password field 2710. If the user wishes to avoid having to reenter their authentification information each time the login page is visited, the user can select check box 2720, which causes the present invention to store appropriate information in a "cookie" or similar local data storage means. Such information may be encrypted to reduce the likelihood of improper use. Facilitation of the use of cookies should be apparent to one skilled in the art and is not directly discussed here. Referring again to FIG. 26, once a user has been authenticated by the present invention, the user can either access content reaction information through Content Reaction Home Page 2630 or, if the user is an administrator, the user can customize default settings and add/remove users via User Administration Page 2610.

Continuing with the example television station embodiment described above, the present invention preferably creates one "administrator" account for each television station subscribing to the present invention. Administrator accounts are given rights to change default presentation settings, request changes to the geographic region over which data is supplied, and perform other such functions, as illustrated by Station Default Setup Page 2613. An administrator account can also provide access to the information licensed by the television station to others, such as sales and/or marketing staff, as illustrated by Enter User Information 2618. Such access is provided by the creation of sub-accounts to the administrator account. Because additional costs may be associated with the creation of each new sub-account, it is clearly advantageous to limit the creation of such sub-accounts to only a select group of users, in this case the administrators.

Figure 28:
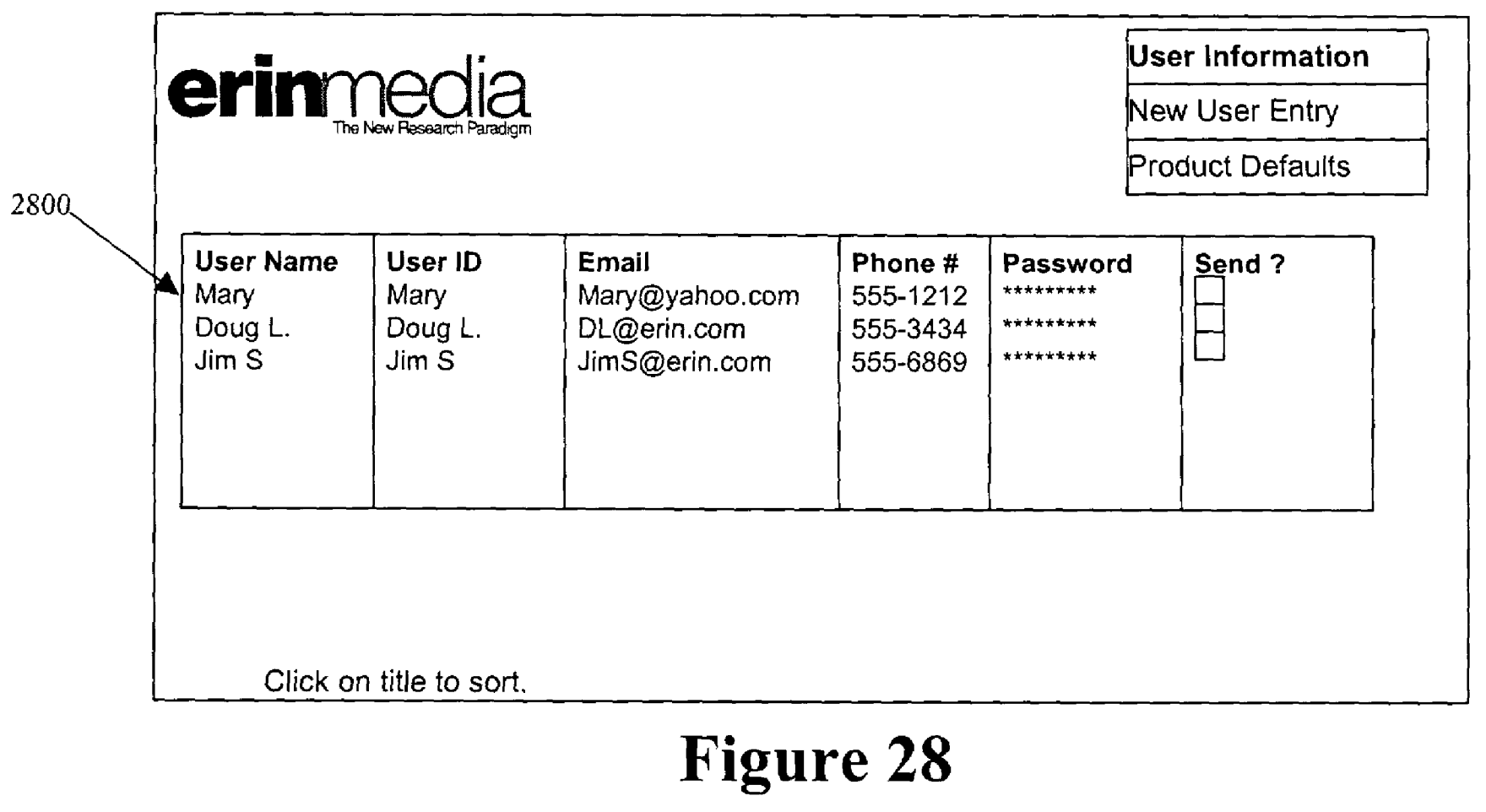

FIG. 28 illustrates a sample sub-account information display screen as provided by the present invention. User information display screens allow administrators to view the list of sub-accounts created by the administrator, as illustrated by display 2800. Where multiple sub-accounts have been created, the data may be re-sorted, preferably by simply clicking on a column header, to facilitate an administrator finding an appropriate entry. By clicking on or otherwise interacting with a given sub-account listed in display 2800, an administrator can edit information pertinent to that sub-account, and an administrator can delete the sub-account. New sub-accounts can be created through a variety of means, including clicking or otherwise interacting with a blank portion of display 2800.

Figure 29:
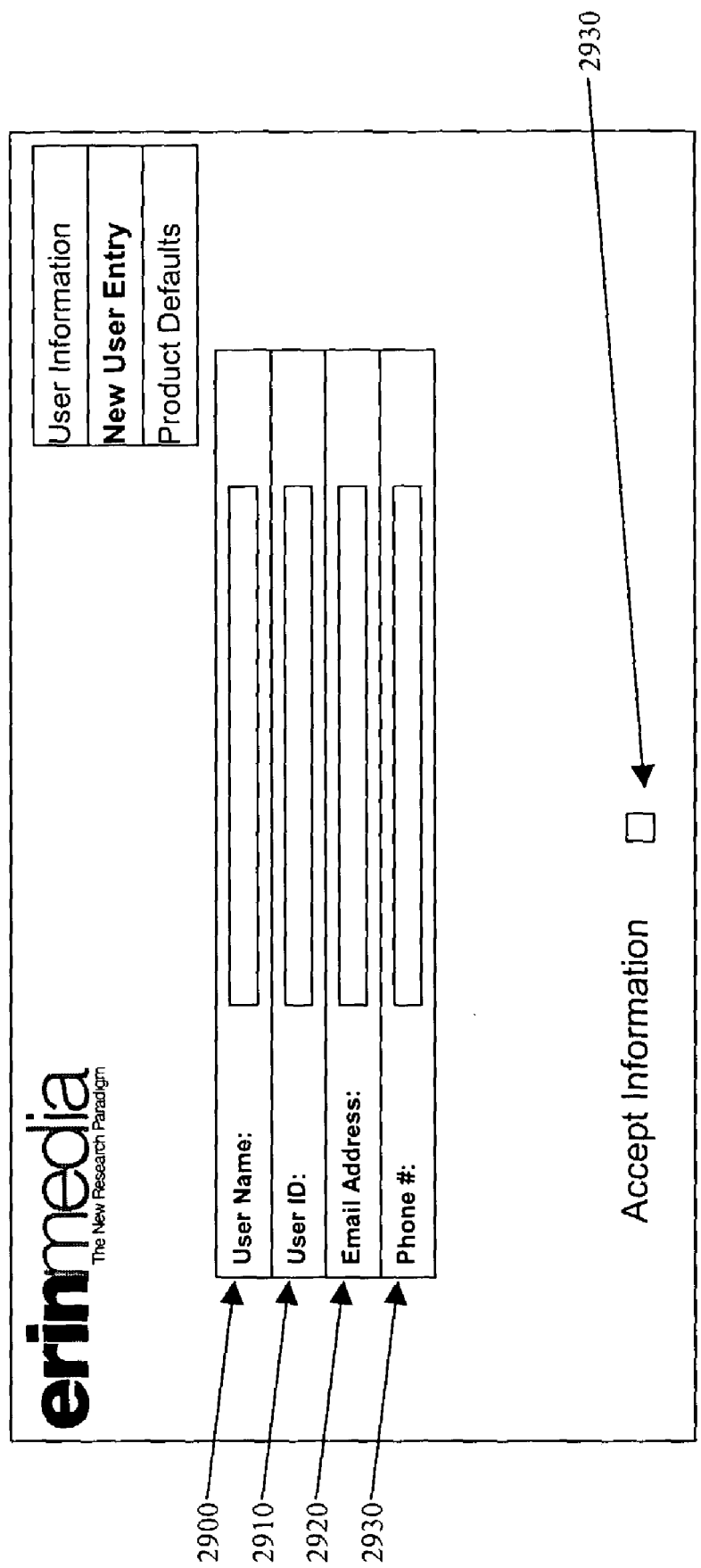
FIG. 29 is a screen capture of a preferred sub-account information editor screen.

FIG. 29 illustrates a sample new sub-account creation screen. A variety of information pertinent to sub-accounts can be collected in such a screen. As illustrated in FIG. 29, such information preferably includes the sub-account user's name 2900; a user identifier 2910 to be used by the sub-account user at the user login page; an Email address 2920 associated with the sub-account user; and a sub-account user's telephone number 2930. When the information has been entered properly, the user can click on Accept Information 2930 or another such interface element to cause the new sub-account to be created. New sub-account creation may trigger changes in billing or other accounting systems as well.

Figure 30:
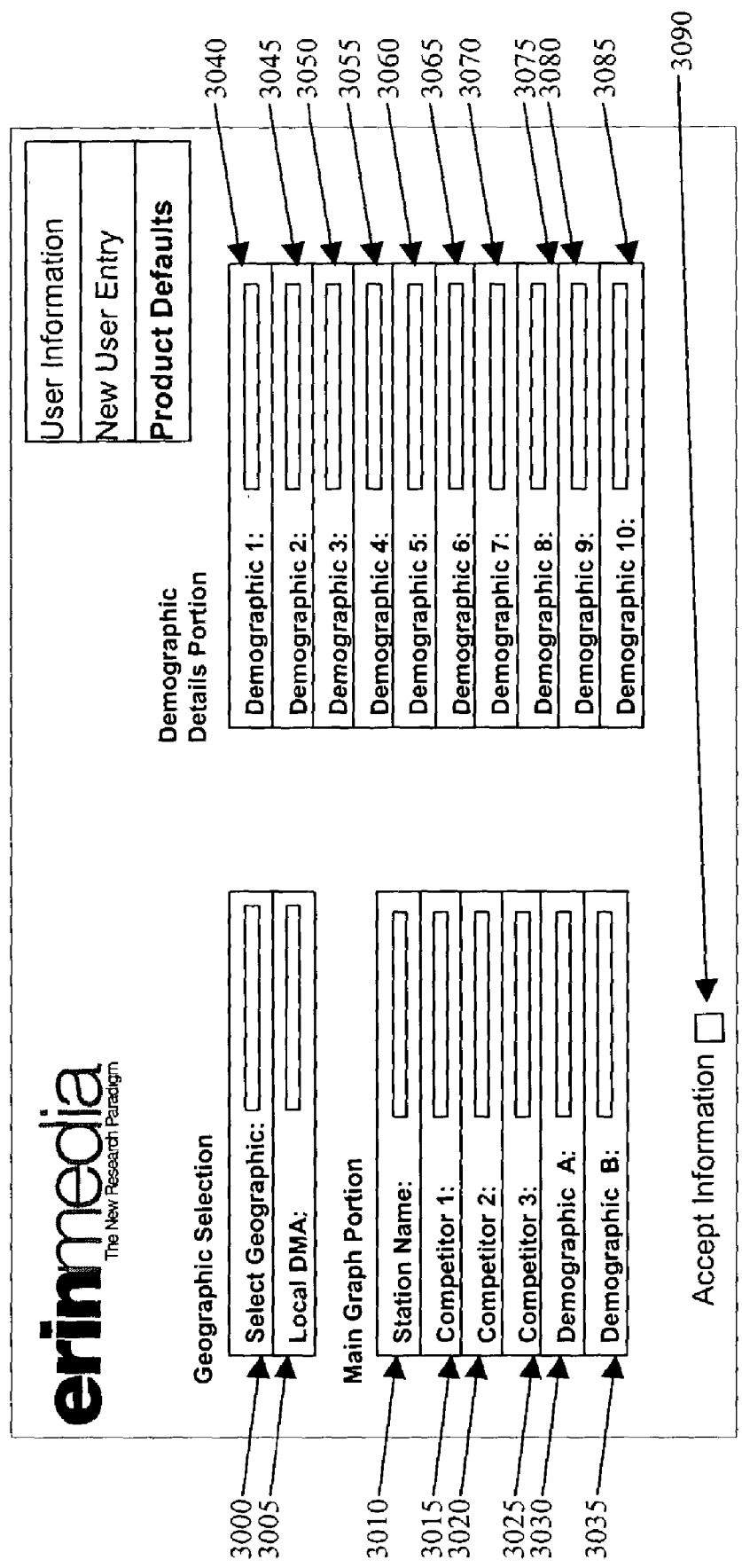
FIG. 30 is a screen capture of a preferred first product default configuration screen.
Figure 31:
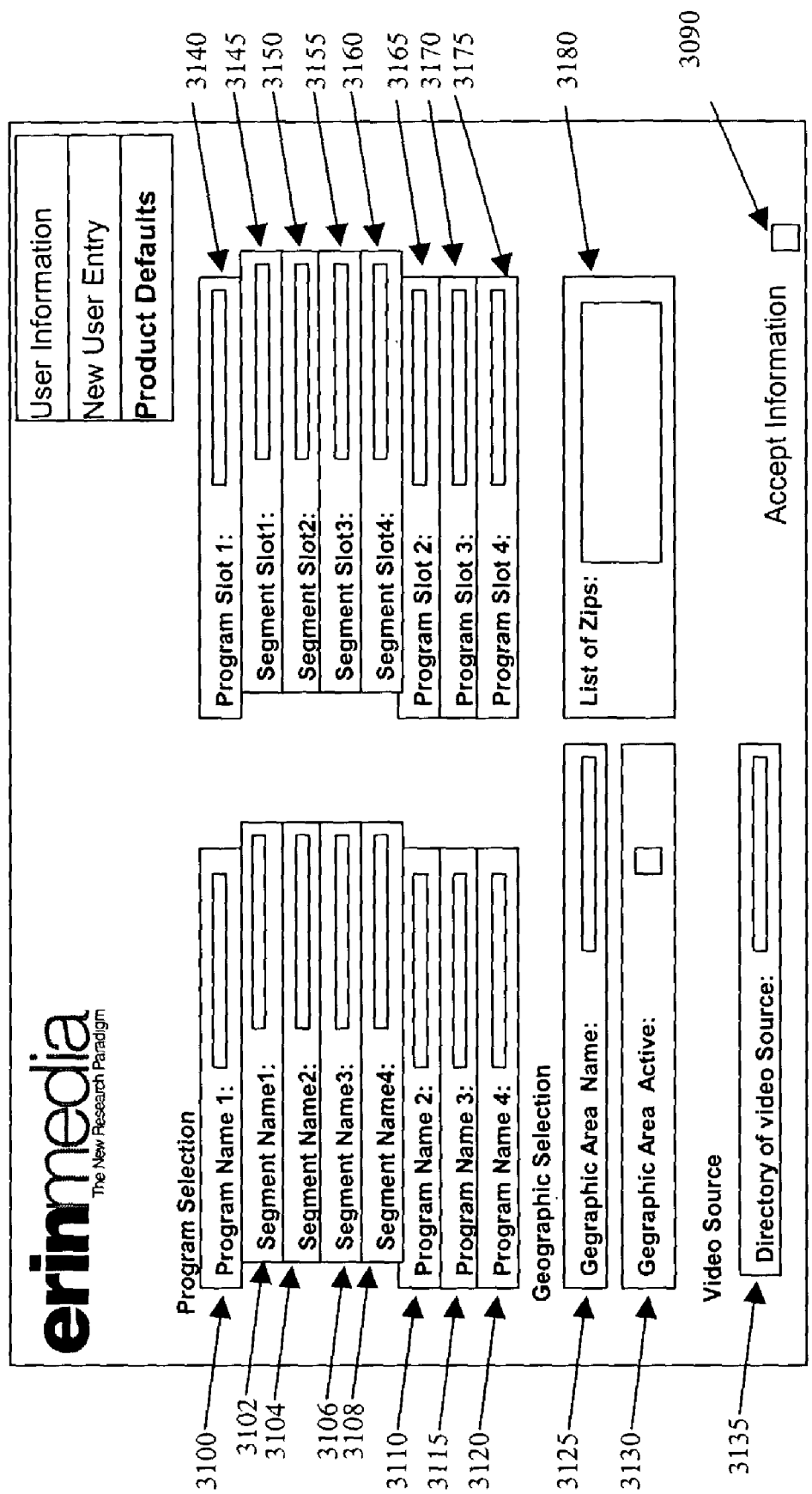
FIG. 31 is a screen capture of a preferred second product default configuration screen.

As described above, not only can administrators create and manage sub-accounts, but administrators can also edit default display preferences, as illustrated by Station Default Setup Page 2613 of FIG. 16. FIGS. 30 and 31 illustrate sample screens through which such default display preferences are configured. When a user initially licenses access to the present invention, the user may license access to data from one or more geographic regions. A default geographic region or set of geographic regions can be selected using geographic selection 3000. An administrator can also select a default marketing area within the geographic region using local DMA 3005.

As described above, the present invention provides a graphical analysis of viewer demographic and other characteristics, and portions of FIGS. 30 and 31 allow the user to customize defaults associated with such graphical analyses. By way of example, without intending to limit the present invention, a user can select or specify their own television station in Station Name 310, as well as names or other identifiers associated with one or more competitors, as indicated by blocks 3015 to 3025. Demographics to be included by default in a high-level analysis can also be selected in a default settings screen; this is illustrated in FIG. 30 by blocks 3030 and 3035. In a preferred embodiment, such demographics are selected from a list of pre-configured two-level demographic specifications (i.e. combinations of two demographic characteristics). In an alternative embodiment, users may create their own demographic specifications, including broader or more detailed demographics (i.e. n-level demographics). FIG. 30 similarly allows a user to select demographics to be included by default in a detailed graphical analysis, as illustrated by Blocks 3040 through 3085.

FIG. 31 illustrates the ability for a user to select one or more programs, illustrated by Blocks 3100, 3110, 3115, and 3120, for display by default when the user enters the content reaction portion of the present invention. Such programs can preferably be selected by time block or by name. Should a user desire to limit analysis to one or more segments of a selected program, such segments can also be selected using interface elements similar to blocks 3102 through 3108 of FIG. 31. Half-hour programming slots, illustrated by blocks 3140, 3165, 3170, and 3175, can also be selected for analysis, as can segments of such programming slots. Programming slot segment selection is illustrated in FIG. 31 through blocks 3145, 3150, 3155, and 3160.

As described above, users can select one or more default geographic regions to serve as the default geographic region over which a report is run. FIG. 31 illustrates the creation of custom geographic regions. Custom geographic regions can be created by giving the geographic region a name, as illustrated by Block 3125, and associating a set of zip codes or other geographic identifiers with the geographic region name through Block 3180. A user can remove a geographic region from the list of available default geographic regions by clearing Geographic Area Active check box 3130 or by performing other such acts.

In one contemplated embodiment, content may be stored at a user's site, thereby reducing bandwidth requirements associated with providing the reports of the present invention to the user. In such an embodiment, a user can indicate a default source content path through Video Source 3135. In an alternative embodiment, default content may be captured as part of the service provided by the present invention.

While the description above permits administrators to configure default display preferences, with any such changes being replicated to all sub-accounts, it should be apparent to one skilled in the art that default display preferences can be configured on a sub-account by sub-account basis without departing from the spirit or the scope of the present invention.

Figure 32:
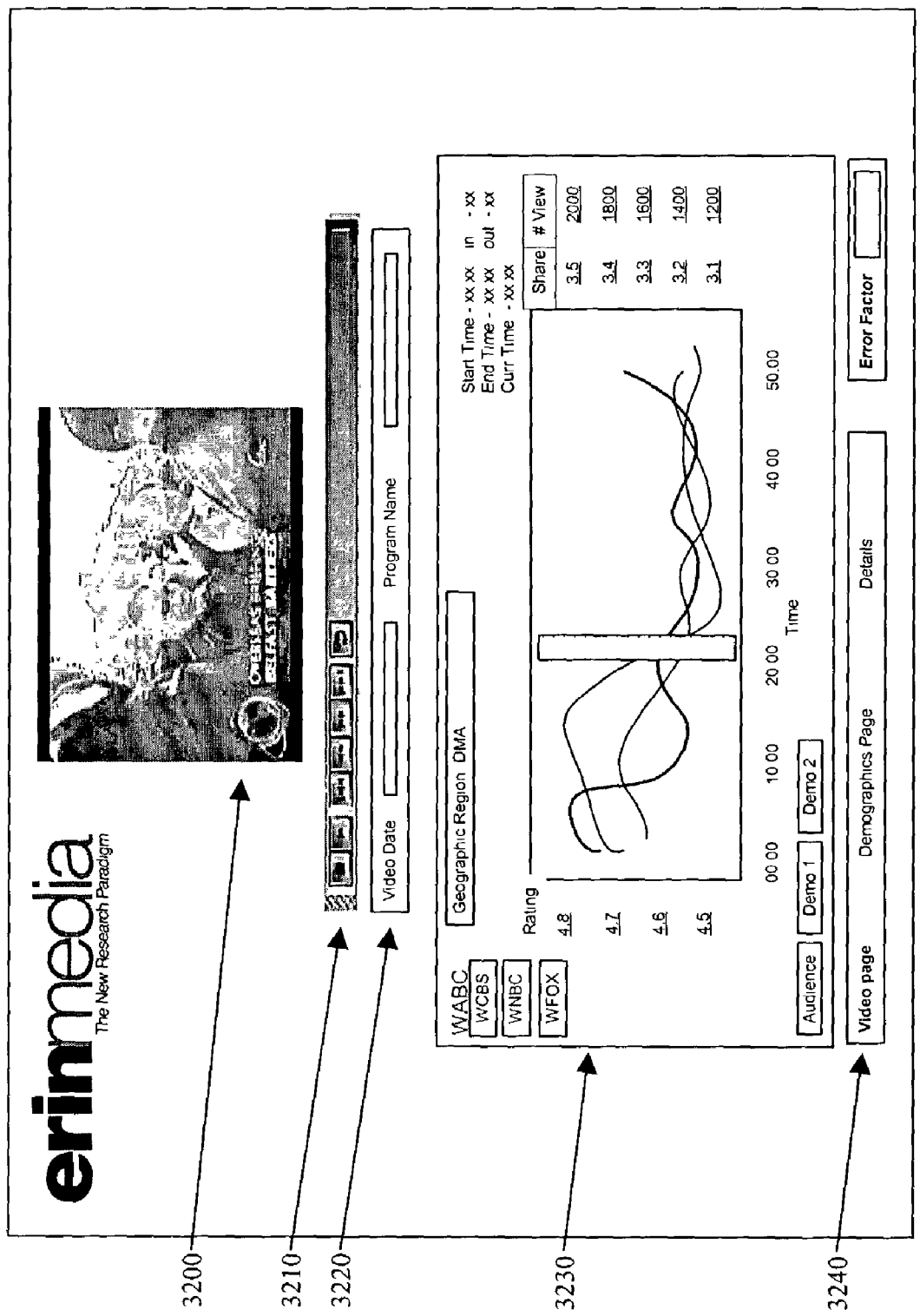
FIG. 32 is a screen capture of a preferred video screen.

When the user has configured the default settings to his or her liking, the user can begin viewing reports associated with the present invention. FIG. 32 illustrates a sample report generated as part of the present invention. As FIG. 32 illustrates, a report can include a content presentation region 3200, content experience controls 3210, content information display 3220, content reaction display 3230, and navigation aids 3240. FIG. 32 also illustrates the provisioning of additional information, such as the time the content was presented to the public (start time), the time the content stopped (end time), the position within the content (curr time), the number of viewers represented in the sample, and the like.

In keeping with the example television station embodiment described above, content experience controls 3210 can be used to control playback of audio and/or video content within content presentation region 3200. Such controls may include buttons for stopping playback, starting playback at normal speed, controlling playback speed, controlling content playback direction, skipping forward or backward in the content stream, and the like. Content information display 3220 provides information about the content, such as the date on which the content aired and a name associated with the content.

Content reaction display 3230 provides a real-time display of changes in content reactions for various demographics and for various programming. As FIG. 32 illustrates, the display preferably indicates the second-by-second rating for the content being presented in content presentation region 3200, as well as similar information for other, simultaneously presented content, such as a competing news program. By default, the graph should be scaled to show the content reaction over the entire length of the content presented in content presentation region 3200. However, the present invention can allow the user to "zoom in" on a given region by clicking and dragging on the desired region.

A "position bar" can indicate the precise position on content information display 3220 that corresponds to the particular portion of the content that is being presented in content presentation region 3200. Thus, the position bar moves across content information display 3220 such that the position bar is time synchronized with content presented in content presentation region 3200. The position bar may also have a zoom bar associated with it. Such a zoom bar can provide a highly detailed, or "zoomed in", view of the graph that corresponds to a configurable period of time, such as plus and minus fifteen seconds, around the position bar. This allows a user to see a detailed analysis of the current content portion without losing the perspective provided by the overall content information display.

The user interface can also allow a user to mark points in a content display and/or in the graphical region for later analysis. By way of example, without intending to limit the present invention, the present invention can allow a user to create a "storyboard" by repeatedly pressing the space bar on the keyboard. Each time the space bar is pressed, a copy of the contently experienced by the user can be copied to an alternative region of the screen with a time stamp superimposed over it or otherwise readily associated with it. The time stamp is preferably color coded, and a corresponding colored bar preferably appears in the graphical display. This can allow the user to readily analyze content reactions at distinct points in time and more easily identify changes in the content that may be triggering such reactions.

Other user interface elements can allow the user to select whether the data illustrated in content reaction display 3230 represents the available audience as a whole or specific demographics. By way of example, without intending to limit the present invention, the present invention may allow a user to select from the demographic characteristics specified in the user defaults portion of the present invention (Block 2613 of FIG. 26).

Figure 33:
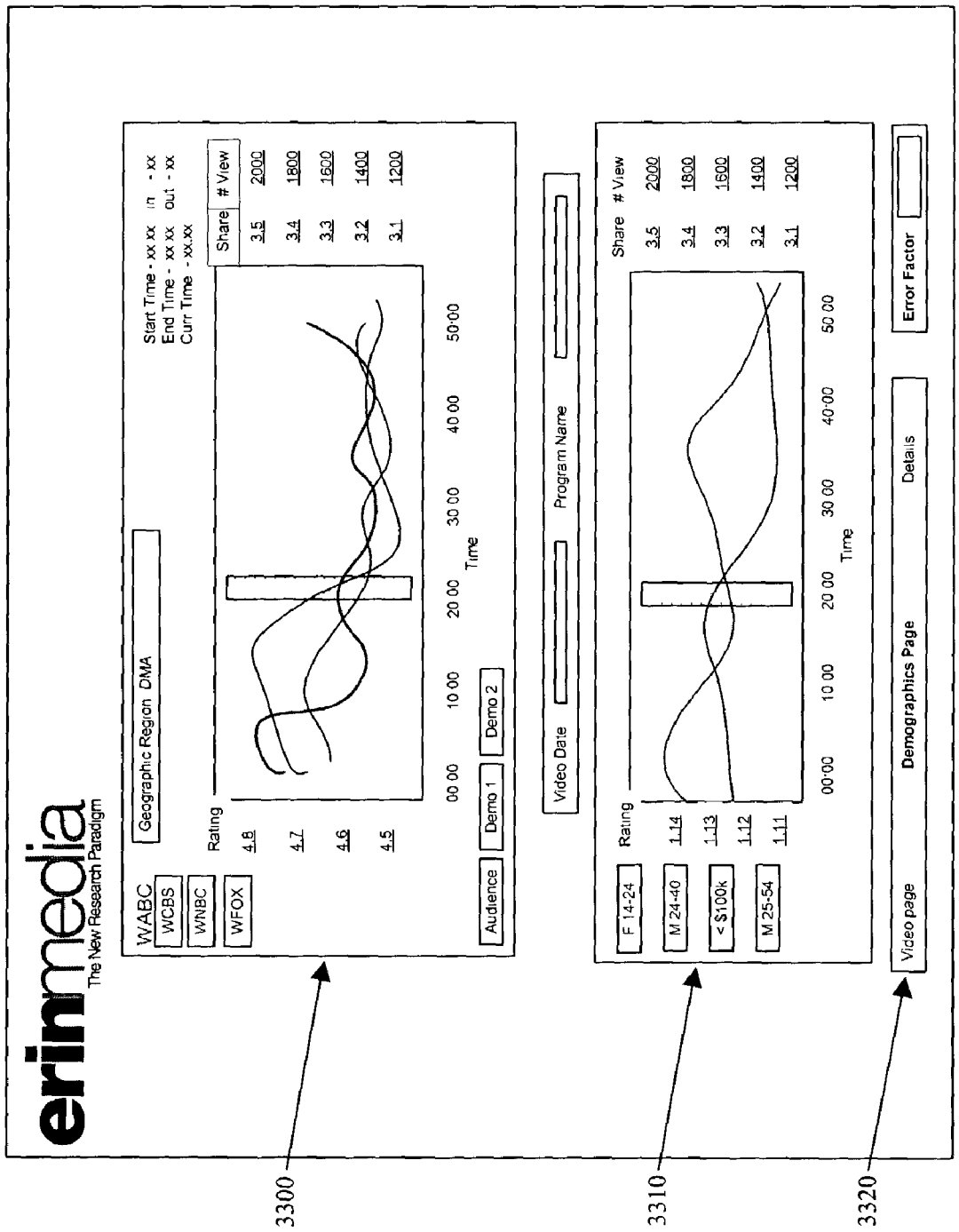
FIG. 33 is a screen capture of a preferred demographics screen.

The present invention is also capable of providing more detailed graphical analyses, as illustrated in FIG. 33. By way of example, without intending to limit the present invention, the present invention can allow a user to simultaneously analyze content reaction by one or more demographics (Block 3310) against the content reaction of the audience as a whole (Block 3300).

Figure 34:
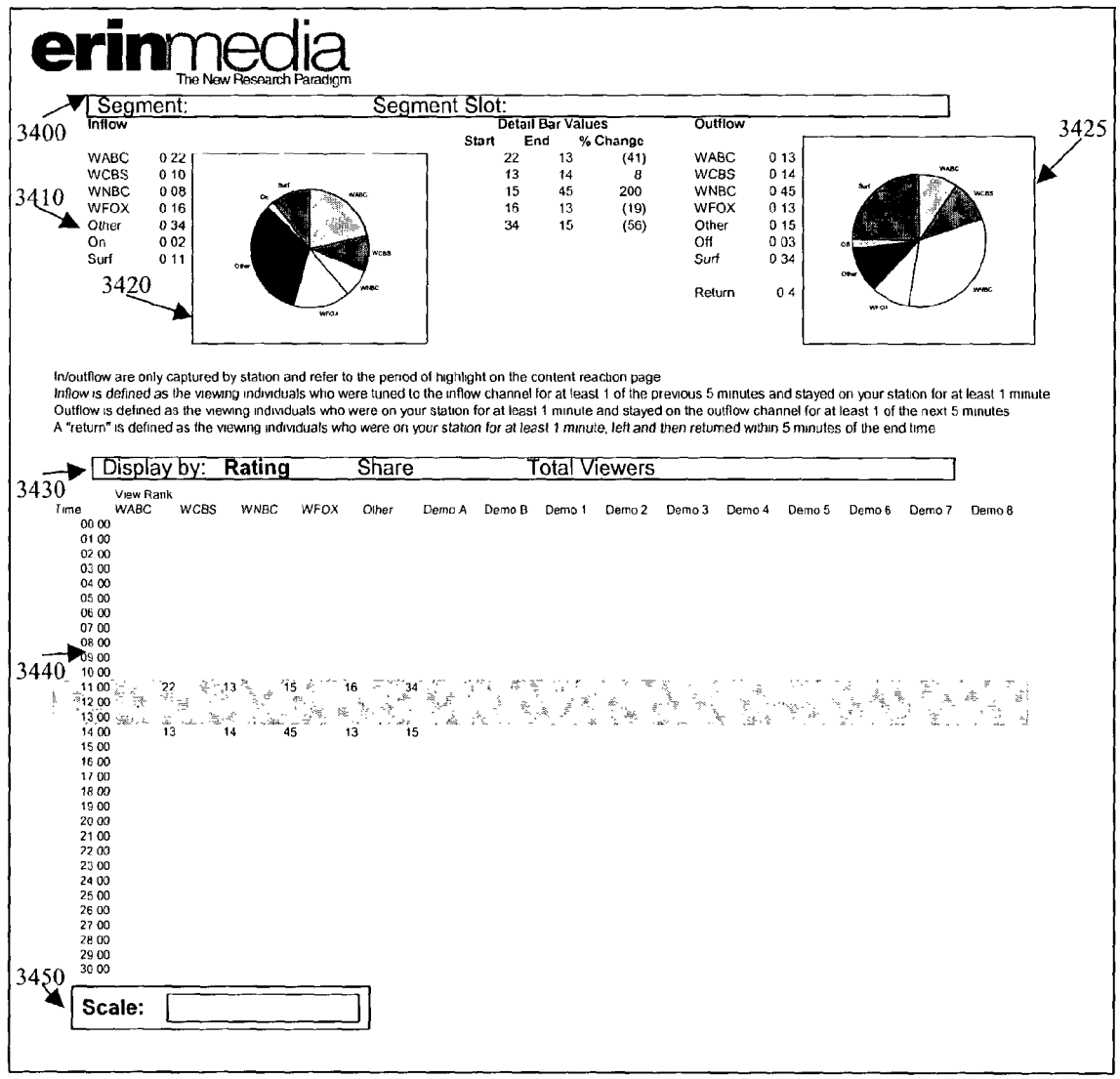
FIG. 34 is a screen capture of a preferred detailed report screen.

In addition to graphical analyses, the present invention can also present information in a more tabular format, as illustrated in FIG. 34. In the tabular format, ratings information for the user's television station is presented in ratings display area 3440. A user can select the scale of the ratings information, or "zoom in" on the information, through Scale 3450. The user can click and drag to select a region or set of regions of interest in ratings display area 3440. The segment name and, where appropriate, segment slot associated with the selected region or set of regions is indicated in 3400. Data associated with the selected region or regions can also be presented in graphs 3420 and 3425. By way of example, without intending to limit the present invention, inflow, or the measure of viewers switching from other content to content corresponding to the selected region or regions, and outflow, or the measure of viewers switching from content corresponding to the selected region or regions to other content can be displayed graphically. In addition, tabular representations of the inflow and outflow calculations can also be presented.

Figure 35:
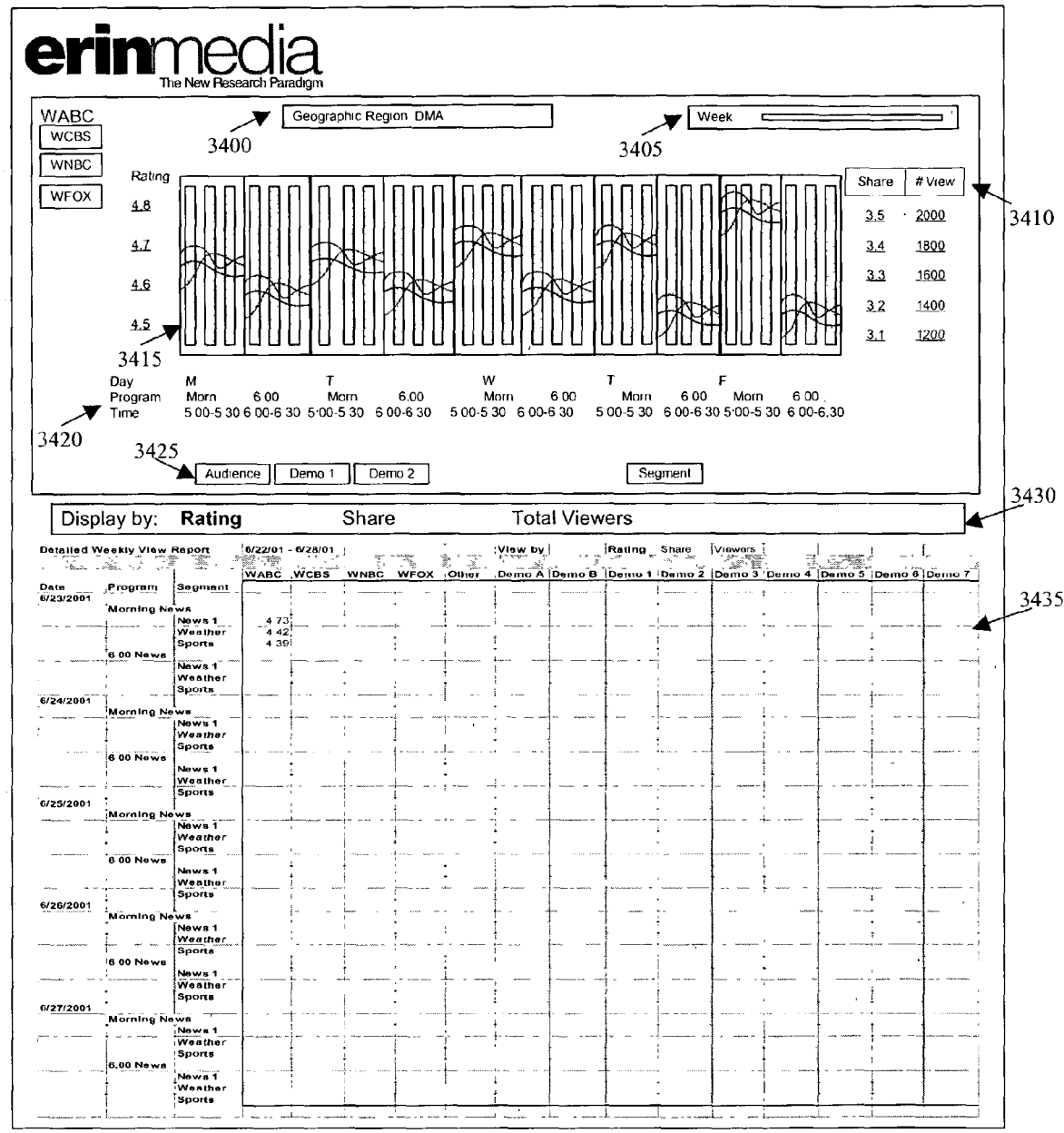
FIG. 35 is a screen capture of a preferred weekly report screen.

Unlike the tabular display of FIG. 34, which is well suited to analyzing data from a single day, the tabular display of FIG. 35 is useful for analyzing data over multiple days. While segment display region 3435 lists the segment or segments configured by a user in block 2613 of FIG. 26, the tabular display of FIG. 35 also allows a user to add and remove segments from segment display region 3435. As a segment is added to segment display region 3435, a graph illustrating the ratings, share, and/or viewership associated with the segment, illustrated by graphs 3415, are presented for analysis. The scale of the graphs and legends associated with the graphs may be expanded or contracted to fit in the available space and the data ranges present in segment display region 3435. Such graphs can be useful in identifying overall trends that are not readily apparent at the daily level, such as fluctuations in the aggregate number of viewers on a given day. As with the graphs of FIGS. 32 and 33, the user can configure whether the data displayed in the graphs corresponds to the audience as a whole or one or more subsets thereof, as represented by a given demographic. In addition, the user can specify one or more competitors to whom the user's data is compared.

While the above-described embodiment is geared toward providing users with content reaction information via the world wide web, it should be apparent to one skilled in the art that alternative access and distribution means can be used without departing from the spirit or the scope of the present invention. By way of example, without intending to limit the present invention, content reaction information can be distributed through CD-ROM, DVD or other high-capacity data storage device, thus obviating the need for world wide web based access to the content reaction data.

Through the system and methods of the present invention, heretofore unachievable levels of data analysis can be obtained. While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method of automatically evaluating audience reactions to media content, comprising:
   anonymously collecting media content reaction data associated with a particular media content in a privacy compliant manner, wherein the media content reaction data is associated with audience reactions to the particular media content;
   associating with a processor the collected media content reaction data with only one or more regional identifiers associated with a viewer/listener;
   storing the media content reaction data and the at least one identifier in at least one database; and
   presenting the particular media content and the associated media content reaction data to a customer in a synchronized manner;
   wherein the particular media content associated with the media content reaction data is at least one of a group consisting of a television program, a radio program, a television advertisement, a radio advertisement, Internet content and Internet advertisements.

2. The method of claim 1, wherein the media content reaction data includes a media content reaction and a time at which the media content reaction was recorded.

3. The method of claim 1, wherein the collected media content reaction data includes a list of television channels experienced by the viewer/listener and the times at which the television channels were experienced by the viewer/listener.

4. The method of claim 1, wherein the collected media content reaction data comprises a list of radio channels experienced by the viewer/listener and the times at which the radio channels were experienced by the viewer/listener.

5. The method of claim 1, wherein the collected media content reaction data includes set-top box event data.

6. The method of claim 1, wherein the media content reaction data includes an identifier associated with the particular media content experienced while the associated media content reaction data was collected.

7. The method of claim 6, wherein the identifier associated with the particular media content experienced while the associated media content reaction data was collected includes a broadcast channel.

8. The method of claim 7, wherein the broadcast channel is a television channel.

9. The method of claim 7, wherein the broadcast channel is a radio channel.

10. The method of claim 1, wherein the viewer/listener represents members of a household.

11. The method of claim 1, wherein the customer is associated with at least one of a television station, a television network, a radio station, and a radio network.

12. The method of claim 1, wherein the media content reaction data is presented as a graphical display.

13. The method of claim 12, wherein the graphical display is a time based display.

14. The method of claim 1, wherein the media content reaction data is collected from a plurality of viewers/listeners, and at least one identifier is associated with the media content reaction data from each of the respective viewers/listeners.

15. The method of claim 1, further comprising;
   allowing the customer to interact with the media content reaction data presentation.

16. The method of claim 1, further comprising:
   allowing the customer to interact with the media content presentation.

17. The method of claim 1, further comprising:
   allowing the customer to interact with the media content reaction data and the media content presentation.

18. The method of claim 1, wherein the media content reaction data presentation includes an analysis of the media content reaction data.

19. A method of automatically evaluating audience reactions to media content, comprising:
   anonymously collecting with a device media content reaction data associated with a particular media content from a plurality of viewers/listeners in a privacy compliant manner, wherein the media content reaction data is associated with a processor with audience reactions to the particular media content, wherein the media content reaction data includes only one or more first regional identifier associated with each of the plurality of viewers/listeners and at least one second identifier associated with the particular media content to which the plurality of viewers/listeners is reacting;
   storing the media content reaction data in at least one database; and
   presenting the particular media content and the associated media content reaction data to a customer in a synchronized manner;
   wherein the particular media content associated with the media content reaction data is at least one of a group consisting of a television program, a radio program, a television advertisement, a radio advertisement, Internet content and Internet advertisements.

20. The method of claim 19, further comprising:
   allowing the customer to interact with the media content reaction data presentation.

21. The method of claim 19, further comprising:
allowing the customer to interact with the media content presentation.

22. The method of claim 19, further comprising:
allowing the customer to interact with the media content and the media content reaction presentations.

23. The method of claim 19, wherein the media content reaction data includes set-top box event data.

24. The method of claim 19, wherein the media content reaction data presentation includes an analysis of the media content reaction data.

25. A method of automatically evaluating audience reactions to media content, comprising:
anonymously collecting set-top box event data from a set-top box of a viewer/listener using a processing device, wherein the set-top box data includes at least one of a set-top box event, a time at which the set-top box occurred, at least one media content identifier, and only one or more regional identifiers associated with the viewer/listener;
storing the set-top box event data in at least one database; and
presenting media content associated with the set-top box event data stored in the at least one database to a customer in a synchronized manner;
wherein the particular media content associated with the media content reaction data is at least one of a group consisting of a television program, a radio program, a television advertisement, a radio advertisement, Internet content and Internet advertisements.

26. The method of claim 25, wherein the presentation of set-top event data includes an analysis of the set-top box event data.

27. The method of claim 26, wherein the set-top box event data analysis includes a content viewership rating.

28. The method of claim 26, wherein the set-top box event data analysis includes a media content market share.

29. A method of automatically evaluating audience reactions to television programming, comprising:
anonymously collecting television programming reaction data associated with a particular television programming content from a viewer/listener in a privacy compliant manner, wherein the television programming reaction data is associated with audience reactions to the particular television programming content;
associating with a processor the collected television programming reaction data with only one or more regional identifiers associated with the viewer/listener;
storing the collected television programming reaction data in at least one database;
presenting the television programming content and the associated television programming reaction data to a customer in a synchronized manner;
allowing the customer to interact with the television programming content and the associated television programming reaction data.

30. The method of claim 29, wherein the television programming reaction data includes the time at which a first television channel was changed by the viewer/listener to a second television channel, and the identity of the first and second television channels.

31. The method of claim 29, wherein the customer can interact with the television programming to achieve a plurality of effects including at least one of creating a storyboard, controlling television programming playback direction, controlling television programming playback speed, marking positions within television programming, and moving to discrete locations within the television programming.

32. The method of claim 29, wherein the television programming includes television advertisements.

33. An apparatus that automatically evaluates audience reactions to media content, comprising:
at least one media content reaction database;
a media content reaction data collector that anonymously collects media content reaction data associated with a particular media content in a privacy compliant manner, wherein the media content reaction data is associated with audience reactions to the particular media content;
a media content reaction analyzer that associates the collected media content reaction data with only one or more regional identifiers associated with a viewer/listener, stores the media content reaction data and the at least one identifier in the at least one database, and presents the particular media content and the associated media content reaction data to a customer in a synchronized manner, wherein the particular media content associated with the media content reaction data is at least one of a group consisting of a television program, a radio program, a television advertisement, a radio advertisement, Internet content and Internet advertisements.

34. The apparatus of claim 33, wherein the media content reaction data collector is a set-top box.

35. The apparatus of claim 33, wherein the media content reaction analyzer calculates content ratings and content market share.

36. The apparatus of claim 33, wherein the media content reaction analyzer causes presentation of media content, media content reaction data, and media content reaction analysis information in a plurality of arrangements.

37. The apparatus of claim 36, wherein the presentation arrangements include at least one of a video stream page, a video details page, a demographics page, and a detailed demographics page.

38. The apparatus of claim 36, wherein the presentation arrangements further include a weekly report.

* * * * *